United States Patent
Dalal et al.

(10) Patent No.: US 10,977,740 B2
(45) Date of Patent: Apr. 13, 2021

(54) SYSTEMS AND METHODS FOR DYNAMIC REAL-TIME ANALYSIS FROM MULTI-MODAL DATA FUSION FOR CONTEXTUAL RISK IDENTIFICATION

(71) Applicant: American International Group, Inc., New York, NY (US)

(72) Inventors: Siddhartha Dalal, Somerset, NJ (US); Devasis Bassu, Bedminster, NJ (US); Promiti Dutta, New York, NY (US); Ashwath Aithal, Hoboken, NJ (US); Liangkai Zhang, Jersey City, NJ (US); Alvin Chou, Alpharetta, GA (US); Michael P. Castelli, Carmel, NY (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 0 days.

(21) Appl. No.: 16/863,279

(22) Filed: Apr. 30, 2020

(65) Prior Publication Data
US 2020/0258163 A1    Aug. 13, 2020

Related U.S. Application Data

(63) Continuation of application No. 15/852,472, filed on Dec. 22, 2017, now Pat. No. 10,776,880.

(60) Provisional application No. 62/544,454, filed on Aug. 11, 2017.

(51) Int. Cl.
G06Q 40/08 (2012.01)
G06Q 50/16 (2012.01)
G06K 9/00 (2006.01)
G06N 3/02 (2006.01)
G06T 7/73 (2017.01)
H04W 84/18 (2009.01)
(Continued)

(52) U.S. Cl.
CPC ......... G06Q 40/08 (2013.01); G06K 9/00671 (2013.01); G06N 3/02 (2013.01); G06Q 50/163 (2013.01); G06T 7/75 (2017.01); G06K 9/6293 (2013.01); G06K 9/72 (2013.01); H04W 84/18 (2013.01)

(58) Field of Classification Search
None
See application file for complete search history.

(56) References Cited

U.S. PATENT DOCUMENTS

| | | | |
|---|---|---|---|
| 5,809,171 A | | 9/1998 | Neff et al. |
| 6,038,337 A | * | 3/2000 | Lawrence ............ G06K 9/4628 382/155 |
| 6,057,646 A | | 5/2000 | Pieroth et al. |

(Continued)

OTHER PUBLICATIONS

U.S. Appl. No. 15/852,472, filed Dec. 22, 2017.
(Continued)

*Primary Examiner* — Scott C Anderson
(74) *Attorney, Agent, or Firm* — Snell & Wilmer L.L.P.

(57) ABSTRACT

Disclosed is a system and method to automatically identify property-related risks through the use of computer vision, sensors, and/or building information models (BIMs). The ability to automatically identify a variety of hazards helps mitigate the associated risks, and thus reduces the number of accidents or fatalities that would otherwise occur. In some embodiments, a "risk map" can be generated by mapping the identified risks for a given property.

20 Claims, 51 Drawing Sheets

(51) Int. Cl.
*G06K 9/62* (2006.01)
*G06K 9/72* (2006.01)

(56) References Cited

U.S. PATENT DOCUMENTS

| | | |
|---|---|---|
| 7,149,701 B2 | 12/2006 | McKinney |
| 8,417,296 B2 | 4/2013 | Caballero et al. |
| 8,831,528 B2 | 9/2014 | Shi |
| 10,395,185 B2 | 8/2019 | Dick et al. |
| 2008/0094210 A1 | 4/2008 | Paradiso et al. |
| 2008/0189142 A1 | 8/2008 | Brown et al. |
| 2009/0204232 A1* | 8/2009 | Guru ............... G06Q 50/04 700/9 |
| 2009/0265193 A1 | 10/2009 | Collins et al. |
| 2011/0087887 A1 | 4/2011 | Luft et al. |
| 2011/0286628 A1* | 11/2011 | Goncalves ....... G06F 16/5838 382/103 |
| 2013/0282609 A1 | 10/2013 | Au et al. |
| 2014/0267723 A1 | 9/2014 | Davidson, Jr. et al. |
| 2014/0307076 A1* | 10/2014 | Deutsch ............ F16P 3/147 348/77 |
| 2016/0171622 A1 | 6/2016 | Perkins |
| 2016/0259995 A1 | 9/2016 | Ishii et al. |
| 2016/0377305 A1* | 12/2016 | Kwa .................. F24F 11/30 700/277 |
| 2017/0083792 A1 | 3/2017 | Rodriguez-Serrano et al. |
| 2017/0113702 A1 | 4/2017 | Thieberger-Navon et al. |
| 2017/0316508 A1 | 11/2017 | Seale |
| 2017/0372216 A1 | 12/2017 | Awiszus et al. |
| 2018/0032331 A1 | 2/2018 | Desai et al. |

OTHER PUBLICATIONS

Occupational Safety and Health Administration (OSHA). "Top 10 Most Frequently Cited Standards," Jan. 5, 2016 (retrieved from: https://www.osha.gov/Top_Ten_Standards.html on Dec. 22, 2017).
National Building Specification (NBS). "What is Building Information Modelling (BIM)?" Aug. 3, 2016 (retrieved from: https://www.thenbs.com/knowledge/what-is-building-information-modelling-bim on Dec. 22, 2017).
Akhondi et al., "Applications of Wireless Sensor Networks in the Oil, Gas and Resources Industries," *Proc. 24th IEEE Intl Conf. on Advanced Information, Networking and Applications*, Jun. 2010, pp. 941-948 (2010).

\* cited by examiner

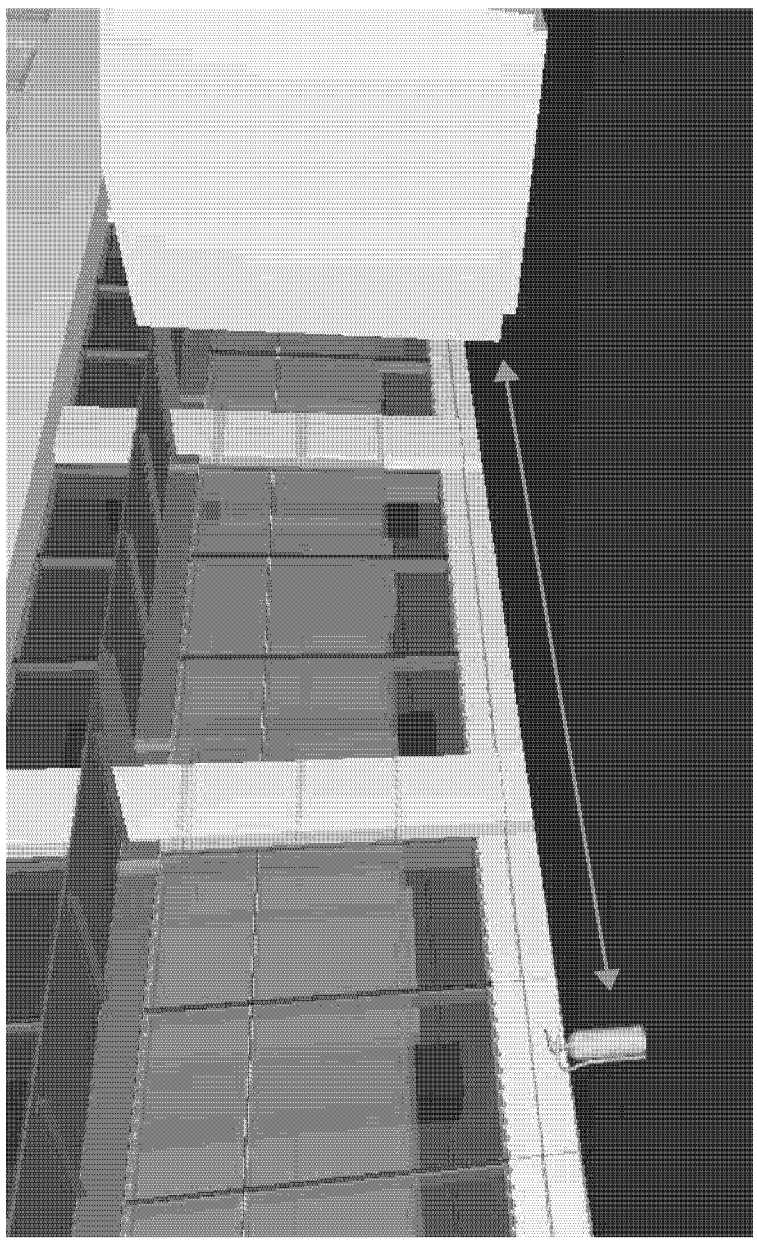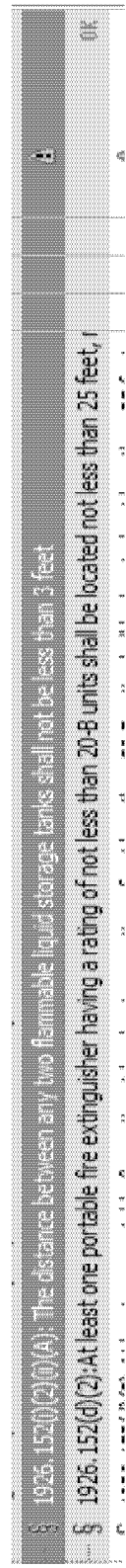
FIG. 11

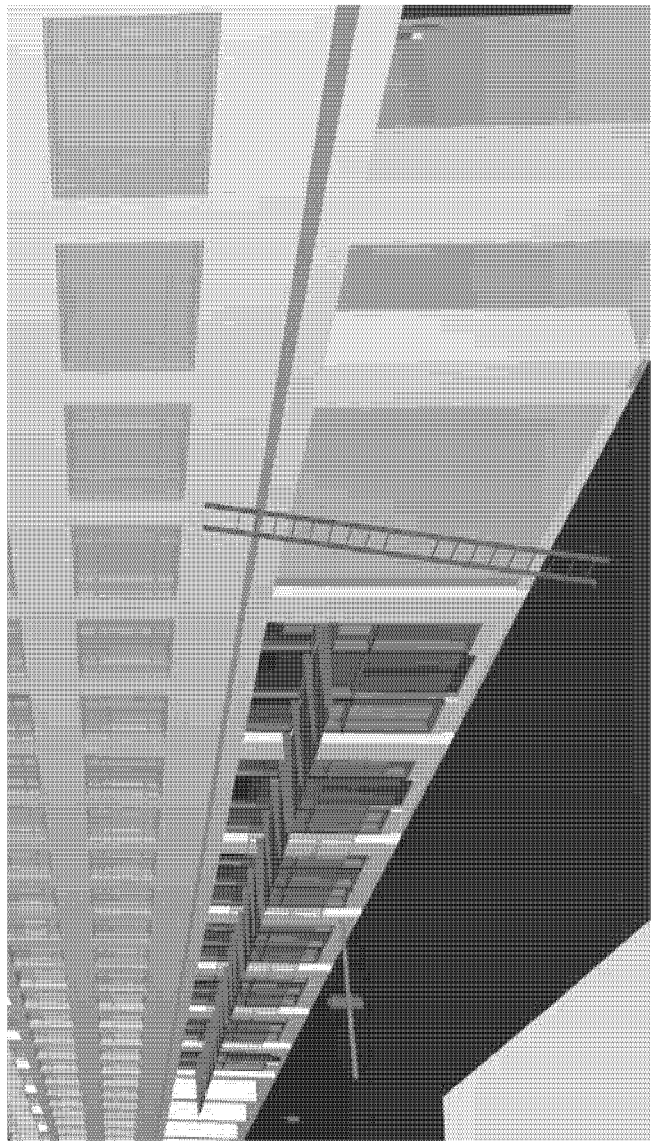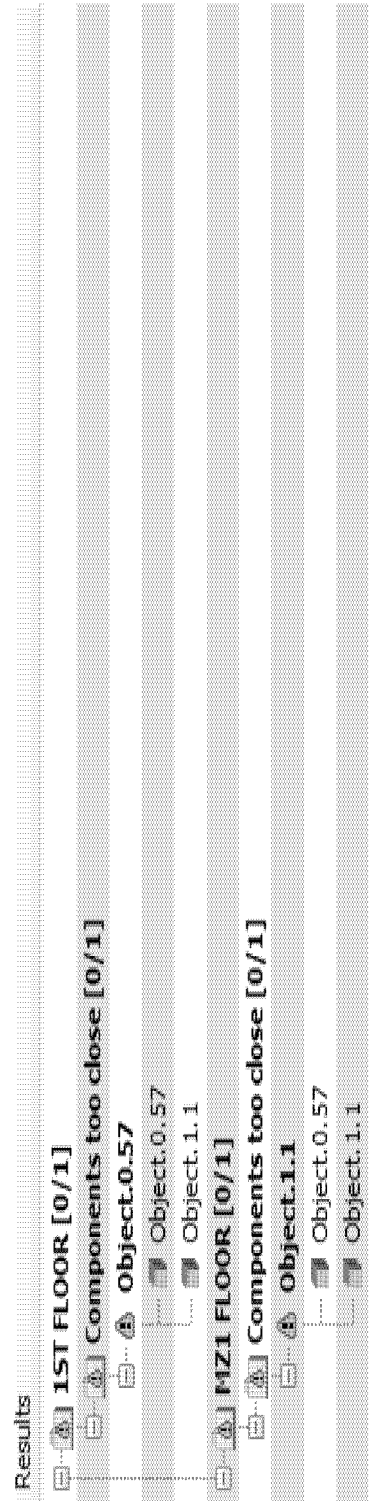
FIG. 20

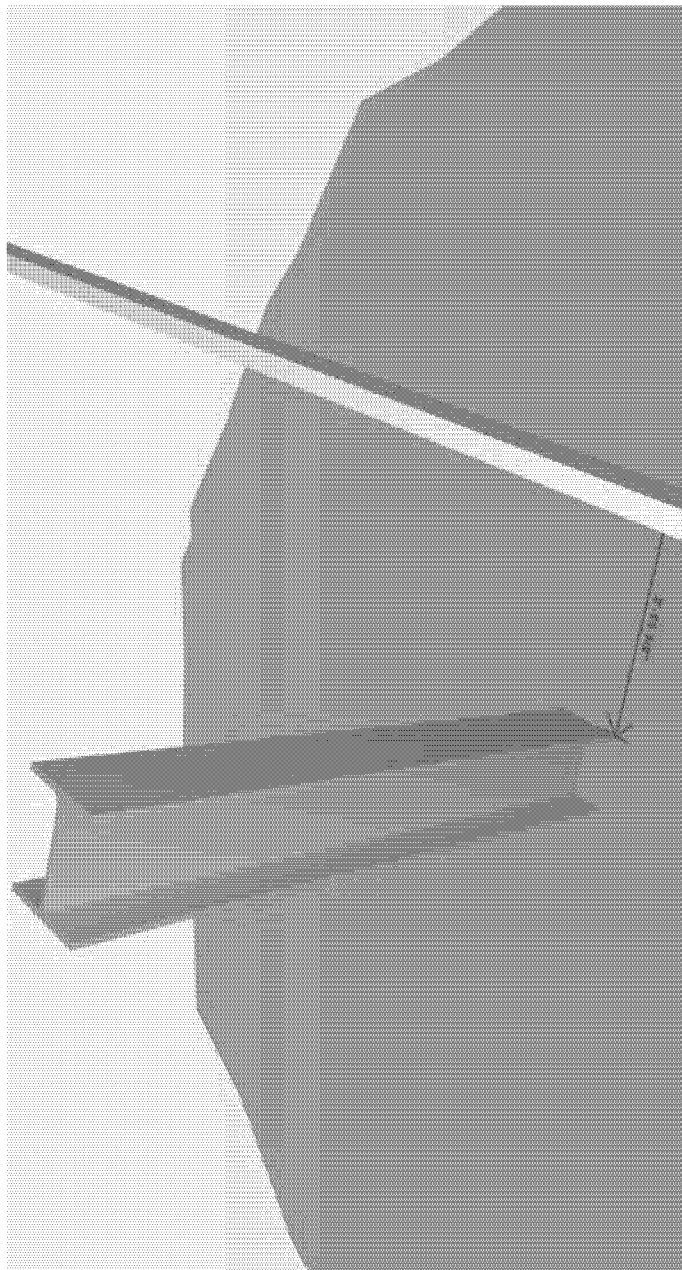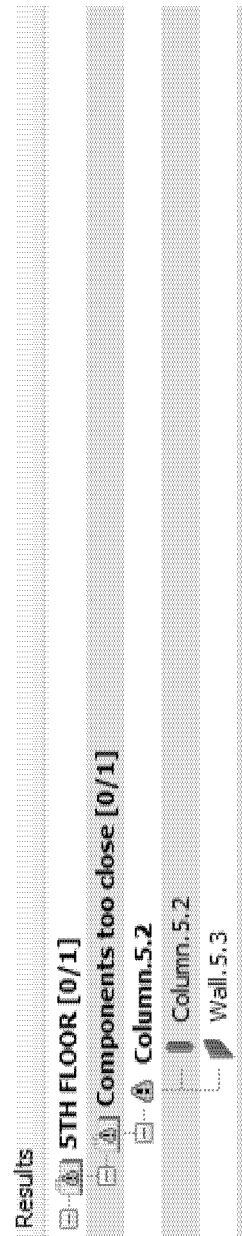
FIG. 23

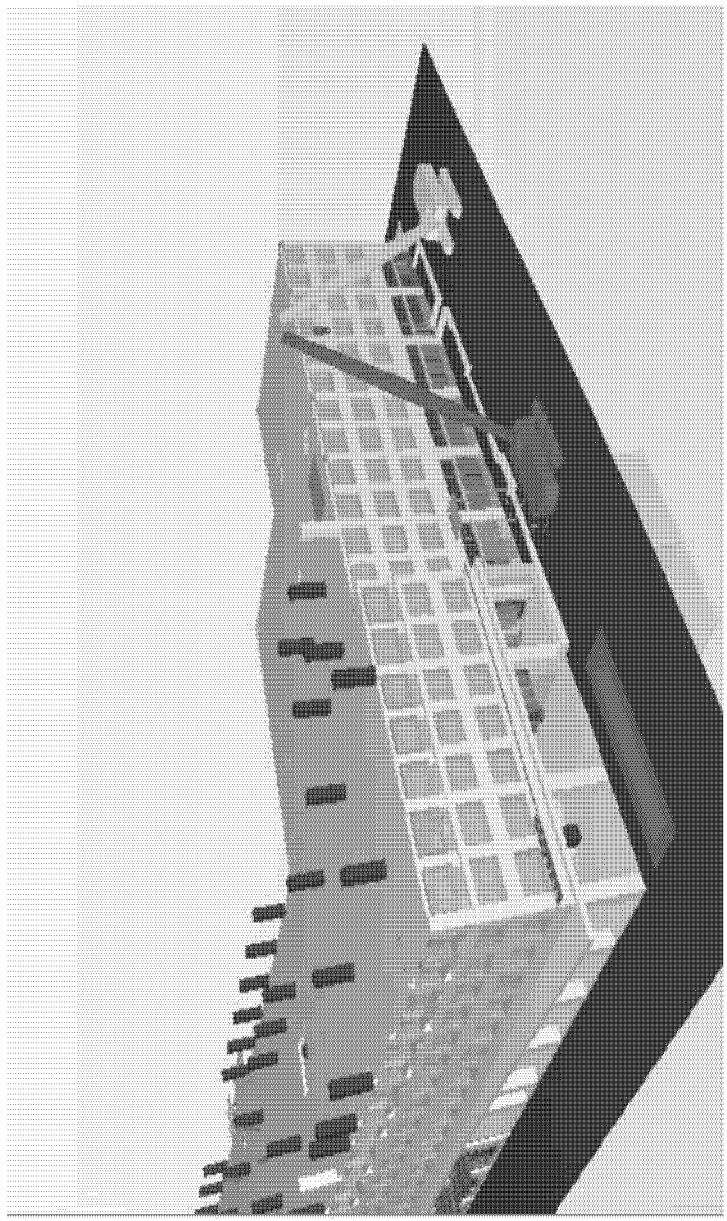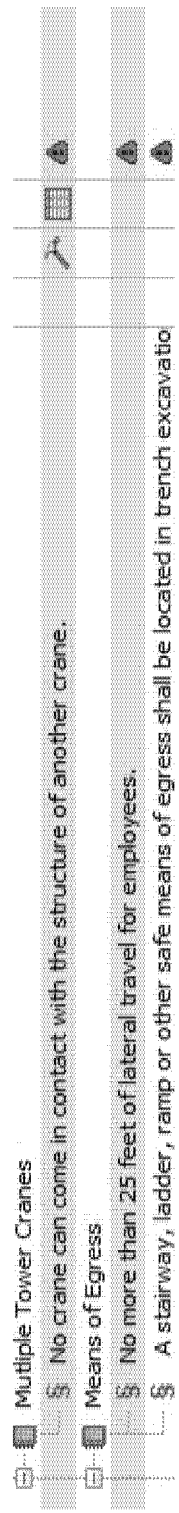
FIG. 24

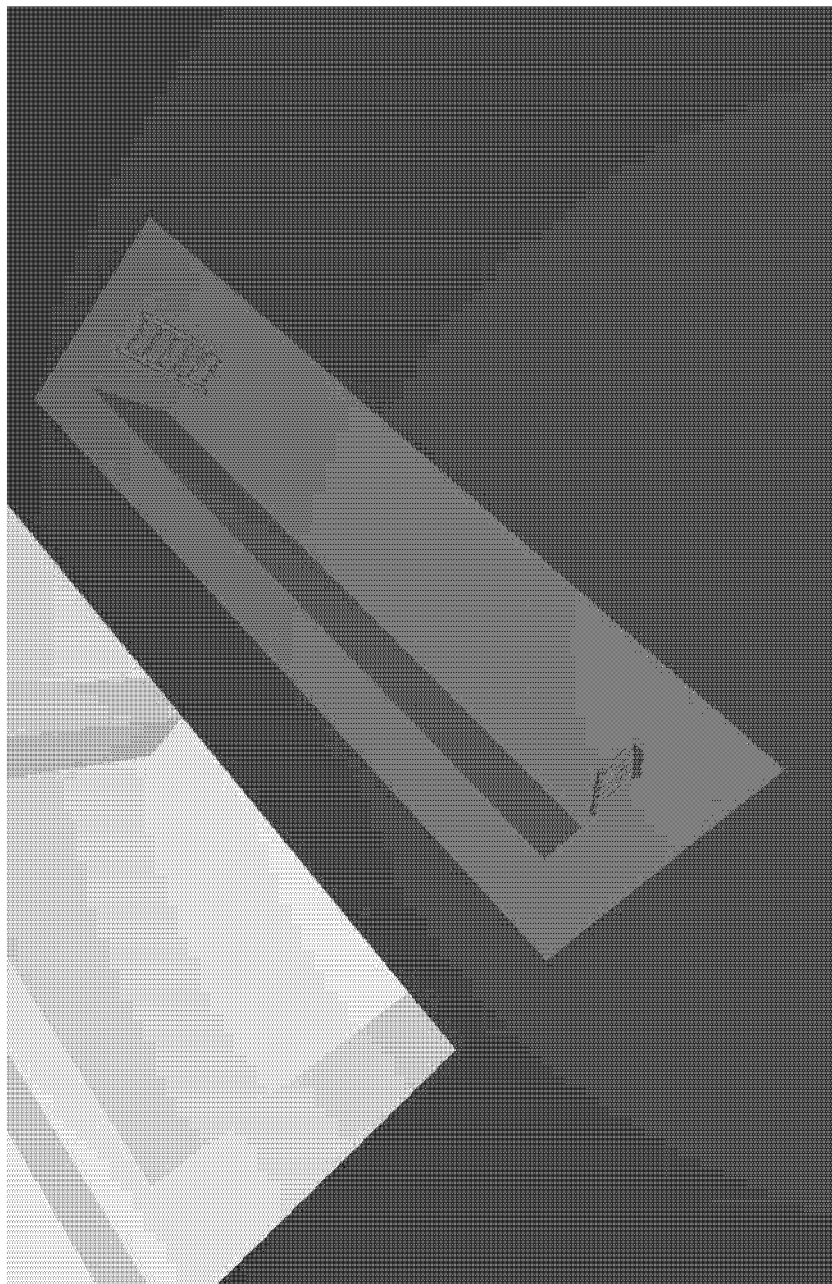
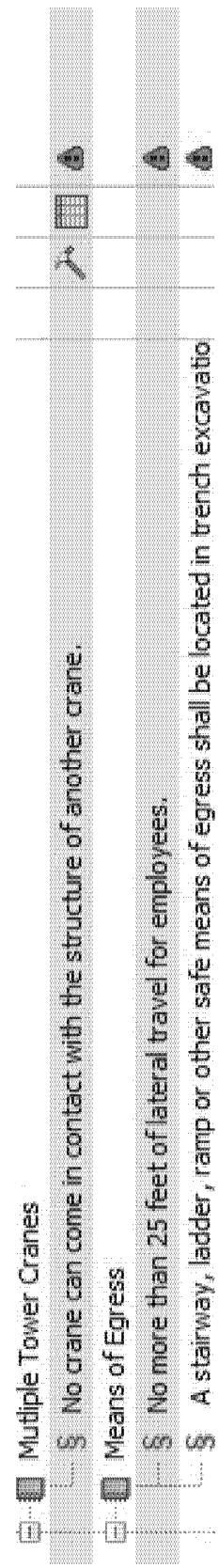
FIG. 26

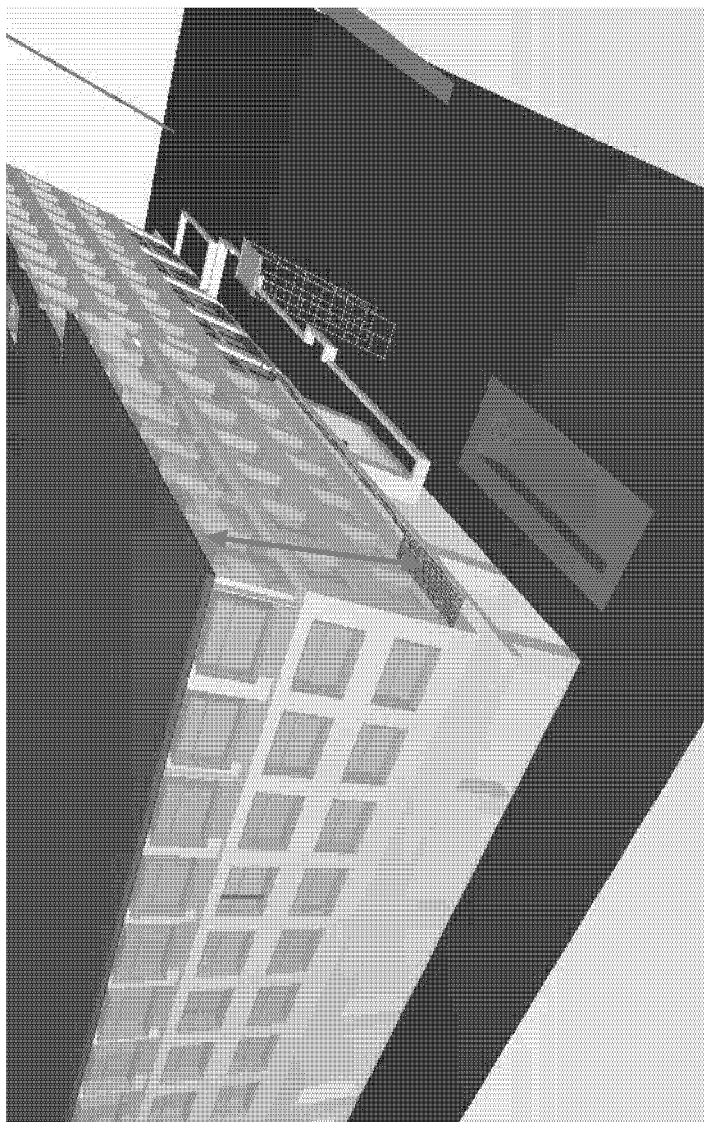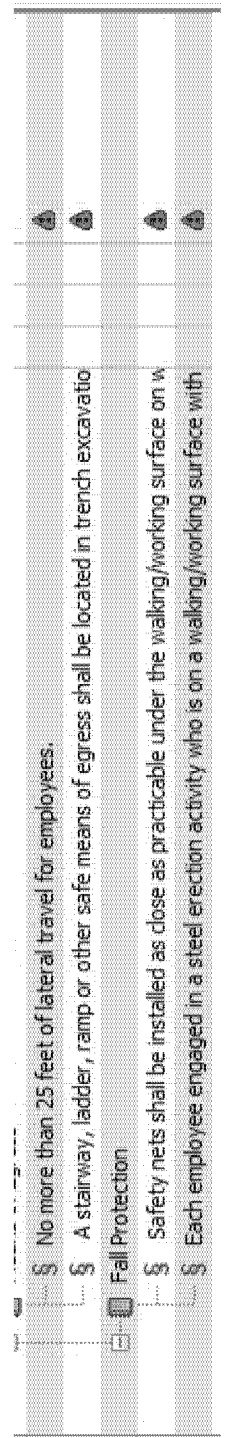
FIG. 27

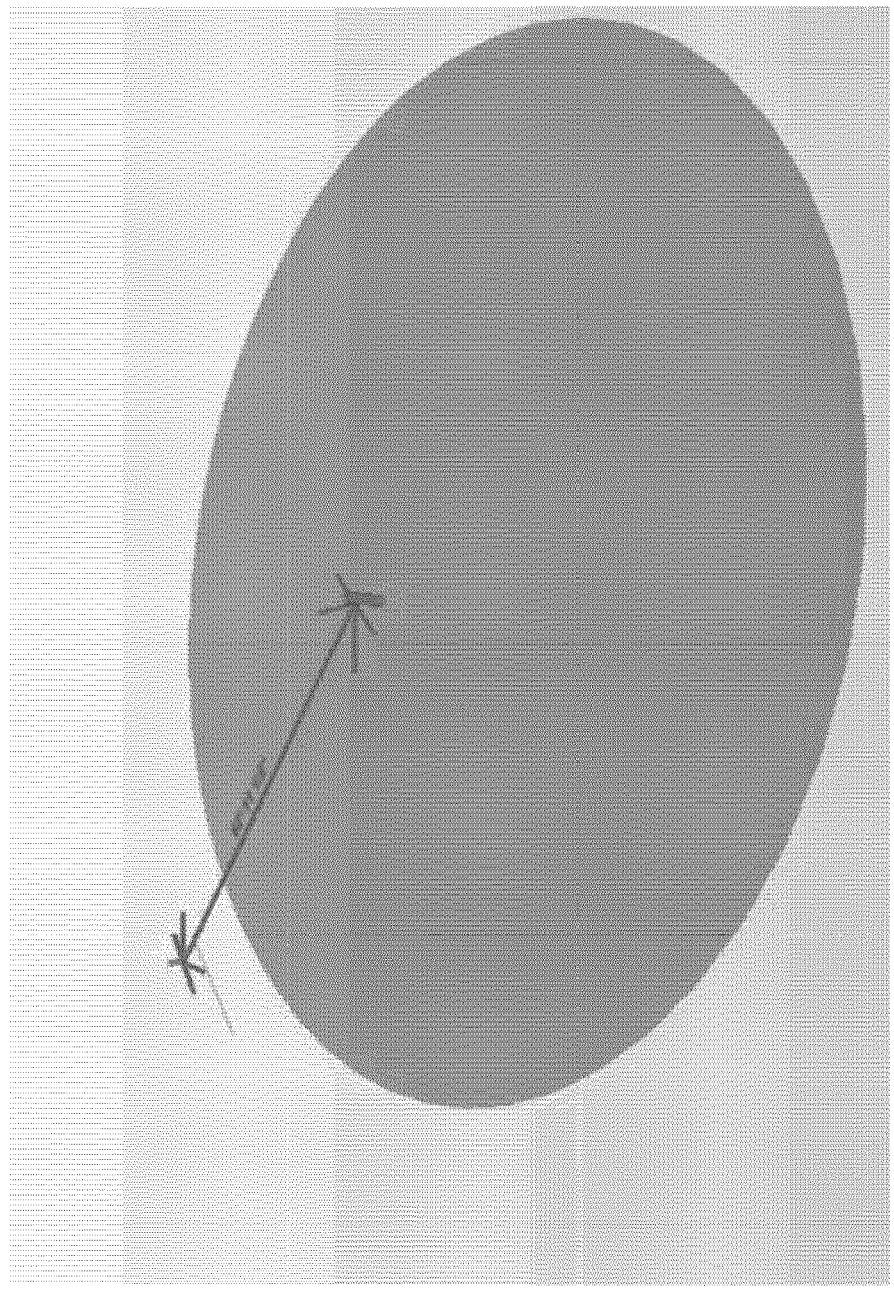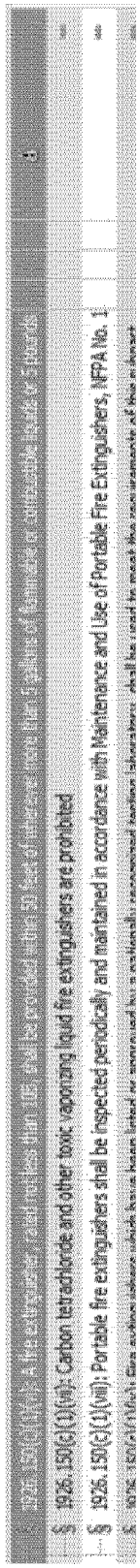
FIG. 33

| SITE ADDRESS ▲ | DATE VISITED ▲ | CLIENT ▲ | CONSULTANT ▲ | STATUS ▲ | | |
|---|---|---|---|---|---|---|
| 111 1st Avenue | 1/15/17 | ABC Constructions | John Doe | | | |
| 321 Main St | 12/10/16 | ABC Constructions | Adam Smith | | | |
| 321 Main St | 7/14/16 | ABC Constructions | Adam Smith | 🔒 | 📄 | |
| 321 Main St | 5/25/16 | XYZ Engineering | John Doe | 🔒 | 📄 | |
| 321 Main St | 1/20/16 | XYZ Engineering | John Doe | 🔒 | 📄 | |
| 111 1st Avenue | 8/15/15 | ABC Constructions | John Doe | 🔒 | 📄 | |
| 111 1st Avenue | 3/20/15 | ABC Constructions | Leslie Johnson | 🔒 | 📄 | |
| 111 1st Avenue | 6/2/14 | ABC Constructions | John Doe | 🔒 | 📄 | |

FIG. 35

SYSTEMS AND METHODS FOR DYNAMIC REAL-TIME ANALYSIS FROM MULTI-MODAL DATA FUSION FOR CONTEXTUAL RISK IDENTIFICATION

CROSS-REFERENCE TO RELATED APPLICATION(S)

This application is a continuation of U.S. application Ser. No. 15/852,472, filed on Dec. 22, 2017, which claims priority benefit of U.S. Provisional Application Ser. No. 62/544,454, filed on Aug. 11, 2017, both of which are hereby incorporated by reference in their entireties.

BACKGROUND

Consultants, such as risk consultants, conduct field surveys of construction work sites to determine whether the site is occupationally safe. Currently, the field surveys conducted inconveniently use very basic tools, such as a pen and writing pad to note down observations, and a camera (e.g., smartphone camera) to take pictures of these observations. This generates a subjective qualitative report from unstructured data collected.

Aside from lack of efficiency in generating these reports, which yields a longer lag time between a site visit and a submitted report, these reports tend to be qualitative in nature and lack quantitative measurements.

Accordingly, there is a need in the art for an improved system that overcomes some of the drawbacks and limitations of conventional approaches.

SUMMARY

One embodiment of the disclosure provides a computing device comprising a camera, a display device, a processor, and a memory, the memory storing instructions that, when executed by the processor, cause the computing device to display information on the display device to generate a report associated with a site location, by performing the steps of: capturing, by the camera, an image of the site location; performing image processing on the image to identify one or more objects in the image; receiving one or more known models of objects at the site location, wherein the one or more known models include a parsed set of regulation information corresponding to safety standards for the one or more known models; identifying an object type for an object identified in image by matching the object to a known model of the one or more known models; applying the parsed set of regulation information against the object based on the object type to determine whether the object is in compliance with the parsed set of regulation information; and, generating a report indicating whether the object complies with the parsed set of regulation information.

Another embodiment of the disclosure provides a method for generating a report associated with a site location, comprising: receiving from a sensor, by a processor included in a computing device over an electronic network, data sensed by the sensor corresponding to the site location; receiving, by the processor, a parsed set of regulation information corresponding to safety standards for the site location; comparing the data sensed by the sensor to the parsed set of regulation information; and, generating, by the processor, a report indicating whether the data sensed by the sensor complies with the parsed set of regulation information.

Another embodiment of the disclosure provides a system comprising a client computing device, a server computing device, and an electronic communications network. The client computing device configured to capture, by the camera included in the client computing device, an image of the site location. The electronic communications network configured to transfer the image of the site location to a server computing device. The server computing device configured to: perform image processing on the image to identify one or more objects in the image; receive one or more known models of objects at the site location, wherein the one or more known models include a parsed set of regulation information corresponding to safety standards for the one or more known models; identify an object type for an object identified in image by matching the object to a known model of the one or more known models; apply the parsed set of regulation information against the object based on the object type to determine whether the object is in compliance with the parsed set of regulation information; and, generate a report indicating whether the object complies with the parsed set of regulation information.

BRIEF DESCRIPTION OF THE DRAWINGS

FIGS. 10-34 illustrate example screenshots of rule sets applied to a model where a violation or compliance was found, according to various embodiments.

FIGS. 35-52 are screenshots of example interface screens of a risk assessment and reporting application on a client device, according to various embodiments.

DETAILED DESCRIPTION

Figure 1:
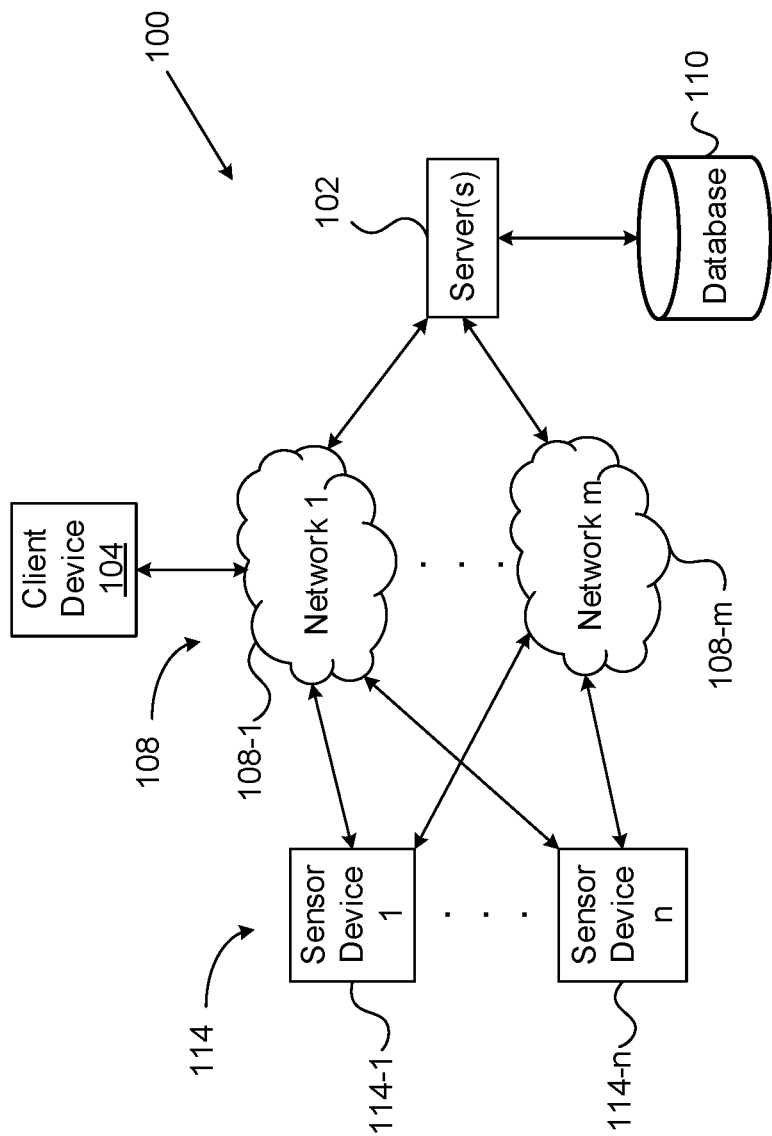
FIG. 1 is a block diagram of a system in accordance with certain embodiments of the disclosure

Embodiments of the disclose provide a system and method to automatically identify property related risks through the use of computer vision, sensors, and/or building information models (BIMs). The ability to automatically identify a variety of hazards helps mitigate the associated risks, and thus reduces the number of accidents or fatalities that would otherwise occur. In some embodiments, a "risk map" can be generated by mapping the identified risks for a given property.

As used herein, "exposure" is the risk of possible loss, "peril" is the cause of property damage or personal injury, "hazard" is a circumstance that tends to increase the probability or severity of a loss, and "risk" is the uncertainty concerning the possibility of loss by a peril for which insurance is pursued.

As an example, in a building construction site, floor openings for a building elevator shaft expose human workers to accidental injuries or fatalities from perils, such as falls. Failure to properly mark and cordon off these openings creates a hazard. This increases the associated risk.

An implementation of the disclosed automated risk map generation system, as described herein, automatically identifies floor openings using a BIM (building information model), and subsequently applies computer vision techniques to identify the hazard, i.e., the lack of safety procedures around these openings, to dynamically update this specific risk within the risk map for the construction site.

In conventional approaches, risk consultants and field engineers visit sites (e.g., commercial properties, personal properties, extractive industries, etc.) for the purposes of understanding and quantifying risks for assets of interest for the insurance and banking industries. In the case of an insurance company, these visits are conducted for underwriting and risk assessment purposes for insurance policies, whereas banks perform similar types of analysis for money lending. The specific risks may vary significantly over the lifecycle of any given property. For example, building constructions risks are different from building operational risks. Risks also change across the various construction phases. From an insurance viewpoint, the exposures include workers, occupants, property infrastructure, and operations based on occupancy type and equipment.

Various risk management solutions, based on industry standards and best practices, are currently employed to address risk. For example, building information systems (BIS) are used to monitor building occupancy health. These systems provide real-time measurements for various issues that may be of concern to building operations (such as environmental air quality exposures, electricity usage, etc.) with alarms that indicate areas of concern. However, these alarms are set to notify the building of an issue for immediate assistance in case of emergency. When dealing with the human factor, risk management heavily relies on enforcing methods and procedures as outlined by various standards bodies, such as OSHA (Occupational Safety and Health Administration) and NIOSH (National Institute for Occupational Safety and Health) or local building codes. This is especially important during the construction phase, when humans are subject to working in potentially hazardous conditions.

The function of a risk consultant or field engineer is to assess overall risk for any given property that includes identification of exposures, perils and hazards, and ensuring that proper risk management solutions are in place (e.g., assessing condition of roof fasteners in high wind locations, reviewing last inspection documents for boilers, for example). The on-site surveys performed by field engineers are currently conducted using very primitive tools comprising a pen and paper for jotting down observations and notes, and a smartphone/camera to capture images. Along with the site manager at a location, the field engineer walks the site location and jots down observations. These observations, together with recommendations, are then formally placed into a report, which is shared with both the site manager as well as other interested stakeholders. Aside from lack of efficiency in the generation of these reports, which yields a longer lag time between a site visit and a submitted report, these reports tend to be very qualitative in nature and lack quantitative measurements.

The disclosed systems and methods provide an automated or semi-automated approach to structured data capture during site visits, automated risk identification, and quantitative report generation via the use of sensor and image data analysis. Additionally, on-site inspection logs, surveillance logs, and videos are widely used, especially in commercial settings. In some embodiments, automating the ingestion and analysis of this additional information allows for performing the risk inspection process in a more comprehensive and cost-effective manner. The disclosed systems and methods can also populate a site "risk map" by applying algorithms to the image and sensor data for detection/recognition of hazardous objects and their contextual behaviors learnt from a priori information. Using data fusion techniques for multi-modal (i.e., from multiple devices) data capture, the disclosed systems and methods generate a dynamically changing temporal risk map for a given location, which can be readily used to guide risk management and underwriting.

The disclosed automatic risk map generation system is a software system that uses captured images of a site location, along with sensor data captured from one or more sensors, to assess the risks and, optionally, to provide a recommendation report of the risks to a site manager. In embodiments where a mobile device is used to collect the images, information about the device's location from the mobile phone GPS system, the camera's orientation from a mobile phone's gyroscope and accelerometer, the time at which the images are taken, and the camera's resolution, image format, and related attributes can also be used.

In embodiments where computer vision is used to detect objects from images, a deep learning system (e.g., a Convolutional Neural Network) is trained on a large number of images and corresponding information about objects in the images. Such a pattern learning method can be used to identify objects in an image.

In some embodiments, when additional information about the site location is available, the additional information can be used to further refine the system's capability to detect objects in images of the site location. For example, the orientation of the camera when used to take images of the site location, as well as its location and time, can also assist the system in carrying out various image processing operations, as will become apparent during the discussion below.

Turning now to the figures, FIG. 1 is a block diagram of a system 100 in accordance with certain embodiments of the disclosure. The system 100 includes a server or cluster of servers 102, one or more client devices 104, one or more networks 108 (labeled 108-1 through 108-*m*), one or more databases 110, and one or more sensor devices 114 (labeled 114-1 to 114-*n*). The client device 104 is communicatively coupled to the sensor devices 114 and/or server 102 via the networks 108.

The client device 104 can be any type of communication device that supports network communication, including a telephone, a mobile phone, a smart phone, a personal computer, a laptop computer, a tablet, a smart watch, a personal digital assistant (PDA), a wearable or embedded digital device(s), a network-connected vehicle, etc. In some embodiments, the client devices 104 can support multiple types of networks. For example, the client devices 104 may have wired or wireless network connectivity using IP (Internet Protocol) or may have mobile network connectivity allowing over cellular and data networks.

The networks 108 may take the form of multiple network topologies. For example, networks 108 comprise wireless and/or wired networks. Networks 108 link the server 102 and the client devices 104, link the server 102 to sensors 114, and/or link the sensors 114 to client devices 104. Networks 108 include infrastructure that support the links necessary for data communication between at least one client device 104, server 102, and/or sensor 114. Networks 108 may include a cell tower, base station, and switching network.

The number and type of sensors 114 can vary based on industry and target site specifics. The sensors 114 may include: wearables sensors related to measuring human risk (e.g., biometrics, posture), portable sensors carried on-person by a risk engineer/consultant (e.g., ambient light/sound and gas sensors), and/or on-site sensors (e.g., water pressure sensor, gas pressure sensor, particulate sensor, light sensor, sound sensor, etc.).

Client devices 104 can be used to capture one or more images of a site location. The images are transmitted over a network 108 to a server 102. Also, sensors 114 can capture data related to the site location and transmit the data to the client device 114 and/or server 102. As described in greater detail herein, the server 102 processes the images and data from the sensors 114 to estimate damage and risk and/or generate a risk map.

Figure 2:
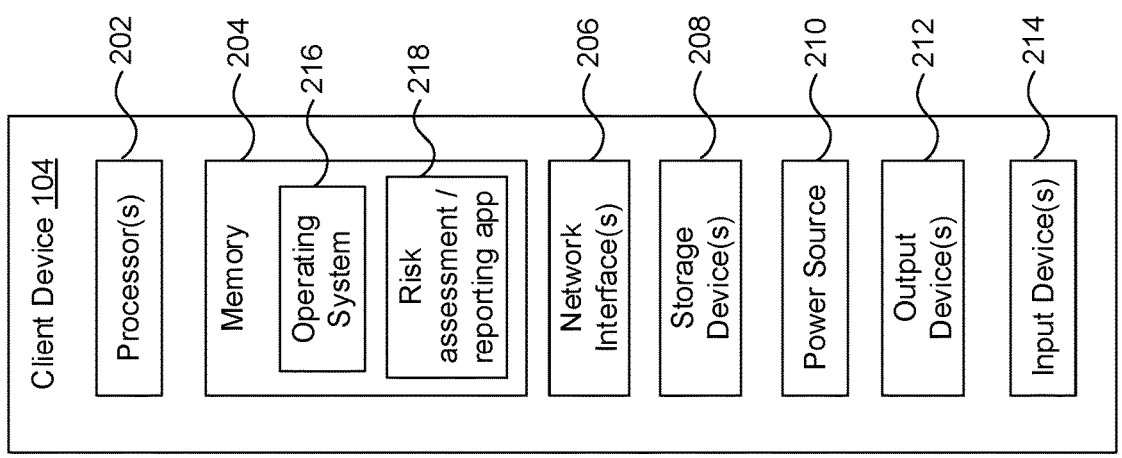
FIG. 2 is a block diagram of basic functional components for a client device according to some aspects of the disclosure.

FIG. 2 is a block diagram of basic functional components for a client device 104 according to some aspects of the disclosure. In the illustrated embodiment of FIG. 2, the client device 104 includes one or more processors 202, memory 204, network interfaces 206, storage devices 208, power source 210, one or more output devices 212, one or more input devices 214, and software modules—operating system 216 and a risk assessment and reporting application 218—stored in memory 204. The software modules are provided as being contained in memory 204, but in certain embodiments, the software modules are contained in storage devices 208 or a combination of memory 204 and storage devices 208. Each of the components including the processor 202, memory 204, network interfaces 206, storage devices 208, power source 210, output devices 212, input devices 214, operating system 216, and application 218 are interconnected physically, communicatively, and/or operatively for inter-component communications.

As illustrated, processor 202 is configured to implement functionality and/or process instructions for execution within client device 104. For example, processor 202 executes instructions stored in memory 204 or instructions stored on a storage device 208. Memory 204, which may be a non-transient, computer-readable storage medium, is configured to store information within client device 104 during operation. In some embodiments, memory 204 includes a temporary memory, an area for information not to be maintained when the client device 104 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some embodiments, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Client device 104 uses network interface 206 to communicate with external devices (e.g., sensors 114) or server(s) 102 via one or more networks 108 (see FIG. 1), and other types of networks through which a communication with the client device 104 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, ZigBee, Z-Wave, and Universal Serial Bus (USB), among others.

Client device 104 includes one or more power sources 210 to provide power to the device. Non-limiting examples of power source 210 include single-use power sources, rechargeable power sources, and/or power sources developed from nickel-cadmium, lithium-ion, or other suitable material.

One or more output devices 212 are also included in client device 104. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 104 includes one or more input devices 214. Input devices 214 are configured to receive input from a user or a surrounding environment of the user through tactile, audio, and/or video feedback. Non-limiting examples of input device 214 include a photo and video camera, presence-sensitive screen, a mouse, a keyboard, a voice responsive system, microphone or any other type of input device. In some examples, a presence-sensitive screen includes a touch-sensitive screen.

The client device 104 includes an operating system 216. The operating system 216 controls operations of the components of the client device 104. For example, the operating system 216 facilitates the interaction of the processor(s) 202, memory 204, network interface 206, storage device(s) 208, input device 214, output device 212, and power source 210.

As described in greater detail herein, the client device 104 uses risk assessment and reporting application 218 to capture one or more images of a site location. In some embodiments, the application 218 may guide a user of the client device 104 in creating and generating a report, as described in greater detail below. In some embodiments, the application 218 may also interface with and receive inputs from a GPS transceiver and/or accelerometer or sensors 114.

Figure 3:
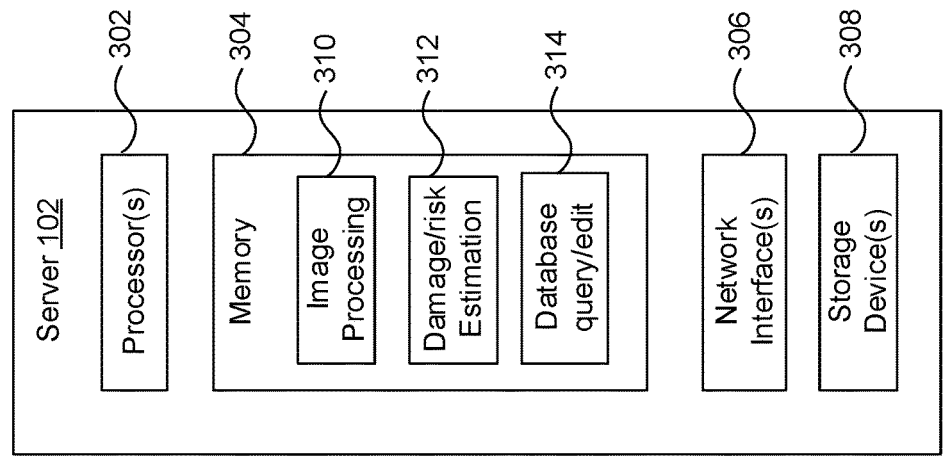
FIG. 3 is a block diagram is shown illustrating components for a server, according to certain aspects of the disclosure.

Turning to FIG. 3, a block diagram is shown illustrating components for a server 102, according to certain aspects of the disclosure. Server 102 includes one or more processors 302, memory 304, network interface(s) 306, storage device(s) 308, and software modules—image processing engine 310, damage/risk estimation engine 312, and database query and edit engine 314—stored in memory 304. The software modules are provided as being stored in memory 304, but in certain embodiments, the software modules are stored in storage devices 308 or a combination of memory 304 and storage devices 308. In certain embodiments, each of the components including the processor(s) 302, memory 304, network interface(s) 306, and storage device(s) 308 are interconnected physically, communicatively, and/or operatively for inter-component communications.

Processor(s) 302, analogous to processor(s) 202 in client device 104, is configured to implement functionality and/or process instructions for execution within the server 102. For example, processor(s) 302 executes instructions stored in memory 304 or instructions stored on storage devices 308. Memory 304, which may be a non-transient, computer-readable storage medium, is configured to store information within server 102 during operation. In some embodiments, memory 304 includes a temporary memory, i.e., an area for information not to be maintained when the server 102 is turned off. Examples of such temporary memory include volatile memories such as random access memories (RAM), dynamic random access memories (DRAM), and static random access memories (SRAM). Memory 304 also maintains program instructions for execution by processor(s) 302.

Server 102 uses network interface(s) 306 to communicate with external devices via one or more networks depicted as networks 108 in FIG. 1. Such networks may also include one or more wireless networks, wired networks, fiber optics networks, and other types of networks through which communication between the server 102 and an external device may be established. Network interface(s) 306 may be a network interface card, such as an Ethernet card, an optical transceiver, a radio frequency transceiver, or any other type of device that can send and receive information.

Storage devices 308 in server 102 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, resistive memories, or forms of electrically programmable memories (EPROM) or electrically erasable and programmable (EEPROM) memories.

Server 102 further includes instructions that implement an image processing engine 310 that receives images of a site location from one or more client devices 104 and performs image processing on the images, for example, to identify objects in the image and their location or orientation. Server 102 further includes instructions that implement a damage/risk estimation engine 312 that receives the images processed by the image processing engine 310 and, in conjunction with a database query and edit engine 314 that has access to a database 110 storing, for example, parsed rules and regulations, calculates a risk assessment for the site location.

Figure 4:
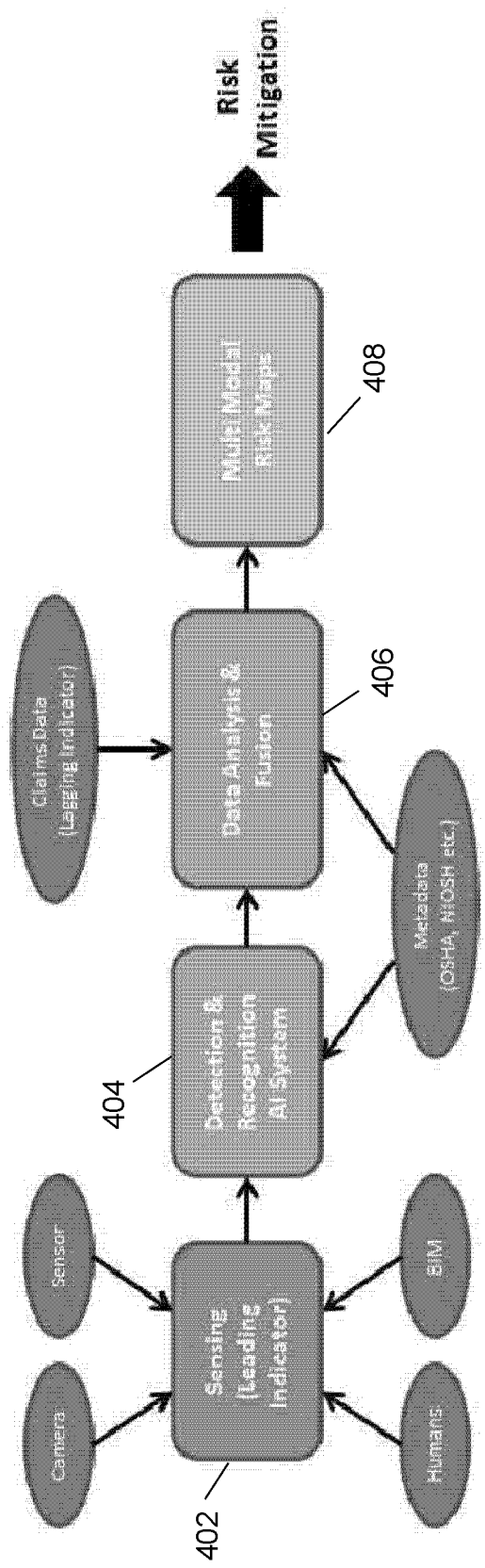
FIG. 4 below illustrates an overall block diagram of the functions of the disclosed risk assessment system, according to one embodiment.

FIG. 4 below illustrates an overall block diagram of the functions of the disclosed risk assessment system, according to one embodiment. A data capture/sensing function 402 collects multi-modal data (i.e., from various devices, such as a camera, sensors, human input, or BIM (building information mode) related to site conditions and operations using a mix of manual and automated methods. The collected data is processed through artificial intelligent (AI) systems 404, which may also receive other data, such as parsed compliance regulations, as explained below. Data fusion module 406 received the data processed by the AI systems 404 and generates risk maps 408. The data fusion module 406 can also receive other data, such as parsed compliance regulations and claims data, as explained below.

In one implementation, a mobile device, such as a tablet computer, is used as a data capturing agent, which can interface with other sensors or IoT (Internet of Things) networks using low power Bluetooth (BLE), WiFi, or ZigBee to capture information on ambient sound levels, light conditions, and gas level in the environment from one or more sensors, for example. Additionally, visual sensing may be performed using image/video data from the integrated cameras of the data capturing agent to detect other violations, such as hard hat or safety goggle violations.

The collected raw data streams are processed using pre-trained models (e.g., machine learning techniques) to extract relevant features that are used to identify hazards and estimate risk. All this information, along with associated spatio-temporal context and metadata, is assembled to create and update the site risk map 408. For example, raw microphone readings may be processed to estimate the ambient decibel sound level, and subsequently applied to OSHA standards to determine if the nearby human workers are required to wear protective sound gear. Together with visual sensing, violations may be detected, which in-turn escalates the issue on the site risk map 408.

In one implementation, risk maps 408 are a unified representation of all the risk events collected over time for a particular site location. The risk map 408 documents the evolution of various types of recorded risks over time. Statistical analysis provides insights into areas of concern and effectiveness of on-site risk management practices.

Storing the risk event data in structured form in the risk map 408 enables powerful analytics when combined with additional data, such as claims data. As mentioned, historical claims data analysis provide insights into frequency and severity aspects for various hazards. Joint analysis of the event data and the claims data therefore leads to improved understanding of risk, which in turn leads to more effective risk mitigation solutions.

In one implementation, a risk map 408 is generated in the form of a PDF report. A report comprises written assessments, as well as quantitative measurements provided by the various computer vision and sensor capabilities. In some implementations, image and still video shots depicting risk are placed in the report, with bounding boxes identifying the potential hazards with tagged text explaining the observations, and potential recommendations to remediate the issues.

Also, in some embodiments, multi-sensor data fusion can be used to combine information from several sources in order to provide unified information about a given risk. Generally, performing data fusion has several advantages. These advantages involve enhancements in data authenticity or availability. Examples of enhancing data authenticity include improved detection, confidence, and reliability, as well as reduction in data ambiguity. Examples of enhancements in data availability include extending spatial and temporal coverage.

In one implementation, the system fuses multi-modal data, such as risk information from a camera, data from other sensors, and BIM models, etc. Additionally, some embodiments can combine the observational data (that acts as leading indicator) together with claims data (a lagging indicator) to obtain a real-time risk assessment.

According to various embodiments, the sensors do not have to be physically integrated with a data collection agent (e.g., tablet computer), due to tethering via wireless technologies. In fact, it is possible that the collection agent communicates with sensing equipment located on-site for more comprehensive data collection. Visual modalities include 2D, 3D, infrared, and multispectral imagery/video from regular, hyperspectral, and LIDAR cameras. The list of modalities connected to sensors/IoT is vast, and the above are merely examples.

In some embodiments, the site characteristics and associated risk context determine the actual set of modalities to be captured. This can be provided in the form of a user interface guide on the data collection agent. Similarly, the data collection agent can be chosen from a wide array of currently available devices such as smartphones, tablets, or even advanced wearables, such as smart glasses. Additional data collection agents could include aerial imagery, such as drones.

By utilizing prior data collected, an end user (e.g., risk engineer) is able to perform analytics for the given site location to determine claims that have been filed since the last site visit. This information helps the end user to identify key risk areas that are of interest during a site visit for a given site location. Further, the ability to map the collected information (i.e., leading indicators) to available claims data (i.e., lagging indicator) provides for powerful predictive analytics that enables precise preventive action.

Figure 5:
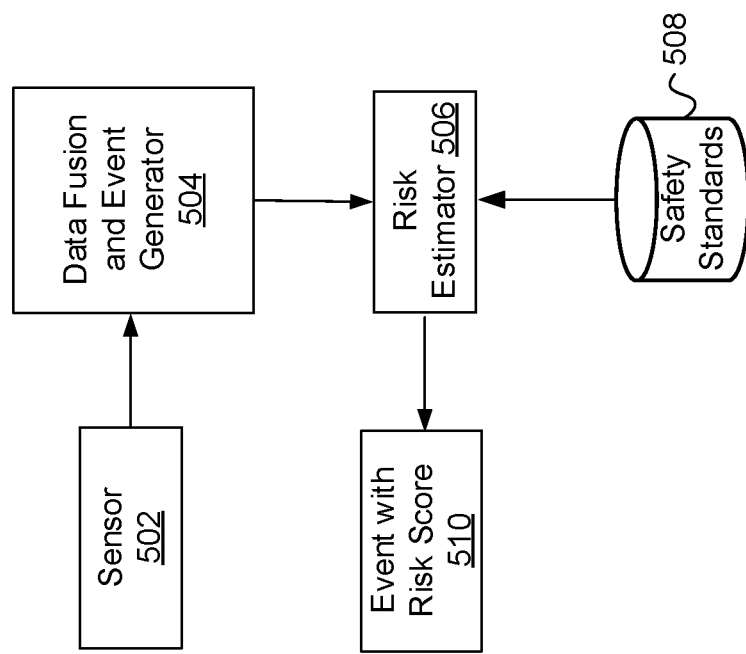
FIG. 5 is a block diagram of a sensor used to quantifiably identify risks at a site location, according to one embodiment.

FIG. 5 is a block diagram of a sensor used to quantifiably identify risks at a site location, according to one embodiment. A sensor 502 captures one or more pieces of data about a site location. In one implementation, the sensor 502 can be incorporated into a data collection agent (e.g., tablet computer), such as a connected light sensor or integrated microphone. In another implementation, the sensor 502 is a stand-alone sensor device.

In some embodiments, raw data feeds from sensor 502 are processed using specialized algorithms to generate usable measurements, based on the specific modality and application. For example, an integrated microphone is used to identify ambient sound levels to determine safety for humans present in the surroundings. The human ear responds more to frequencies between 500 Hz and 8 kHz, and is less sensitive to very low-pitch or high-pitch noises. The frequency weightings used in sound level meters are often related to the response of the human ear, to ensure that the meter is measuring what a person could actually hear. The most common weighting that is used in noise measurement is A-weighting. Like the human ear, A-weighting effectively cuts off the lower and higher frequencies that the average person cannot hear. The frequency response is defined in the sound level meter standards (e.g., IEC 60651, IEC 60804, IEC 61672, ANSI S1.4).

Also, given that no sensor is going to be identical, and that the physical characteristics can even change over time for the same sensor, the sensor can be periodically calibrated so that the measurements are accurate. This may include adjusting one or more bias parameters. For microphones, an external calibrator can be used to estimate the bias parameters by sampling over different sound levels.

Although just one sensor is shown in FIG. 5, it should be understood that multiple sensors can be used. Sensor event streams from the one or more sensors are fed into a data fusion and event generator 504, which receives data streams from the one or more sensors and generates an unified multi-modal event stream. The multi-modal event stream can be used to identify hazards that use a combination of events to occur. The unified multi-modal event stream is then processed by a risk estimator module 506, which applies risk models (e.g., OSHA standards on ambient sound levels in work environments) to compute a risk score 510. Standards and governing bodies, such as OSHA and NIOSH or local building codes may provide operational standards/ guidelines 508, such as the limits on ambient temperature for construction sites involving human workers. These are codified as rules/models to provide risk estimates for the measured events. In some embodiments, the operational standards/guidelines 508 can be parsed by the risk estimator 506 or other software module, to automatically generate the rules against which the sensor data is compared to generate the risk score 510, as described below.

In some embodiments, historical claims data analysis could also be used by the risk estimator 506 to provide frequency and severity information for different types of hazards. Using this information by the risk estimator 506 could yield more accurate and up-to-date estimates of risk.

The event and risk score 510 can also be fused together with event streams from other non-sensor sources (e.g., image analysis, described below) to jointly update a risk map for the site.

Figure 6:
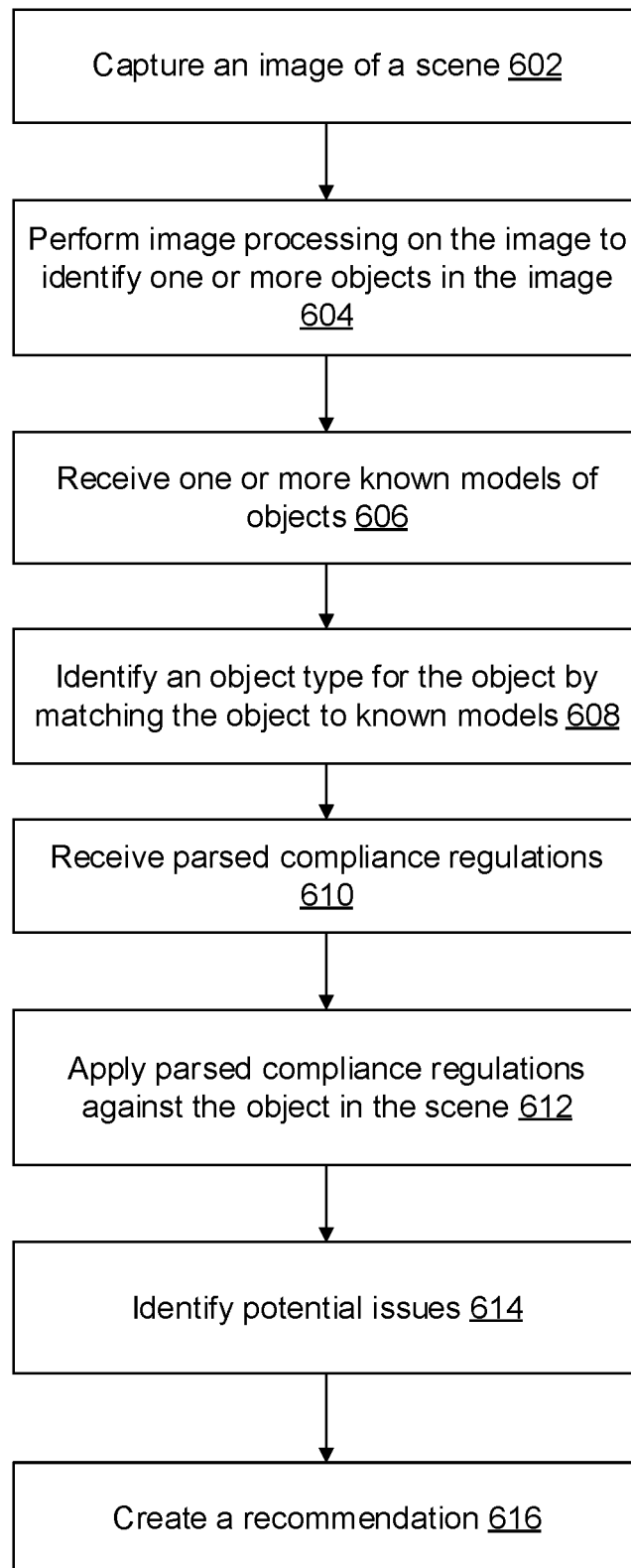
FIG. 6 is a flow diagram of method steps for analyzing one or more images to compute a risk recommendation, according to one embodiment.

FIG. 6 is a flow diagram of method steps for analyzing one or more images to compute a risk recommendation, according to one embodiment. As shown, the method begins at step 602, where a client device (or sensor) captures one or more images of a scene. For example, the scene may be at a construction site. In some embodiments, the images may include additional metadata, such as GPS location. The image capture can be done through various options based on the use case. Some examples include: a statically mounted camera similar to surveillance camera, a camera-equipped mobile device that a risk inspector carries, and/or more advanced wearable visual technologies, like a head-mounted camera, or a wearable device, like smart glasses or a vest-mounted camera.

At step 604, the processor performs image processing on the image to identify one or more objects in the image. The processor can be located in a server, e.g., server 102, and/or client device 104. Various techniques can be used for object detection, including CNNs, as described below.

In the context of a construction site, the construction site is an amalgamation of various types of objects and their semantic relationships. Object detection and recognition methodologies can be deployed to leverage machine learning technique, known as deep learning, to realize the object detection and recognition algorithms, and combine these results with contextual and semantic information at the scene level to derive visual risks that are correlated to OSHA standards. Since there can be tens of thousands of objects present in a construction zone, some embodiments can prioritize the list of objects that are frequently responsible for severe injuries. Embodiments can make use of the past claims data to identify the most frequent and severe causes of hazardous objects and develop deep learning methods to identify them using images and videos. In some cases, the claims data may be unstructured, so a text analytics platform can be used to extract information from the past claims that is relevant.

At step 606, the processor receives one or more known models of objects at the site location. In one implementation, the known models may be BIM models (building information models).

At step 608, the processor identifies an object type for the object (i.e., the object identified in the image) by matching the object to a known models. For example, the processor may attempt to align the object with the various known models of objects for a match, e.g., using edge analysis.

At step 610, the processor receive parsed compliance regulations. Compliance regulations, such OSHA regulations, can be parsed manually or automatically, as described in greater detail below, to generate parsed compliance regulations. The parsed compliance regulations may be in the form of logic rules to be processed by the processor.

At step 612, the processor applies the parsed compliance regulations against the object identified in the image based on its location the scene and the known model. At step 614, the processor identifies potential issues based on whether the object is in compliance with the parsed compliance regulations. At step 616, the processor can create a recommendation based on identifying potential issues.

Additional details and examples are provided below in FIG. 7.

Building Information Models (BIMs)

Some embodiments of the disclosure leverage building information models (BIMs) for proactive checking of safety requirements of upcoming activities by representing safety requirements from standard sources like OSHA, NIOSH, etc. as rules to be checked. A regulation (e.g., "OSHA 1926 regulation") includes sections that contain narratives that can be automatically checked in a BIM. These narratives in OSHA can be converted to computer-interpretable rule sets. During this process, the narrative is decomposed into simpler rules to decrease the complexity. Then, these simple rules are converted into machine-readable rule sets in the form of pseudo codes. The next step is to select a data standard to represent safety requirements in BIM and the examination of off-the-shelf applications related to BIM. One example implementation leverages industry foundation classes (IFCs) to link a BIM's safety requirements. The IFC schema helps to streamline the process of converting models generated in any BIM authoring tool to a generic data format.

In these implementations, an off-the-shelf model checking tool can be used to link models with construction safety rules. Model checking tools are mainly used in the industry at the design phase of projects to check if a given design complies with the design codes, such as International Building Code (IBC), International Energy Conservation Code (IECC), and International Fire Code (IFC), etc. Requirements are set in these codes with which any given building should comply. Model checking tools provide libraries to check BIMs against such design codes. They can be leveraged to support phase-based safety requirements checking using BIM, given that the safety requirements are represented as proper rulesets which we have already done for the identified OSHA rules.

Figure 7:
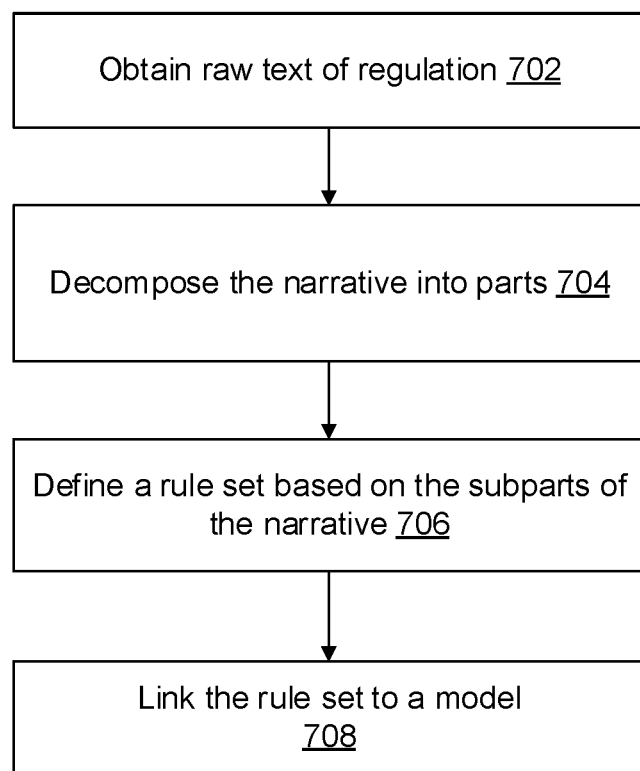
FIG. 7 is a flow diagram illustrating parsing compliance regulations and linking them to an object model, according to one embodiment.

FIG. 7 is a flow diagram illustrating parsing compliance regulations and linking them to an object model, according to one embodiment. Due to the one-of-a-type nature of construction projects, which may involve setting up of unique production sites, the construction industry uses stringent requirements for safety of the workforce and the general public around the job site. Although there are various federal (e.g., OSHA) and local safety regulations (e.g., NYC Department of Buildings codes) to keep construction sites safe and incident free. Within the current practice, the requirements listed in these regulations are kept track within document-based safety plans. The challenge is the large number of safety requirements in these regulations that the job sites should comply with. Given this, manual approach of tracking whether these requirements are within safety plans and then having them proactively implemented at job sites is ineffective, contributing to omissions and accidents/incidents. As such, an automatic approach is disclosed herein. For illustrative purposes, OSHA regulation 1926 is used as an example.

At step 702, a processor obtains raw text of a regulation. The text of a regulation can be obtained, for example, from a database or website that stores the latest regulations.

At step 704, the processor decomposes the narrative into subparts. In OSHA terminology, a "subpart" is a major category of the safety requirement, and a "section" refers to the individual sub divisions listed under a "subpart." A "narrative" refers to the safety requirement(s) listed under a given section. Table 1 below shows a breakdown of OSHA 1926 into Subparts and their scope.

TABLE 1

OSHA 1926 Subparts and their scope
OSHA 1926

| Subpart number | Name | Number of Sections & Scope |
|---|---|---|
| Subpart A | General | 6 sections (§1926.1-§1926.6), Contains narratives for the purpose of 1926 regulation. E.g., 1926.3: Inspection-right of entry. |
| Subpart B | General Interpretations | 7 sections (§1926.10-§1926.16), Contains narratives for the scope of each subpart. E.g., 1926.13 Interpretation of statutory terms. |
| Subpart C | General Safety and Health Provisions | 15 sections (§1926.20-§1926.30, §1926.32-§1926.35), Contains narratives for provisions related to safety such as training, first aid, fire protection, and emergency plans. E.g., 1926.23 First aid and medical attention. |
| Subpart D | Occupational Health and Environmental Controls | 16 sections (§1926.50-§1926.62, §1926.64-§1926.66), Contains narratives for provisions related to occupational health and environmental controls such as sanitation, occupational noise exposure, illumination, and ventilation. E.g., 1926.51 Sanitation. |
| Subpart E | Personal Protective and Life Saving Equipment | 12 sections (§1926.95-§1926.98, §1926.100-§1926.107), Contains narratives for provisions related to personal protective and lifesaving equipment such as head protection, hearing protection, safety belts, and safety nets. E.g., 1926.105 Safety |
| Subpart F | Fire Protection and Prevention | 6 sections (§1926.150-§1926.155), Contains narratives for provisions related to fire protection and prevention. E.g.,1926.150 Fire protection. |
| Subpart G | Signs, Signals, and Barricades | 4 sections (§1926.200-§1926.203), Contains narratives for provisions related to signs, signals, and barricades. E.g., 1926.200 Accident prevention signs and tags. |
| Subpart H | Materials Handling, Storage, Use, and Disposal | 3 sections (§1926.250-§1926.252), Contains narratives for provisions related to General requirements for storage, Rigging equipment for material handling and Disposal of waste materials. E.g., 1926.252 Disposal of waste materials. |

TABLE 1-continued

OSHA 1926 Subparts and their scope
OSHA 1926

| Subpart number | Name | Number of Sections & Scope |
|---|---|---|
| Subpart I | Tools - Hand and Power | 8 sections (§1926.300-§1926.307), Contains narratives for provisions related to Hand tools and Power-operated hand tools. E.g., 1926.301 Hand tools. |
| Subpart J | Welding and Cutting | 5 sections (§1926.350-§1926.354), Contains narratives for provisions related to Welding and Cutting. E.g., 1926.352 Fire prevention. |
| Subpart K | Electrical | 450 sections (§1926.400-§1926.449), Contains narratives for electrical safety requirements that are necessary for the practical safeguarding of employees involved in construction work. E.g., 1926.404 Wiring design and protection. |
| Subpart L | Scaffolds | 5 sections, Appendices A-E(non-mandatory) (§1926.450-§1926.454), Contains narratives that apply to all scaffolds used in workplaces covered by this part. It does not apply to crane or derrick suspended personnel platforms. E.g., 1926.452 Additional requirements applicable to specific types of scaffolds. |
| Subpart M | Fall Protection | 4 sections, Appendices A-E (§1926.500-§1926.503), Contains narratives for fall protection in construction workplaces covered under 29 CFR part 1926. E.g., 1926.502 Fall protection systems criteria and practices. |
| Subpart N | Helicopters, Hoists, Elevators, and Conveyors | 6 sections (§1926.550-§1926.555), Contains narratives for provisions related to helicopters, hoists, elevators, and conveyors. E.g., 1926.553 Base-mounted drum hoists. |
| Subpart O | Motor Vehicles, Mechanized Equipment, and Marine Operations | 7 sections (§1926.600-§1926.606), Contains narratives for provisions related to motor vehicles, mechanized equipment, and marine operations. E.g., 1926.602 Material handling equipment. |
| Subpart P | Excavations | 3 sections, Appendices A-F (§1926.650-§1926.652), Contains narratives that apply to all open excavations made in the earth's surface. Excavations are defined to include trenches. E.g. 1926.652 Requirements for protective systems. |
| Subpart Q | Concrete and Masonry Construction | 7 sections, Appendix A (§1926.700-§1926.706), Contains narratives to protect all construction employees from the hazards associated with concrete and masonry construction operations performed in workplaces covered under 29 CFR Part 1926. E.g., 1926.703 Requirements for cast-in-place concrete. |
| Subpart R | Steel Erection | 12 sections, Appendices A-H (§1926.750-§1926.761), Contains narratives to protect employees from the hazards associated with steel erection activities involved in the construction, alteration, and/or repair of single and multi-story buildings, bridges, and other structures where steel erection occurs. E.g. 1926.754 Structural steel assembly. |
| Subpart S | Underground Construction, Caissons, Cofferdams, and Compressed Air | 5 sections, Appendix A (§1926.800-§1926.804), Contains narratives for provisions related to underground construction, caissons, cofferdams, and compressed air. E.g., 1926.801 Caissons. |
| Subpart T | Demolition | 11 sections (§1926.850-§1926.860), Contains narratives for provisions related to demolition activities. E.g., 1926.853 Removal of materials through floor openings. |
| Subpart U | Blasting and the Use of Explosives | 15 sections (§1926.900-§1926.914), Contains narratives for provisions related to blasting and use of explosives. E.g., 1926.910 Inspection after blasting. |
| Subpart V | Electric Power Transmission and Distribution | 19 sections, Appendices A-G (§1926.950-§1926.968), Contains narratives for construction of electric power transmission and distribution lines and equipment. E.g., 1926.956 Hand and portable power equipment. |
| Subpart W | Rollover Protective Structures; Overhead Protection | 4 sections, Appendix A (§1926.1000-§1926.1003), Contains narratives for provisions related to rollover protective structures. E.g. 1926.1002 Protective frames (roll-over protective structures, known as ROPS) for wheel-type agricultural and industrial tractors used in construction. |
| Subpart X | Stairways and Ladders | 11 sections, Appendix A (§1926.1050-§1926.1060), Contains narratives for stairways and ladders used in construction, alteration, repair (including painting and decorating), and demolition workplaces covered under 29 CFR part 1926, and also sets forth, in specified circumstances, when ladders and stairways are required to be provided. E.g., 1926.1052 Stairways. |
| Subpart Y | Commercial Diving Operations | 13 sections, Appendices A-B (§1926.1071, §1926.1072, §1926.1076, §1926.1080-§1926.1083, §1926.1084-§1926.1087, §1926.1090, §1926.1091), Contains narratives for provisions related to commercial diving operations. E.g., 1926.1076 Qualifications of dive team. |

TABLE 1-continued

OSHA 1926 Subparts and their scope
OSHA 1926

| Subpart number | Name | Number of Sections & Scope |
|---|---|---|
| Subpart Z | Toxic and Hazardous Substances | 29 sections (§1926.1100-§1926.1118, §1926.1126-§1926.1129, §1926.1144, §1926.1145, §1926.1147, §1926.1148, §1926.1152, §1926.1153) Contains narratives for provisions related to toxic and hazardous substances such as asbestos, benzidine, and vinyl chloride. E.g., 1926.1127 Cadmium, 1926.1128 Benzene. |
| Subpart AA | Confined Spaces in Construction | 14 sections (§1926.1200-§1926.1213), Contains narratives for practices and procedures to protect employees engaged in construction activities at a worksite with one or more confined spaces. E.g., 1926.1204 Permit-required confined space program. |
| Subpart BB | [Reserved] | [Reserved] |
| Subpart CC | Cranes & Derricks in Construction | 43 sections, Appendices A-C (§1926.1400-§1926.1442), Contains narratives for power-operated equipment, when used in construction, that can hoist, lower and horizontally move a suspended load. E.g., 1926.1438 Overhead & gantry cranes, 1926.1439 Dedicated pile drivers. |

At step 706, the processor defines a rule set based on the subparts of the narrative.

Continuing with the example above, analysis of the OSHA 1926 subparts listed in Table 1 results in identification of one hundred five (105) sections that include safety requirements that can be automatically checked, including components mentioned in these safety requirements.

Each subpart narrative cab be simplified by decomposing the subpart narrative to simple rule sets that contain logical relationships. In the process of narrative conversion, the capability of the model checking tool's build-in rules can be considered so that the rules could be implemented in the selected environment. Table 2 provides examples of the narratives converted into rule sets.

TABLE 2

Examples from OSHA1926 narratives that were converted to rulesets

| 1926.502 | Fall protection systems criteria and practices | Applicable Rules#1 in Pseudo Code | Applicable Rules#2 in Pseudo Code |
|---|---|---|---|
| 1926.502 (b)(1) | Top edge height of top rails, or equivalent guardrail system members, shall be 42 inches (1.1 m) plus or minus 3 inches (8 cm) above the walking/working level. When conditions warrant, the height of the top edge may exceed the 45-inch height, provided the guardrail system meets all other criteria of this paragraph. Note: When employees are using stilts, the top edge height of the top rail, or equivalent member, shall be increased an amount equal to the height of the stilts. | 39"=<Height( component Type="Guard Rail") AND Height(componentType ="GuardRail") =<45" | |
| 1926.502 (b)(9) | Top rails and midrails shall be at least one- quarter inch (0.6 cm) nominal diameter or thickness to prevent cuts and lacerations. If wire rope is used for top rails, it shall be flagged at not more than 6-foot intervals with high-visibility | If the model contains componentType="Railings" then Diameter (component Type=("Top-rail" and "Mid-rail"))>= ¼ " | |
| 1926.502 (b)(11) | When guardrail systems are used at holes, they shall be erected on all unprotected sides or edges of the hole. | The component type "Guard Rail" shall touch the "Opening" on all unprotected sides | Comment |
| 1926.502 (b)(14) | Guardrail systems used on ramps and runways shall be erected along each unprotected side or edge. | If distance between componentType ="Guard Rail" and componentType =" Ramp" ≠ 0 then show comment:"Guardrail systems used on ramps and runways shall be erected along each unprotected side or edge" | Comment |
| 1926.502 (c)(1) | Safety nets shall be installed as close as practicable under the walking/working surface on which employees are working, but in no case more than 30 feet (9.1 m) below such level. When nets are used on bridges, the potential fall area from the walking/working surface to the net shall be unobstructed. | MAX distance BETWEEN componentType="Safety Net" AND componentType ="Walking/Working Surface" = 30' | |

TABLE 2-continued

Examples from OSHA1926 narratives that were converted to rulesets

| 1926.502 | Fall protection systems criteria and practices | Applicable Rules#1 in Pseudo Code | Applicable Rules#2 in Pseudo Code |
|---|---|---|---|
| 1926.502 (c)(7) | The maximum size of each safety net mesh opening shall not exceed 36 square inches (230 cm) nor be longer than 6 inches (15 cm) on any side, and the opening, measured center-to-center of mesh ropes or webbing, shall not be longer than 6 inches (15 cm). All mesh crossings shall be secured to prevent enlargement of the | MAX Mesh Opening Dimension(component Type= "Safety Net") =6" | |
| 1926.502 (j)(3) | Toe boards shall be a minimum of 3½ inches (9 cm) in vertical height from their top edge to the level of the walking/working surface. They shall have not more than ¼ inch (0.6 cm) clearance above the walking/working surface. They shall be solid or have openings not over 1 inch (2.5 cm) in greatest dimension. | Height(componentType ="Toe boards" )>= 3½" MAX clearance = ¼" | Distance between componentType="Toe boards" AND componentType="Walking/Working Surface"=0 |

At step 708, the processor links the rule set to a model. For example, model may be in an interoperable format, such a BIM (building information model). A BIM model may include various types of components, such as structural columns, beams, slabs, architectural components including windows, doors, sun shades, stairs, and an exterior enclosure, for example.

In a given BIM, there are components that belong to individual disciplines, such as architecture, mechanical, electrical, plumbing, fire protection, structural, etc. BIM models typically contain major components that are permanently installed, as well as components that are required for connecting systems and assemblies.

Table 3 shows the types of components that are typically available in a model from each trade (e.g., architectural, structural, mechanical, electrical, etc.), and the types of components that are used in OSHA narratives (e.g., temporary structures such as scaffolding, trenching), and the mapping of these components. Temporary structures are not always available in a design model, however are part of construction models if generated by the general contractor.

TABLE 3

Typical component types mentioned in OSHA narratives

| Category | Components mentioned in OSHA narratives | Are they typical to see in design models? |
|---|---|---|
| Architectural | Walls | Yes |
| Architectural | Doors (Door openings) | Yes |
| Architectural | Stairs | Yes |
| Structural | Slabs (working deck) | Yes |
| Structural | Openings | Yes |
| Structural | Reshores | No |
| Temporary Equipment | Crane | Yes |
| | Energized equipment | No |
| | Scaffolding | Yes |
| | Ladders | No |
| | Ramp | No |
| | Trenches | Yes |
| Temporary Components for Material Handling and Storage | Portable tanks | No |
| | Container for disposal material | No |
| | Storage cabinets | No |
| | Material stored inside buildings | No |
| Temporary Mechanical Fall Protection | Exhaust piping | No |
| | Coverage of holes and openings | No |
| | Safety Net | No |
| | Guardrails | No |
| | Barricade | No |
| | Toe board | No |
| Fire Protection | Fire extinguisher | No |
| | Combustible materials | No |

Figure 8:
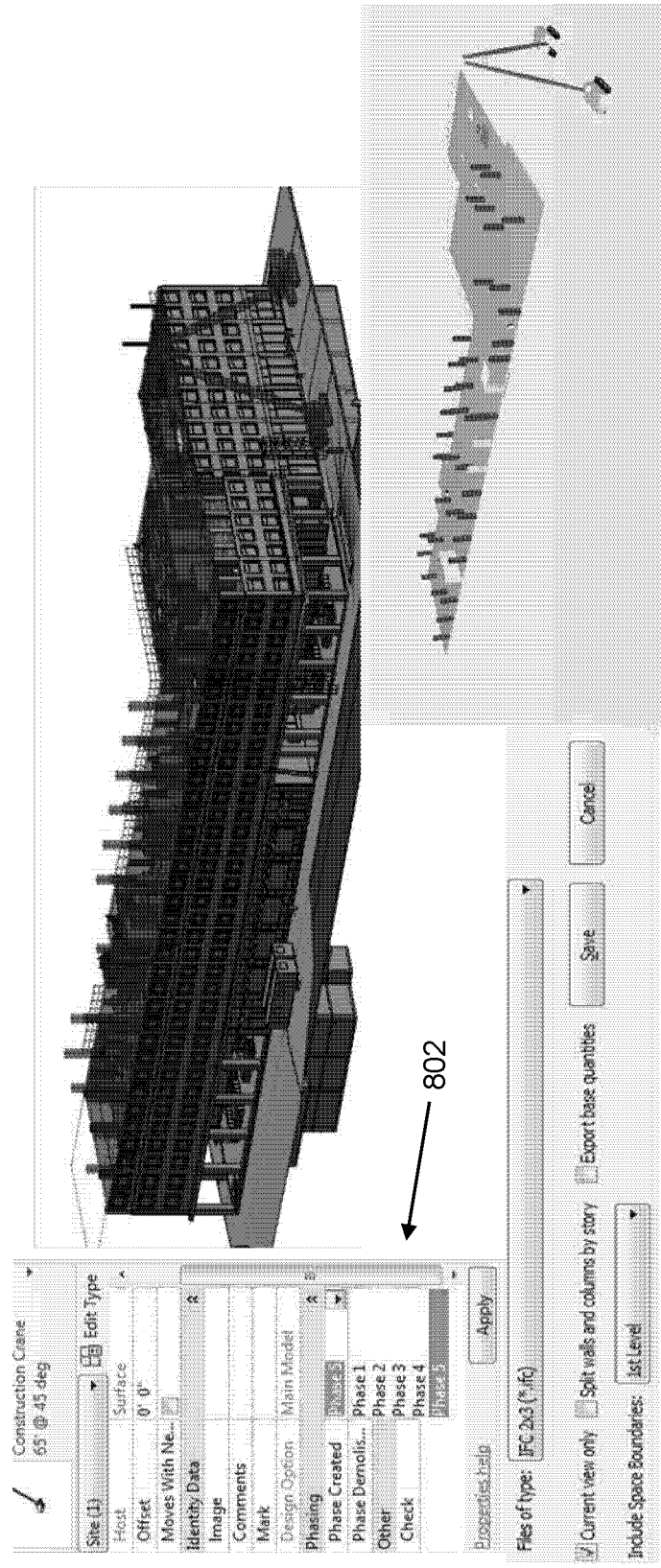
FIG. 8 is an example 3D model of a building under construction, in one embodiment.

FIG. 8 is an example 3D model of a building under construction, in one embodiment. In some embodiments, construction phases are applied to the components. Based on the construction schedule, different construction phases 802 could be applied to the building components to relate them to the timeline of the project. There may be pre-defined construction phases in the model authoring tool (e.g., Existing, Demolished, New, and Temporary). Additional construction phases could also be defined and assigned to the model.

In one implementation, construction phase filters could be used to control the visual representations of the components. The filtered phase components are exported to a model checking environment, for example using the IFC (Industry Foundation Classes) file format.

Figure 9:
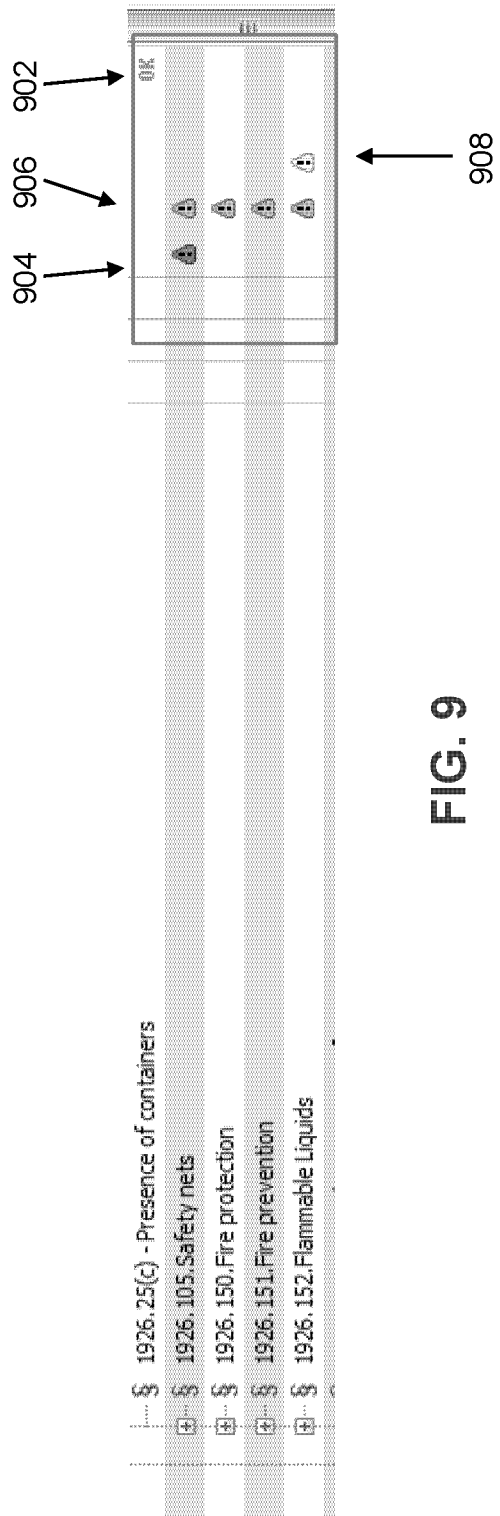
FIG. 9 is an example of the results of applying rule sets against a model, in one embodiment.

In some embodiments, the model can be compared against the rule sets. FIG. 9 is an example of the results of applying rule sets against a model, in one embodiment. If the safety rules that are checked in the model (e.g., BIM model) are implemented correctly in the BIM, the result can be highlighted as a green "OK" mark. For each violated rule set, however, the application utilizes icons in different colors to define their severity. Depending on the degree of severity of the selected rule, the validation tool applies red (highly critical) 904, orange (moderate criticality) 906, and yellow (less critical) 908 triangular warnings to the rule checking window. As described above, images from the actual site location can also be analyzed and compared against the rule in combination with the known BIM model.

FIGS. 10-34 illustrate example screenshots of rule sets applied to a model where a violation or compliance was found, according to various embodiments. Each example screenshot provides a 3D view from the BIM model that highlights the components violating the rule set in a red color, or complying with the ruleset in a green color (e.g., FIG. 11). Each figure also lists the corresponding rule set(s) that were analyzed.

Figure 10:
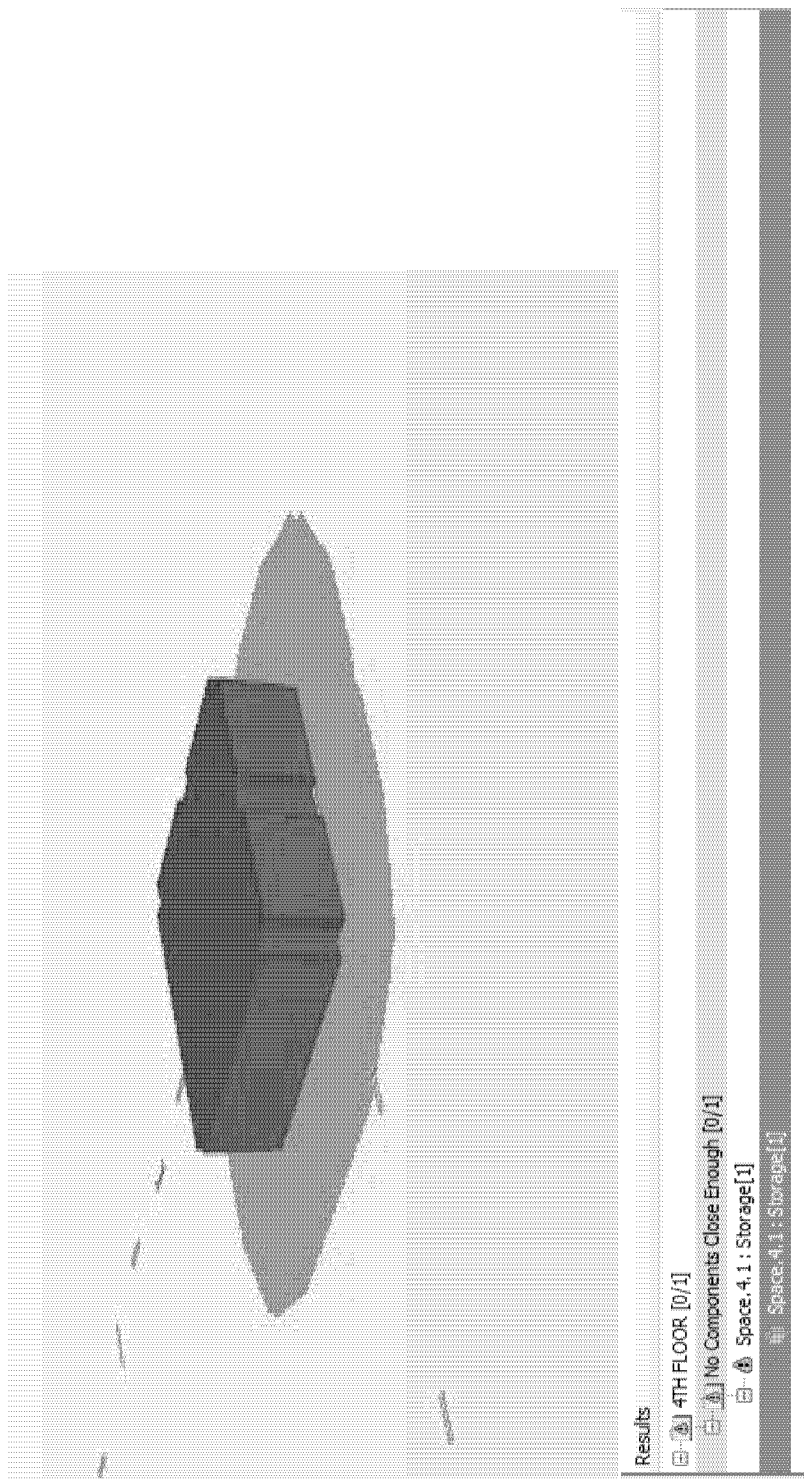

FIG. 10 shows violation of OSHA 1926.152(d)(1): At least one portable fire extinguisher, having a rating of not less than 20-B units, shall be located outside of, but not more than 10 feet from, the door opening into any room used for storage of more than 60 gallons of flammable liquids. This example shows the violation for the storage room (highlighted in red), which does not contain a fire extinguisher close enough.

FIG. 11 shows compliance with OSHA 1926.152(d)(2): At least one portable fire extinguisher having a rating of not less than 20-B units shall be located not less than 25 feet, nor more than 75 feet, from any flammable liquid storage area located outside. This example shows that the fire extinguisher was located within 25-75 feet of the storage area.

Figure 12:

FIG. 12 shows violation of OSHA 1926.152(i)(2)(ii)(A): The distance between any two flammable liquid storage tanks shall not be less than 3 feet (0.912 m). This example highlights the storage tank as red, which is located closer than 3 feet to another storage tank.

Figure 13:
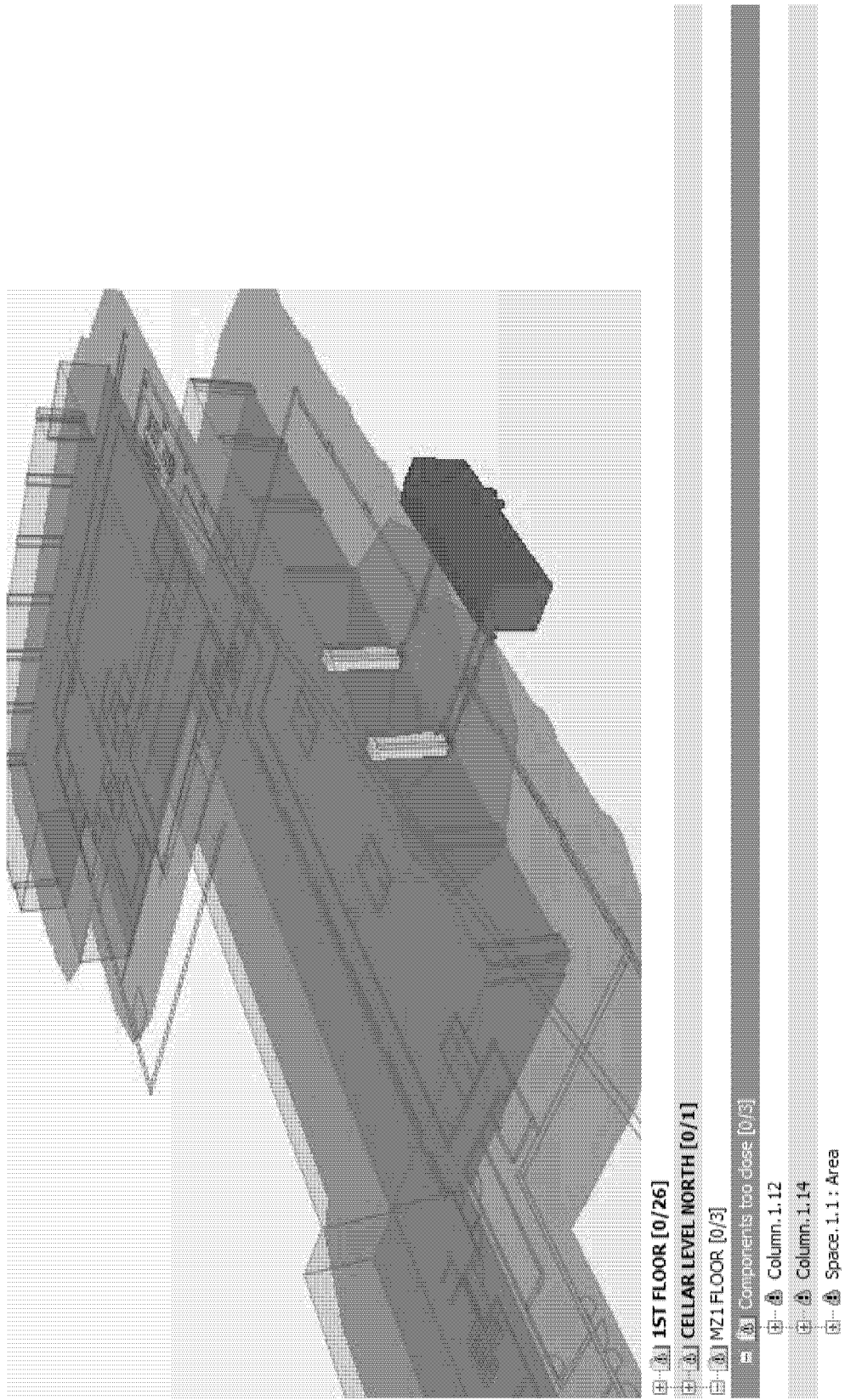

FIG. 13 shows violation of OSHA 1926.152(c)(4)(i): Portable tanks shall not be nearer than 20 feet from any building. This example highlights the storage tank in red, which is close to the edge of the building (<20 feet).

Figure 14:
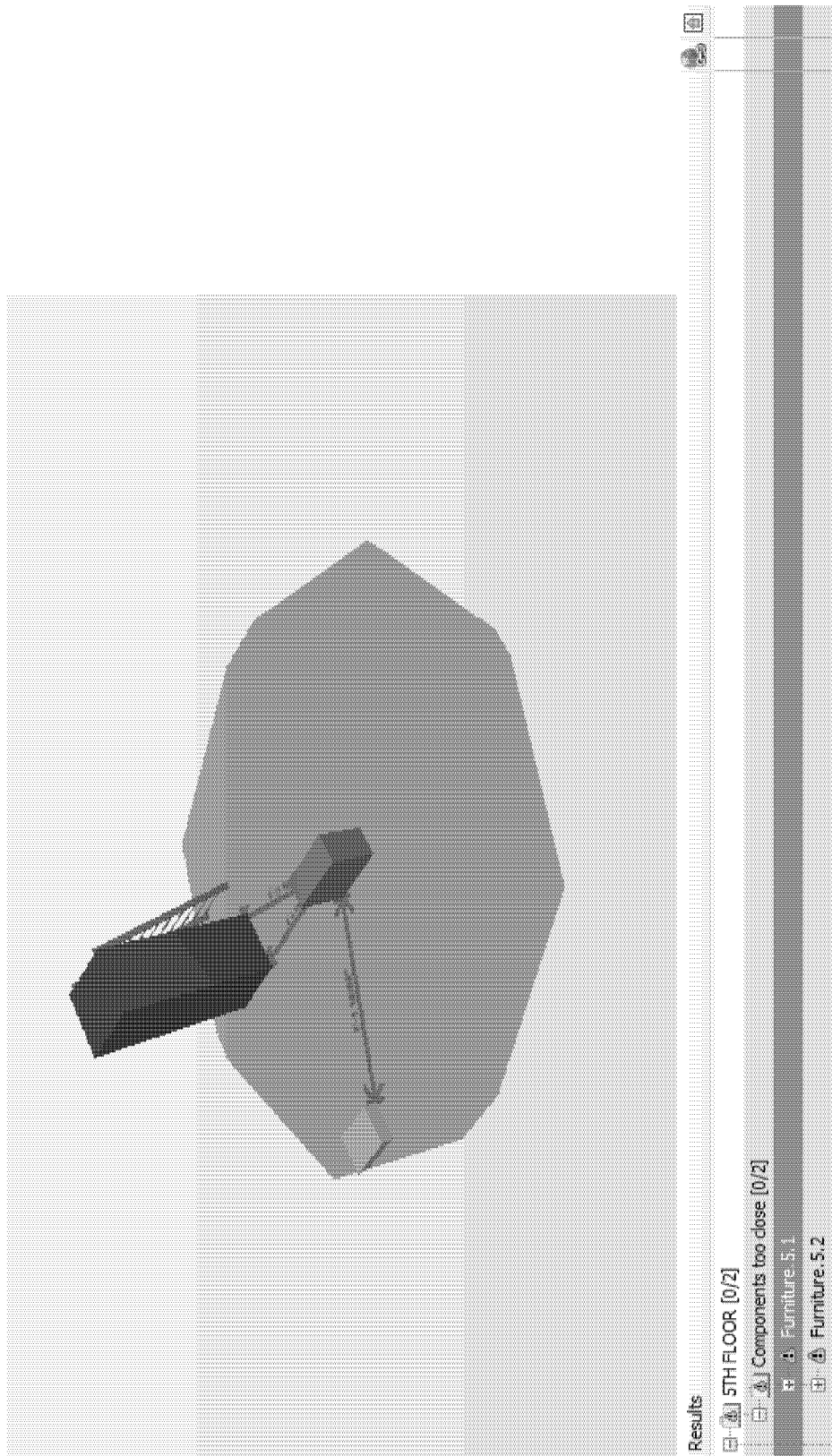

FIG. 14 shows violation of OSHA 1926.958(b)(1)(i): In areas to which access is not restricted to qualified persons only, materials or equipment may not be stored closer to energized lines. For lines and equipment energized at 50 kilovolts or less, the distance is 3.05 meters (10 feet). This example highlights the energized equipment in the model that is close to a column, and stored box component.

Figure 15:
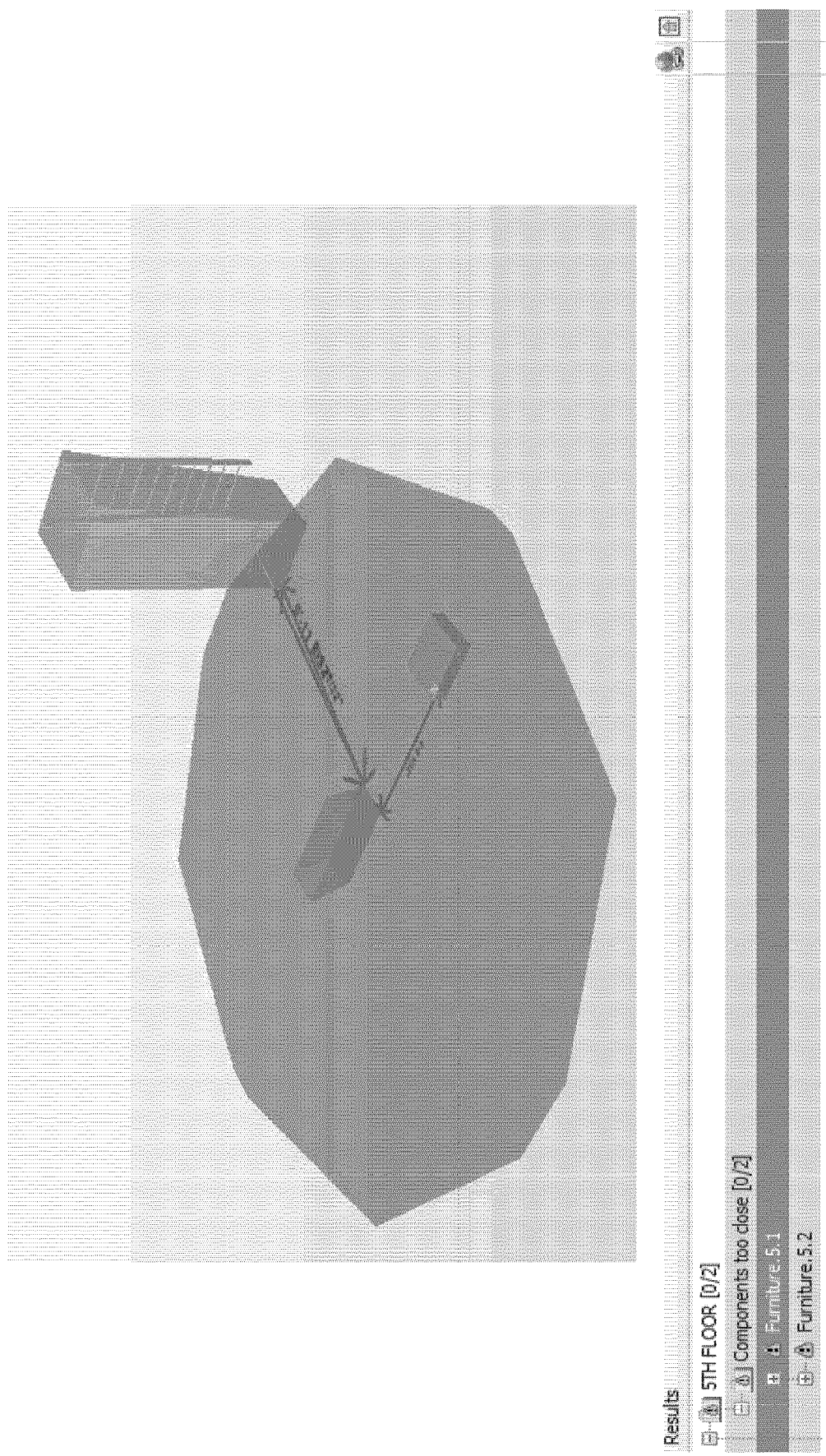

FIG. 15 shows violation of OSHA 1926.958(b)(1)(i): For lines and equipment energized at more than 50 kilovolts, the distance is 3.05 meters (10 feet) plus 0.10 meter (4 inches) for every 10 kilovolts over 50 kilovolts. This example is showing two energized equipment (in orange color) close to each other and the column.

Figure 16:
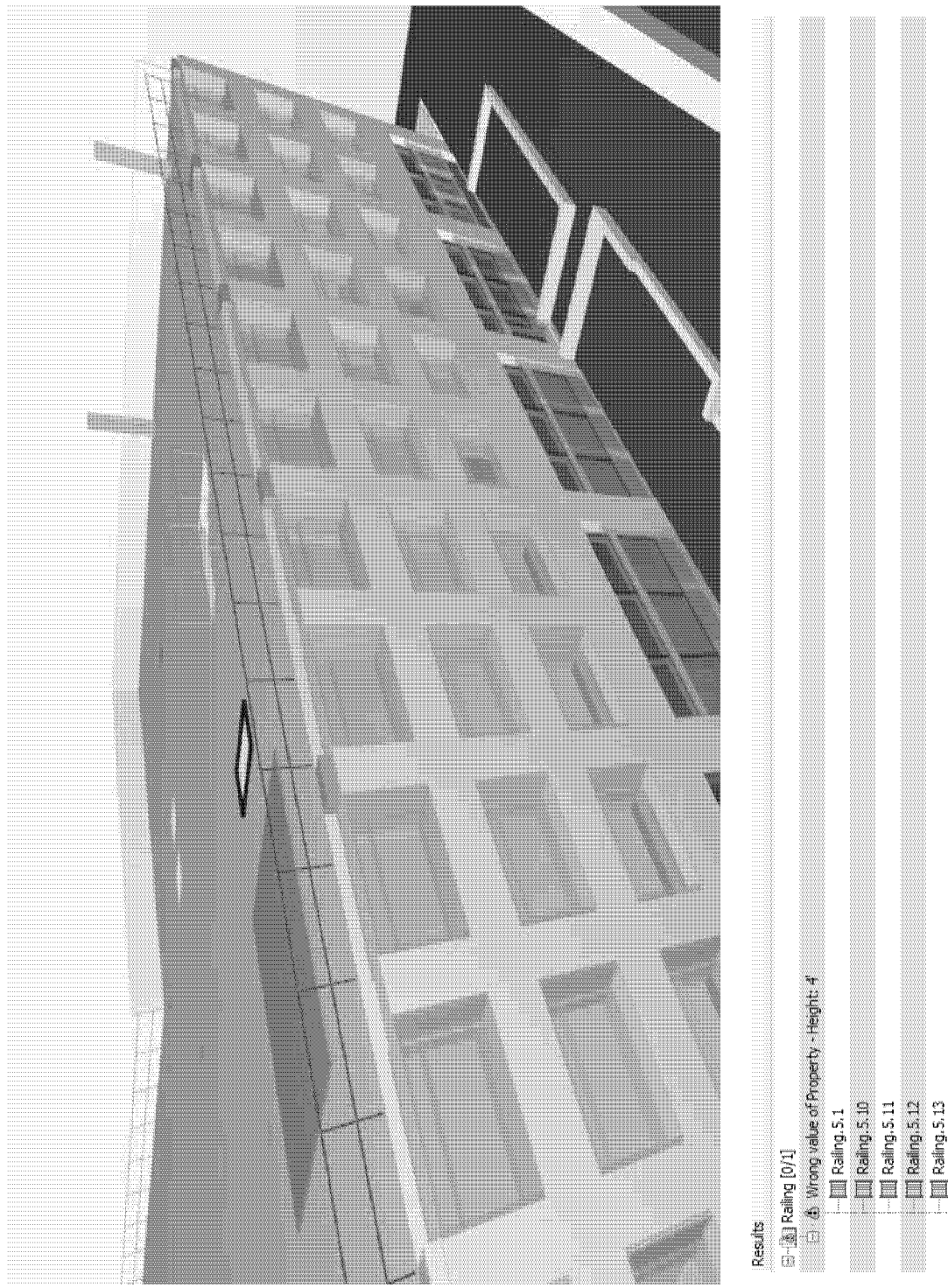

FIG. 16 shows violation of OSHA 1926.502(b)(1): Top edge height of top rails, or equivalent guardrail system members, shall be 42 inches (1.1 m) plus or minus 3 inches (8 cm) above the walking/working level. This guardrail in the image is highlighted as red as it violates 39 inches.

Figure 17:
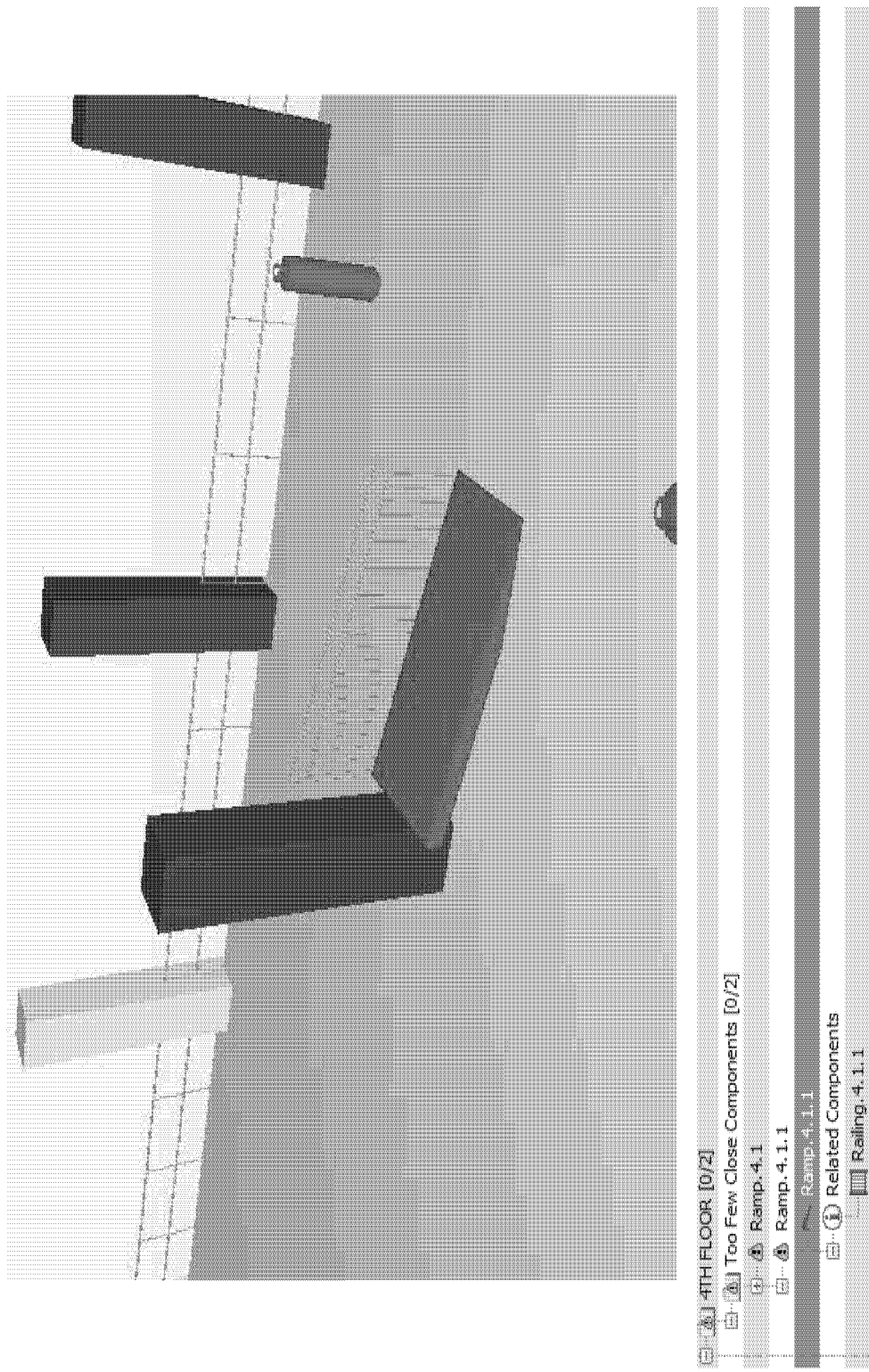

FIG. 17 shows violation of OSHA OSHA1926.502(b)(14): Guardrail systems used on ramps and runways shall be erected along each unprotected side or edge. This ramp is highlighted as it contains guardrail only on one side.

Figure 18:
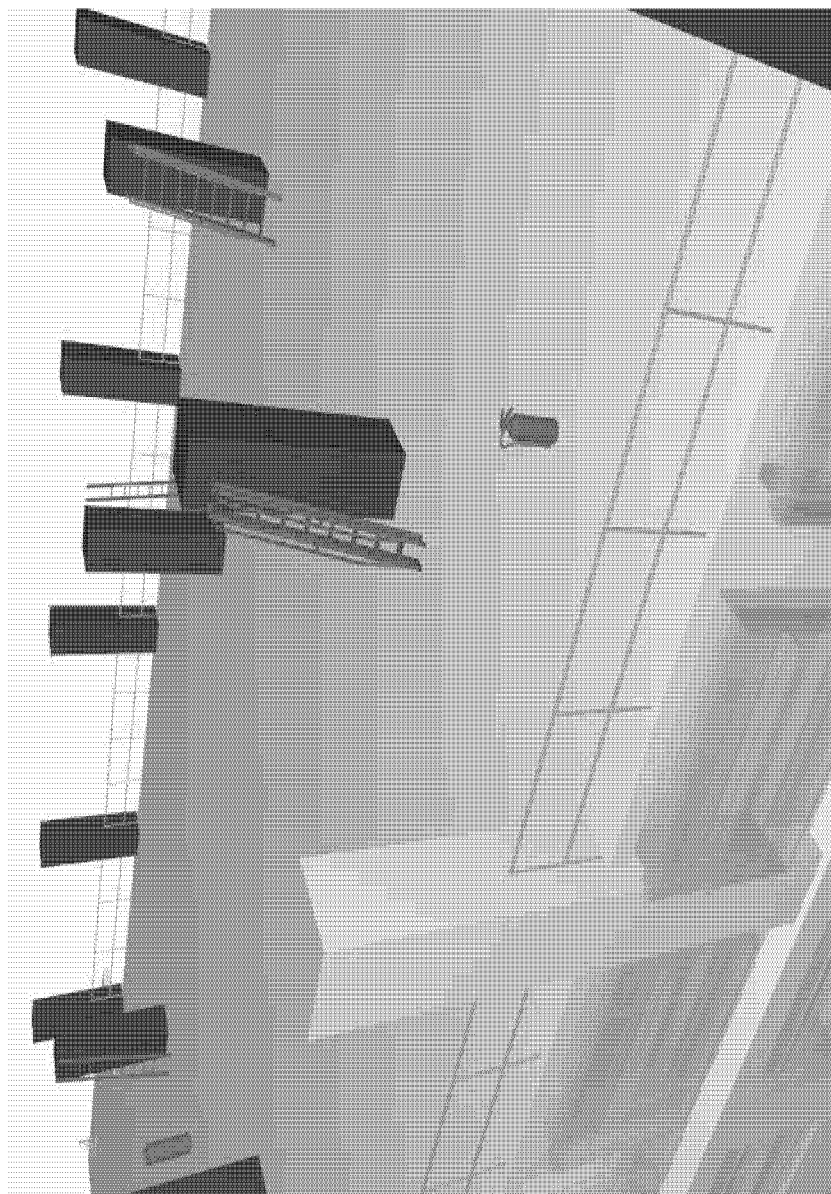

FIG. 18 shows violation of OSHA 1926.1053(a)(4)(i): The minimum clear distance between the sides of individual-rung/step ladders and the minimum clear distance between the side rails of other fixed ladders shall be 16 inches (41 cm). This ladder in the model violates the rule with having clear distance less than 16 inches.

Figure 19:
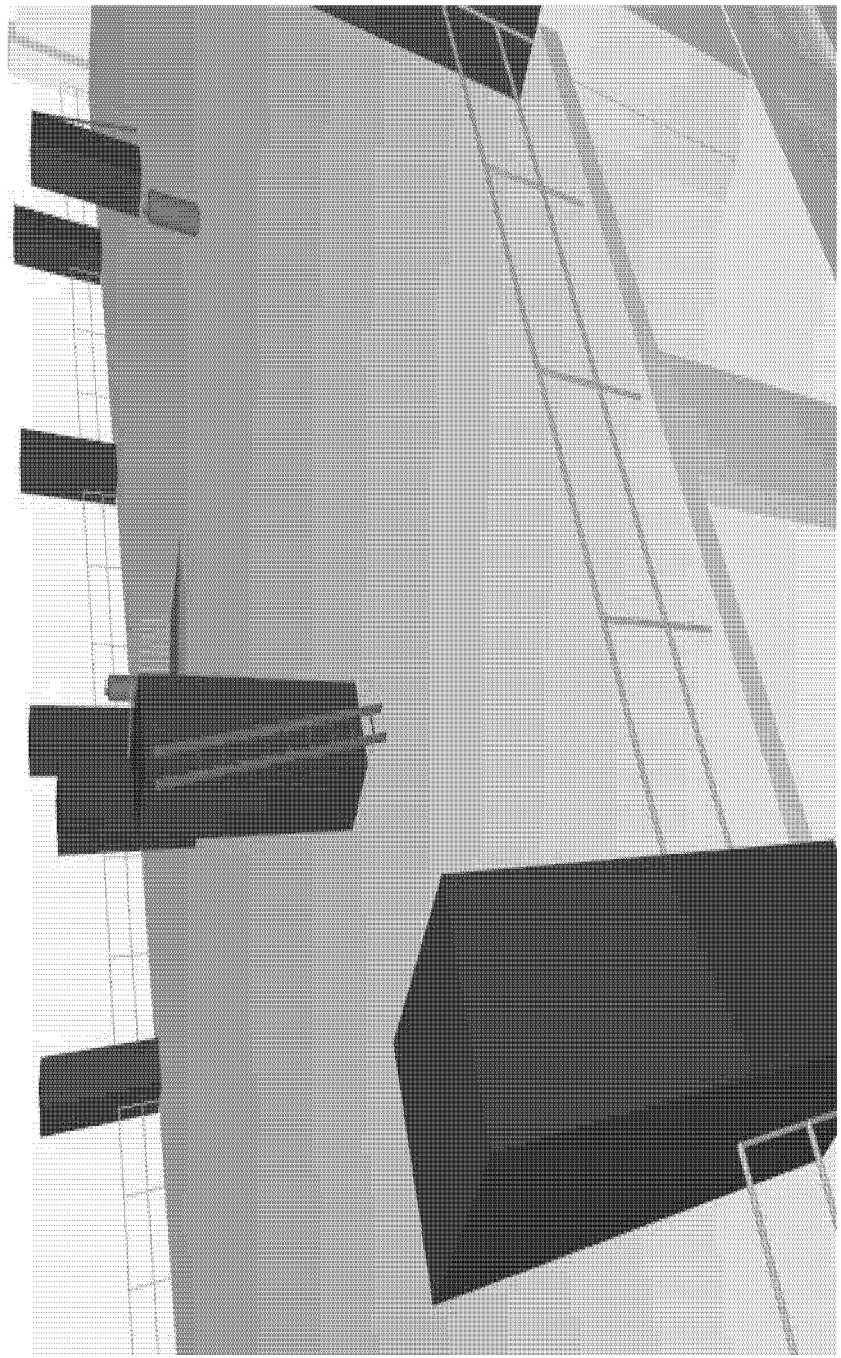

FIG. 19 shows violation of OSHA 1926.1053(a)(4)(ii): The minimum clear distance between side rails for all portable ladders shall be 11½ inches (29 cm). This ladder highlighted in the model is too narrow.

FIG. 20 shows violation of OSHA 1926.1053(a)(7): Ladders shall not be tied or fastened together to provide longer sections unless they are specifically designed for such use. This ladder violates the rule.

Figure 21:
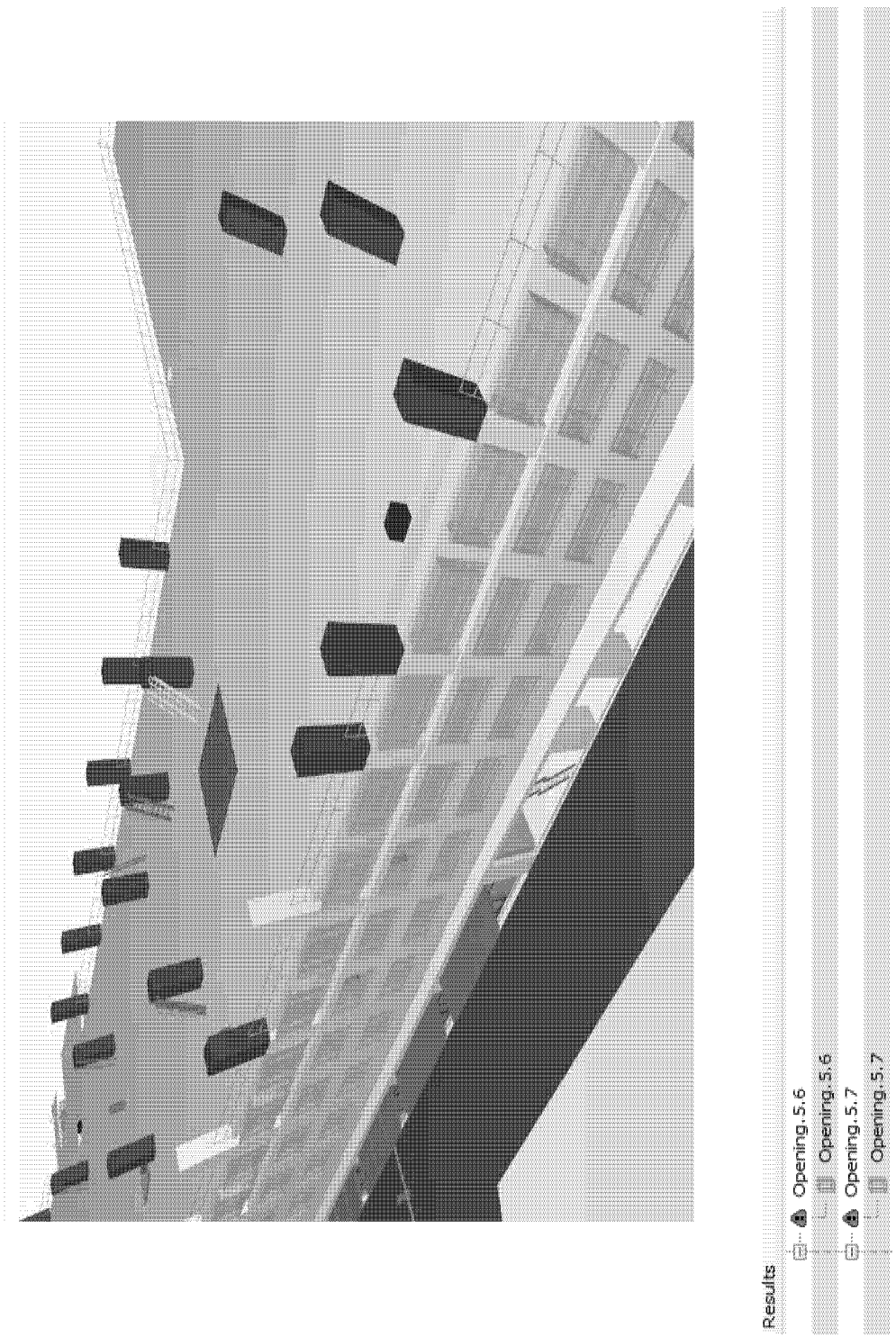

FIG. 21 shows violation of OSHA 1926.754(e)(2)(ii): Roof and floor holes and openings shall be decked over. This opening in the figure violates the rule.

Figure 22:
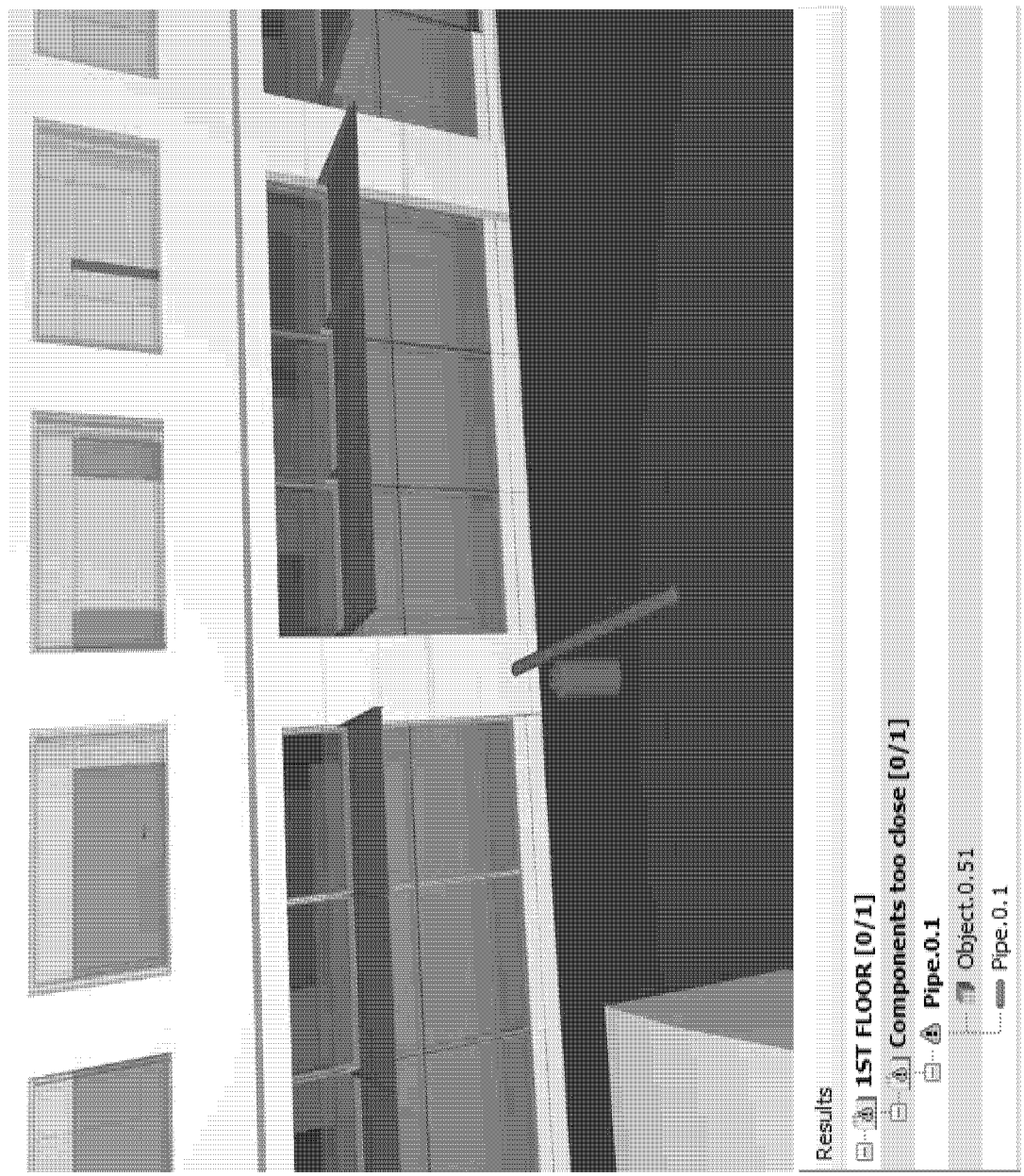

FIG. 22 shows violation of OSHA 1926.151(a)(2): When the exhausts are piped to outside the building under construction, a clearance of at least 6 inches shall be maintained between such piping and combustible material. This pipe, defined in the model as exhaust pipe, violates the rule.

FIG. 23 shows violation of OSHA DOB 3305.3.6.1.2: Reshores in proximity to unenclosed perimeters. Reshores within 10 feet (3 m) of an unenclosed perimeter of a building shall be secured to prevent them from falling off the building. The wall represents the perimeter of the building, which is closer than 10 feet to the column, which is assumed to have the reshores.

FIG. 24 shows violation of OSHA 1926.1435(b)(6): On jobsites where more than one crane is installed, the cranes must be located such that no crane can come in contact with the structure of another crane. The booms of these cranes collide each other due to radius overlaps.

Figure 25:
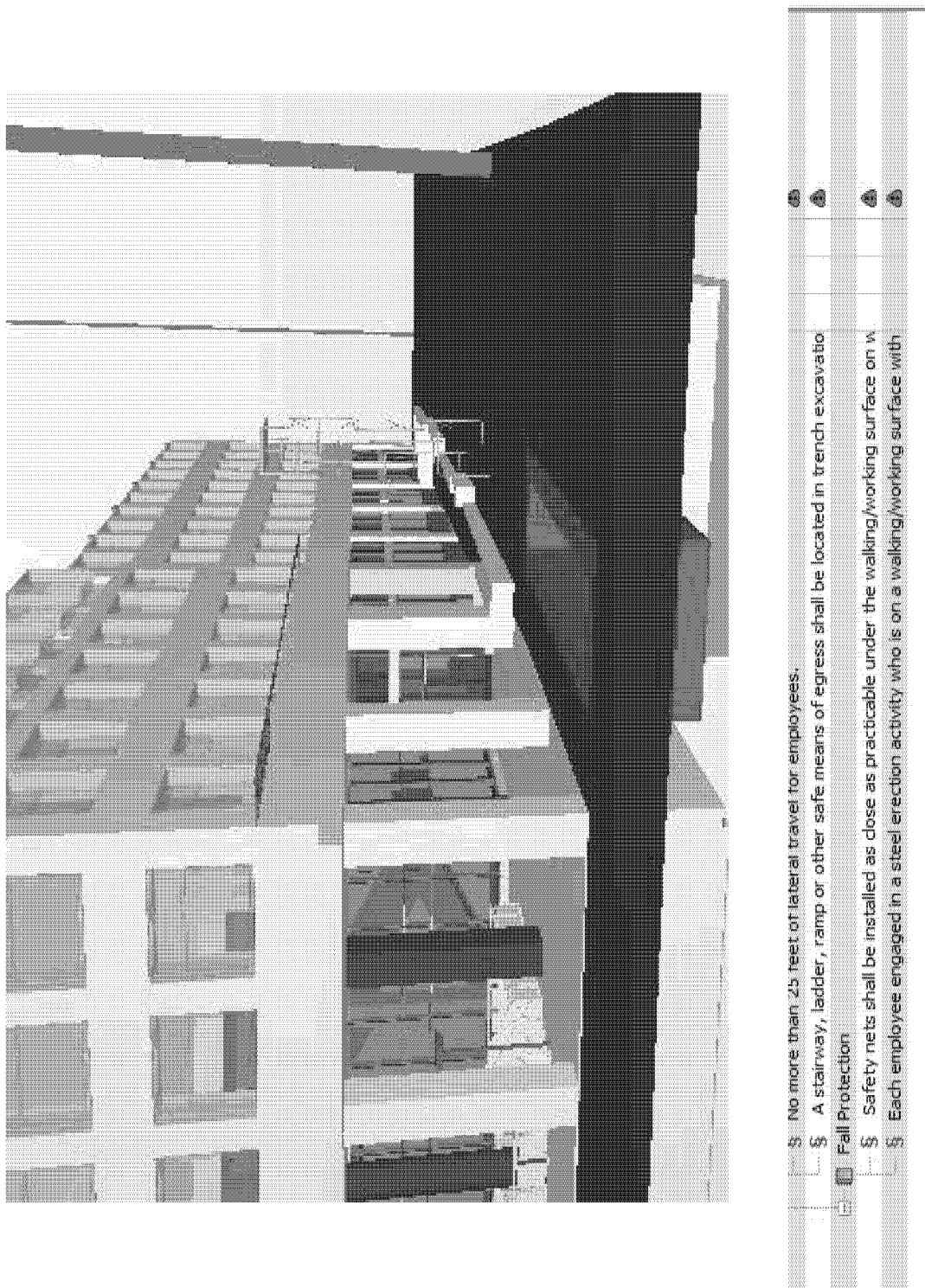

FIG. 25 shows violation of OSHA 1926.651(c)(2): A stairway, ladder, ramp or other safe means of egress shall be located in trench excavations that are 4 feet (1.22 m) or more in depth. The box defined as trench in the model violates the rule as it is more than 4 feet in depth and does not touch the means of egress, which in this case is the ladder.

FIG. 26 shows violation of OSHA 1926.651(c)(2): It shall require no more than 25 feet (7.62 m) of lateral travel for employees. This highlighted ladder in the trench violates the rule with more than 25 feet length.

FIG. 27 shows violation of OSHA 1926.502(c)(1): Safety nets shall be installed as close as practicable under the walking/working surface on, which employees are working, but in no case more than 30 feet below such level. The working surface (slab) and the safety net has more than 30 feet distance in this violation.

Figure 28:
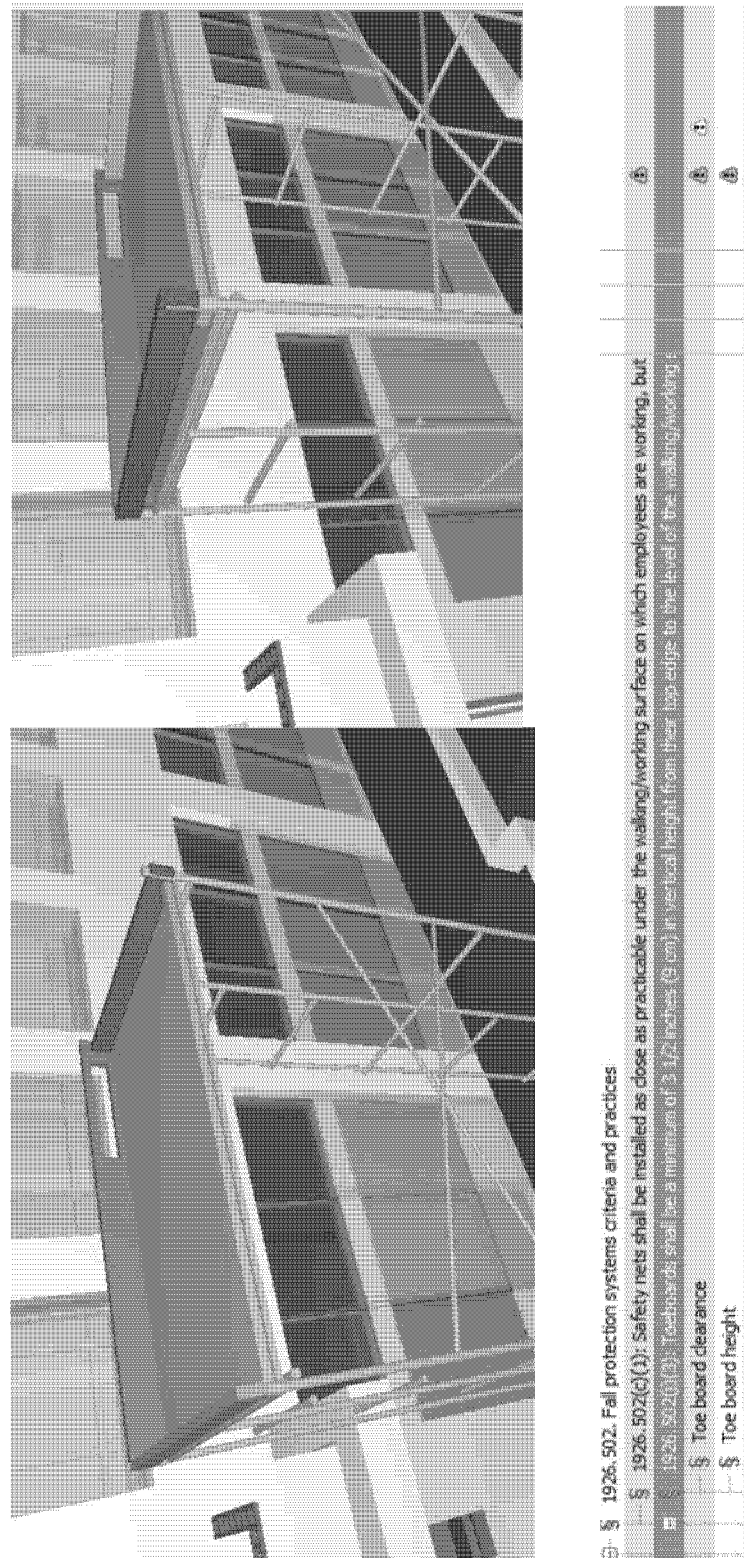

FIG. 28 shows violation of OSHA 1926.502 (j)(3): Toe boards shall be a minimum of 3½ inch in vertical height. They shall not have more than ¼ inch clearance above walking/working surface. These highlighted toe-boards violate these rules (the left one having height less than 3.5", the right one having a clearance more than 0.25").

Figure 29:
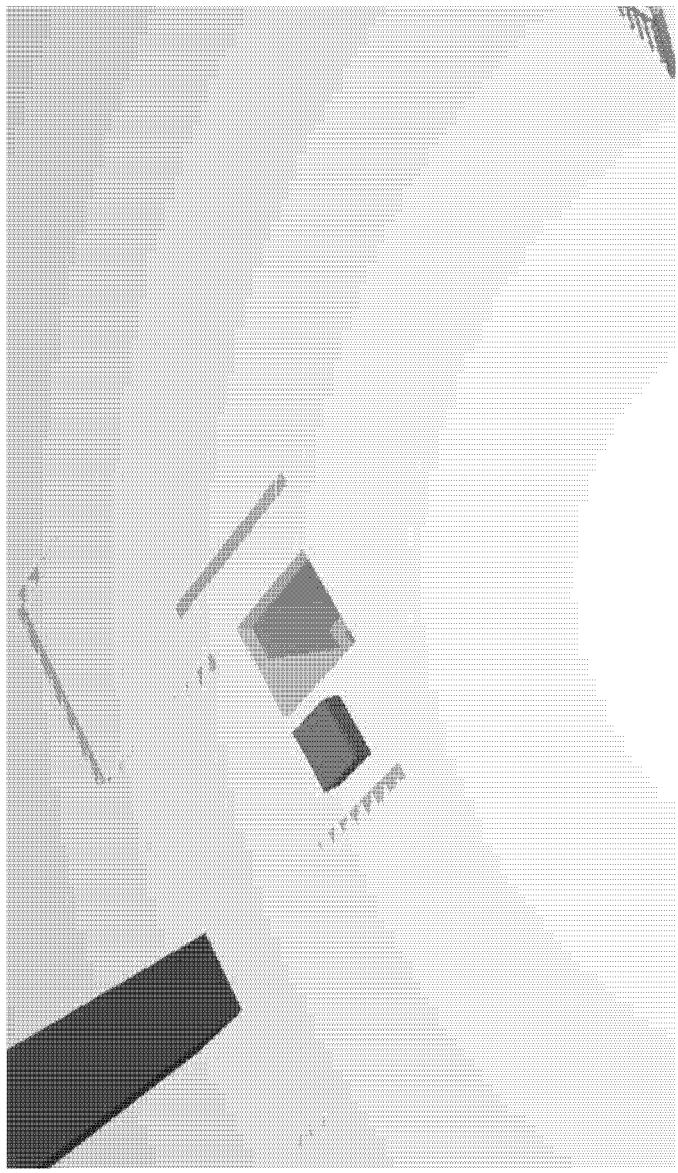

FIG. 29 shows violation of OSHA 1926.250(b)(1): Material stored inside buildings shall not be stored within 6 feet of any hoist way or floor openings. The component highlighted in the figure represented a material and violates the rule by being close to the opening.

Figure 30:
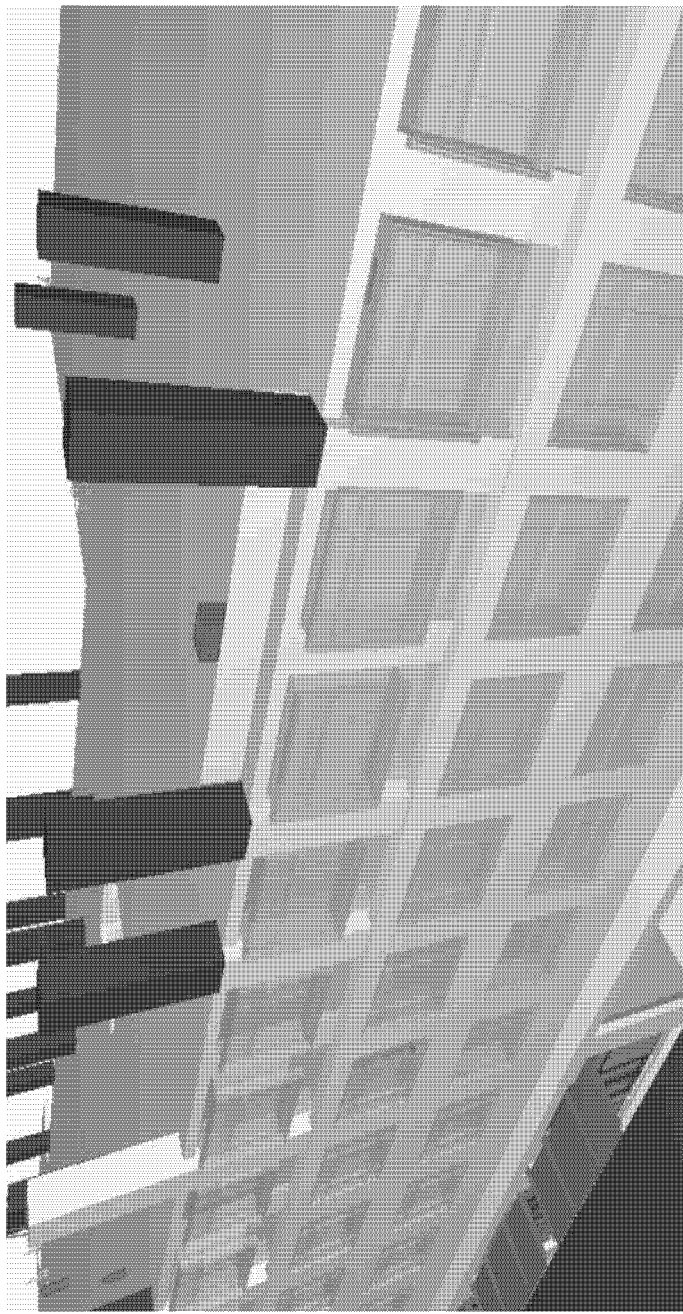

FIG. 30 shows violation of OSHA 1926.250(b)(1): Material stored inside buildings shall not be stored within 10 feet of an exterior wall, which does not extend above the top of material stored. The component highlighted in the figure represents a material and violates the rule by being close to the wall.

Figure 31:
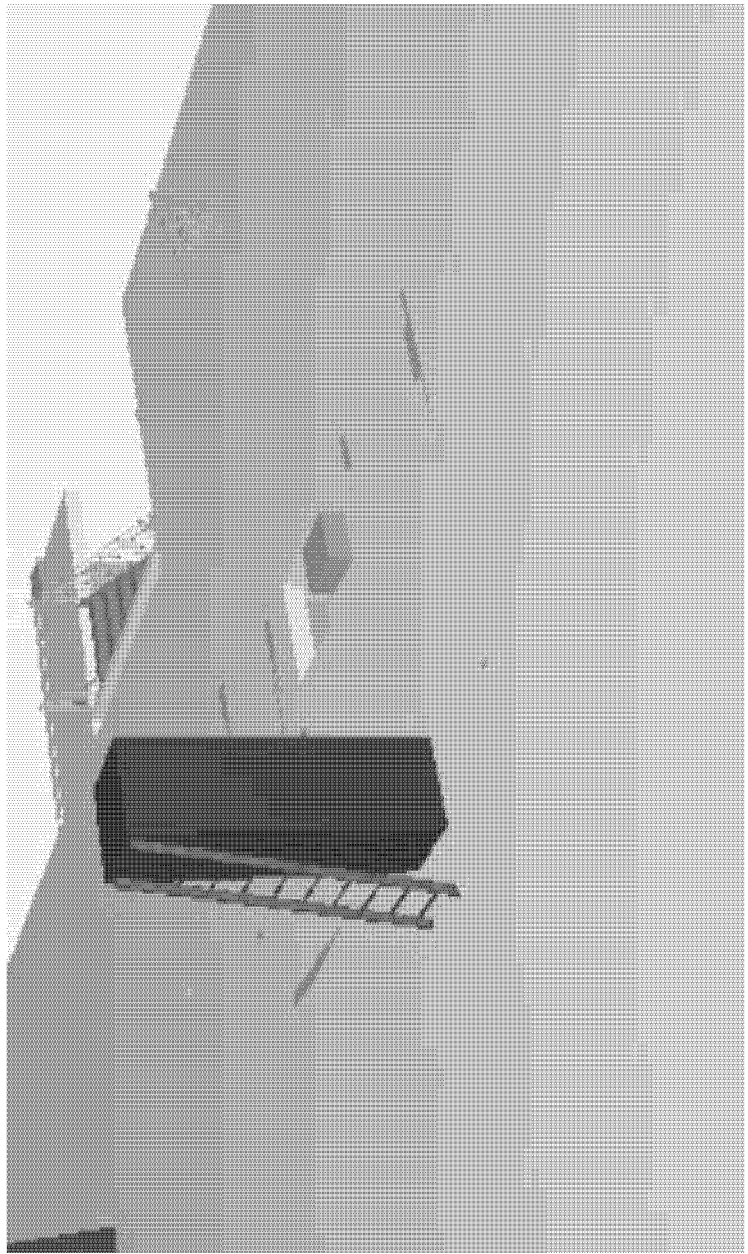

FIG. 31 shows violation of OSHA 1926.1053 (b)(5)(ii): Ladders shall be used at an angle such that the horizontal distance is one eight the working length of ladder. This ladder does not have the proper angle.

Figure 32:
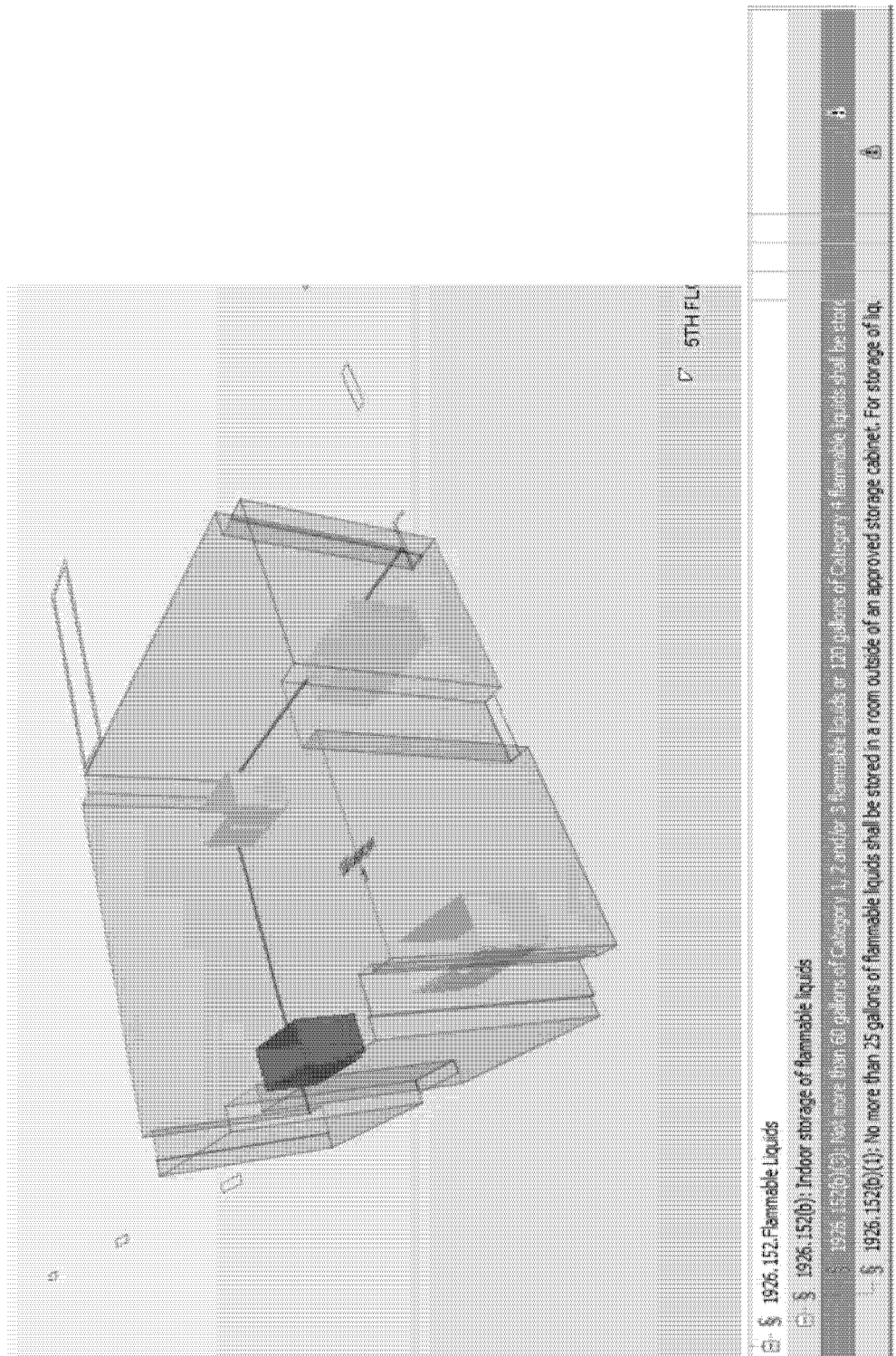

FIG. 32 shows violation of OSHA 1926.152(b)(3): No more than three storage cabinets maybe located in a single storage area. The storage area contains four cabinets and violates the rule.

FIG. 33 shows violation of OSHA 1926.150(c)(1)(vi): A fire extinguisher, rated not less than 10B, shall be provided within 50 feet of wherever more than 5 gallons of flammable or combustible liquids or 5 pounds of flammable gas are being used on the jobsite. The fire extinguisher in this rule is not within 50 feet (red circle) of the flammable liquid/gas.

Figure 34:
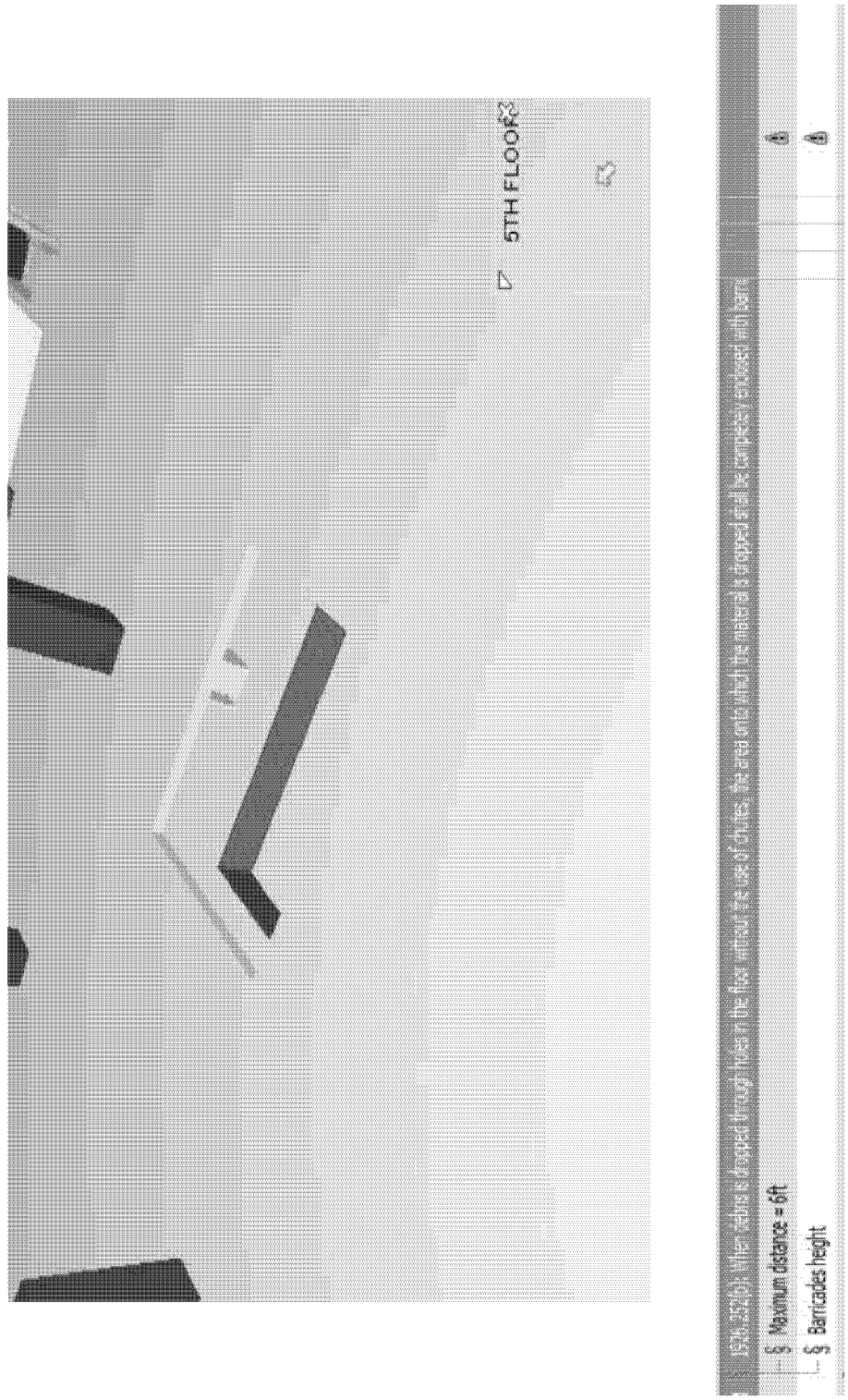
Figure 36:
Figure 37:
Figure 38:

FIG. 34 shows violation of OSHA 1926.252(b): When debris is dropped through holes in the floor without the use of chutes, the area onto which the material is dropped shall be completely enclosed with barricades not less than 42 inches high and not less than 6 feet back from the projected edge of the opening above. The area shown fails to satisfy the rule.

Image Processing

As described above with respect to FIG. 6, object detection in an image can be performed in various ways, for example using machine learning. Certain example implementations are described below.

Convolutional Neural Network (CNN)

A machine learning method called Convolutional Neural Network (CNN) can be used to detect objects in an image. A CNN is a type of machine learning method called an artificial neural network. A CNN is specially designed for image inputs based on analogy with the human visual system. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm. Additional implementation details of the CNNs of the disclosed machine learning system are described in detail below.

CNN Implementation

As described, a CNN is a type of machine learning method called an artificial neural network. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm.

A "loss function" quantifies how far a current output of the CNN is from the desired output. The CNNs in some of the disclosed embodiments perform classification tasks. In other words, the desired output is one of several classes (e.g., damaged vs. non-damaged for a vehicle part). The output of the network is interpreted as a probability distribution over the classes. In implementation, the CNN can use a categorical cross-entropy function to measure the loss using the following equation:

$$H(p,q) = -\Sigma_x p(x) \log(q(x))$$

where p is a true distribution over classes for a given input x, and q is the output from the CNN for input x. The loss will be small if p and q are close to each other.

In a first example, if we do positive and negative classification, and q=[0.1 0.9] and p=[0 1], then $H_1$=0.1. In a second example, if we do positive and negative classification, and q=[0.9 0.1] and p=[0 1], then $H_2$=2.3.

As described, a CNN is made up of layers. Each layer includes many "nodes" or "neurons" or "feature maps." Each neuron has a simple task: it transforms its input to its output as a non-linear function, usually a sigmoid or a rectified linear unit, of weighted linear combination of its input. Some embodiments of the disclosure use a rectified linear unit. A CNN has four different types of layers:

1. "Input layer" that holds the raw pixel values of input images.
2. "Convolutional layer" (Cony) that computes its output by taking a small rectangular portion of its input ("window") and applying the non-linear weighted linear combination.
3. "Pooling layer" (Pool) that takes a rectangular portion of its input ("window") and computes either the maximum or average of the input in that window. Embodiments of the disclosure use the maximum operation. This layer reduces the input sizes by combining many input elements into one.
4. "Fully connected layer" (FC), where each neuron in this layer will be connected to all the numbers in the previous volume. The output is a non-linear weighted linear combination of its input.

The parameters of a CNN are:
Number of layers
Number of neurons in each layer
Size of the window in each convolution and pooling layer
Weight vectors for each neuron in each layer
The parameters of the non-linearity used (the slope of the rectified linear unit in our case)

Of these, the weight vectors for each neuron in each layer are the ones adjusted during training. The rest of the weight vectors, once chosen, remain fixed. For example, Table 4 below provides an examples of the number of parameters of used in one implementation for detection of damage to the front bumper:

TABLE 4

| CNN parameters | Representation size | Weights |
| --- | --- | --- |
| Input: | [240 × 320 × 3] | 0 |
| Conv1-64 neurons | [240 × 320 × 64] | (5*5*5)*64 = 8000 |
| Pool1 | [120 × 160 × 64] | 0 |
| Conv2-64 neurons | [120 × 160 × 64] | (5*5*64)*64 = 102,400 |
| Pool2 | [60 × 80 × 64] | 0 |
| Conv3-64 neurons | [60 × 80 × 64] | (5*5*64)*64 = 102,400 |
| Pool3 | [30 × 40 × 64] | 0 |
| FC1-256 neurons | [1 × 1 × 256] | 30*40*64*256 = 19,660,800 |
| FC2-256 neurons | [1 × 1 × 256] | 256*256 = 65,536 |
| FC3-2 neurons | [1 × 1 × 2] | 256*10 = 2,560 |

CNN Training

The weight parameters of a CNN can be adjusted during the training phase using a back-propagation algorithm as follows:
initialize the network weights with small random values
do
    for each image x in the training set
        prediction=compute the output of the network, q(x); // forward pass
        actual=desired output of the network, p(x);
        compute loss=$H(p,q)=-\Sigma_x p(x)\log(q(x))$ for the batch;
        compute $\Delta w_h$=derivative of loss with respect to weight w_h for allweights from hidden layer to output layer; // backward pass
        add $\Delta w_h$ to the current weights to get new weights;
    until loss on the training set drops below a threshold
    return the network as trained In one implementation of the system, labeled images are input to a CNN and most frequently identified hazardous objects are the desired output. One such example is identifying a violation of not wearing a hard hat or vest in the construction site. This can be done through person detection, and additionally searching for vest based on color space or hard hat using circle/ellipse detector within the detected person.

In some implementations, the CNN system detects salient pre-defined objects without taking into consideration of the context and semantic meaning of the scene. For example, a ladder in a construction site is no hazard in itself. However, the ladder can pose a risk when the ladder combined with context information (such as the ladder placed next to an opening) that is a violation for safety reasons. This kind of object and scene convoluted risk assessment approach based on visual cues, which fuses the information from relationship between the objects and their co-occurring context, is a useful methodology for risk map generation. In various embodiments, methods can be developed to either make use of static images or video clips to identify the risk factors.

Active Learning

Object identification in an image can also be done using active learning. Active learning is a machine learning approach that seeks to maximize classifier accuracy while minimizing the effort of human annotators. This is typically done by prioritizing example annotation according to the utility to the classifier.

Generative Data Synthesis

Also, in some embodiments, training data can be synthesized using a GAN (Generative Adversarial Network). GANs pose the training process as a game between two separate networks: a generator network and a second discriminative network that tries to classify samples as either coming from the true distribution p(x) or the model distribution ^p(x). Every time the discriminator notices a difference between the two distributions, the generator adjusts its parameters slightly to make it go away, until at the end, the generator reproduces the true data distribution and the discriminator is guessing at random, unable to find a difference.

Put most simply, GANs allow a network to learn to generate data with the same internal structure as other data. Suppose you have a set of images, such as pictures of ladders in a construction site. A GAN can learn to generate pictures of ladders like those real ones used for training, but not actually replicate any one of the individual images. If given enough ladder images with varied backgrounds, a GAN actually learns about "ladder-ness" from the samples, and learns to generate images that meet this standard. Furthermore, it does so without the generator actually having direct access to any of the training images itself.

Client Device Application or "App"

As described, in some embodiments, a client device application, or "app," can be used by a risk consultant to identify risks and generate a report.

FIGS. 35-52 are screenshots of example interface screens of a risk assessment and reporting application on a client device, according to various embodiments of the disclosure. The application can be executed, for example, on a tablet computer or mobile phone.

The application creates a method of structured data capture for the risk consultant during site visits and creates more quantitative reports through the use of sensors and images.

Once a risk consultant logs in with their unique user id and password, the risk consultant is able to view a list of all site walkthroughs that have been completed (FIG. 35). A new walkthrough can be generated (FIG. 36) given some basic information regarding the site and the client.

Figure 39:
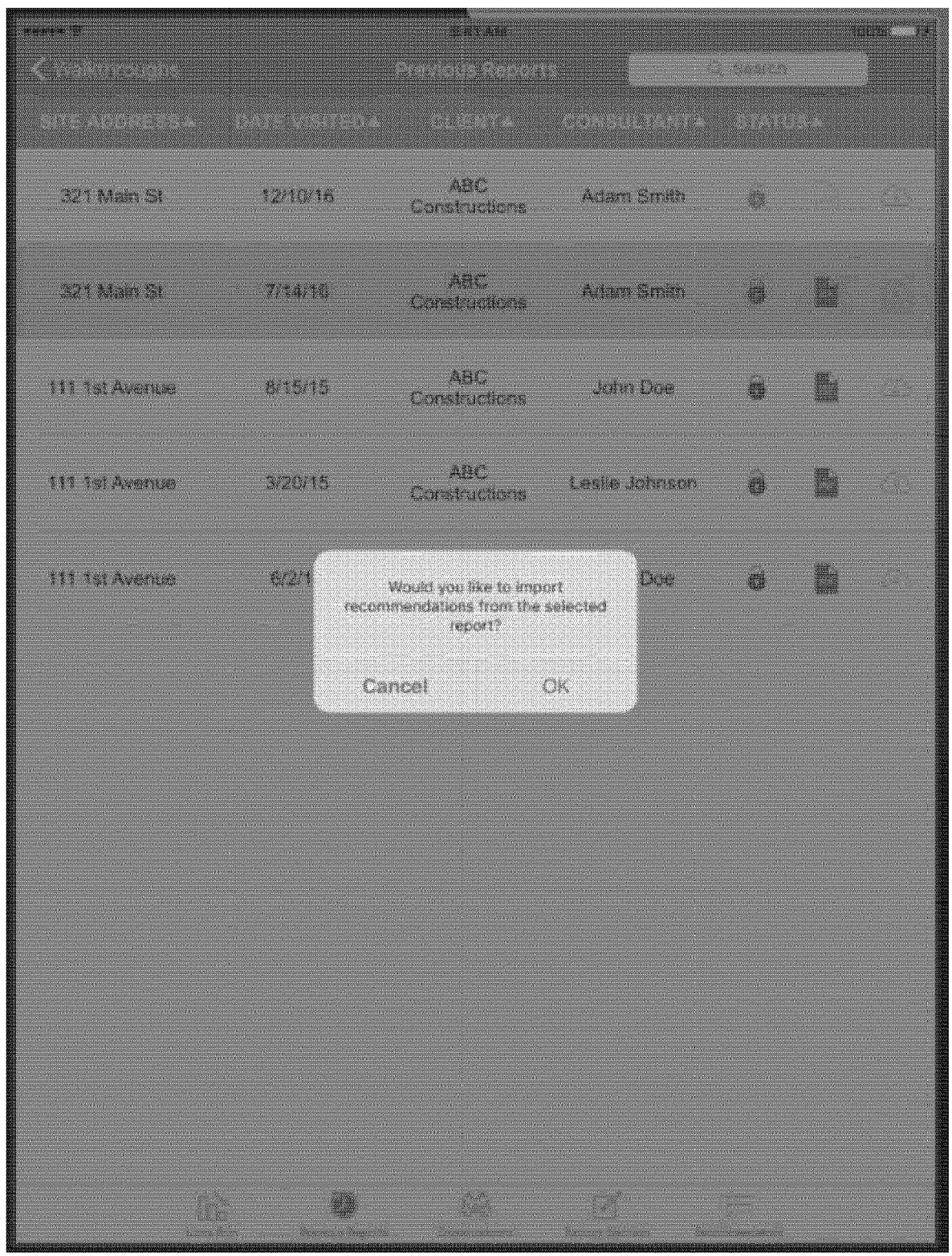
Figure 40:
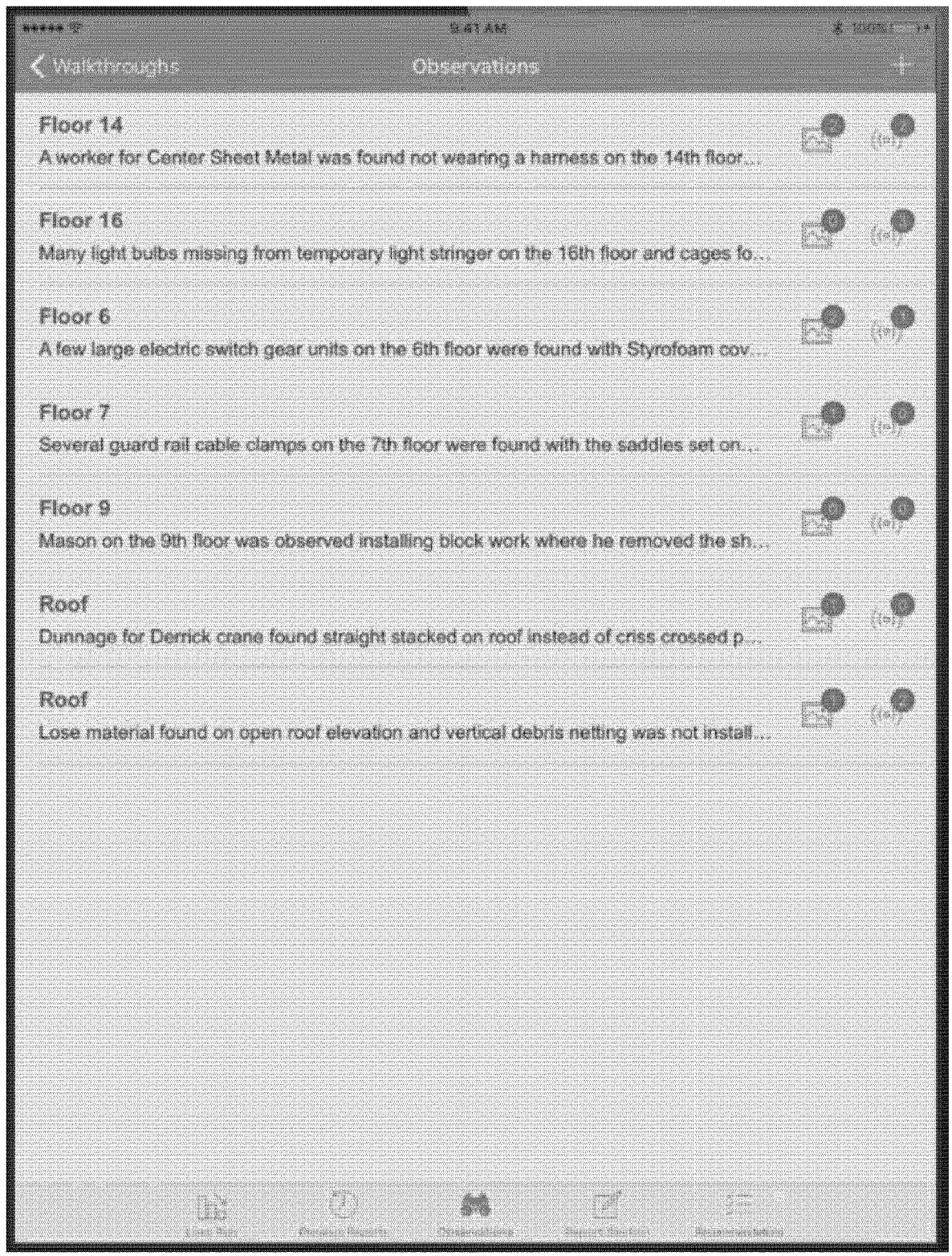
Figure 41:
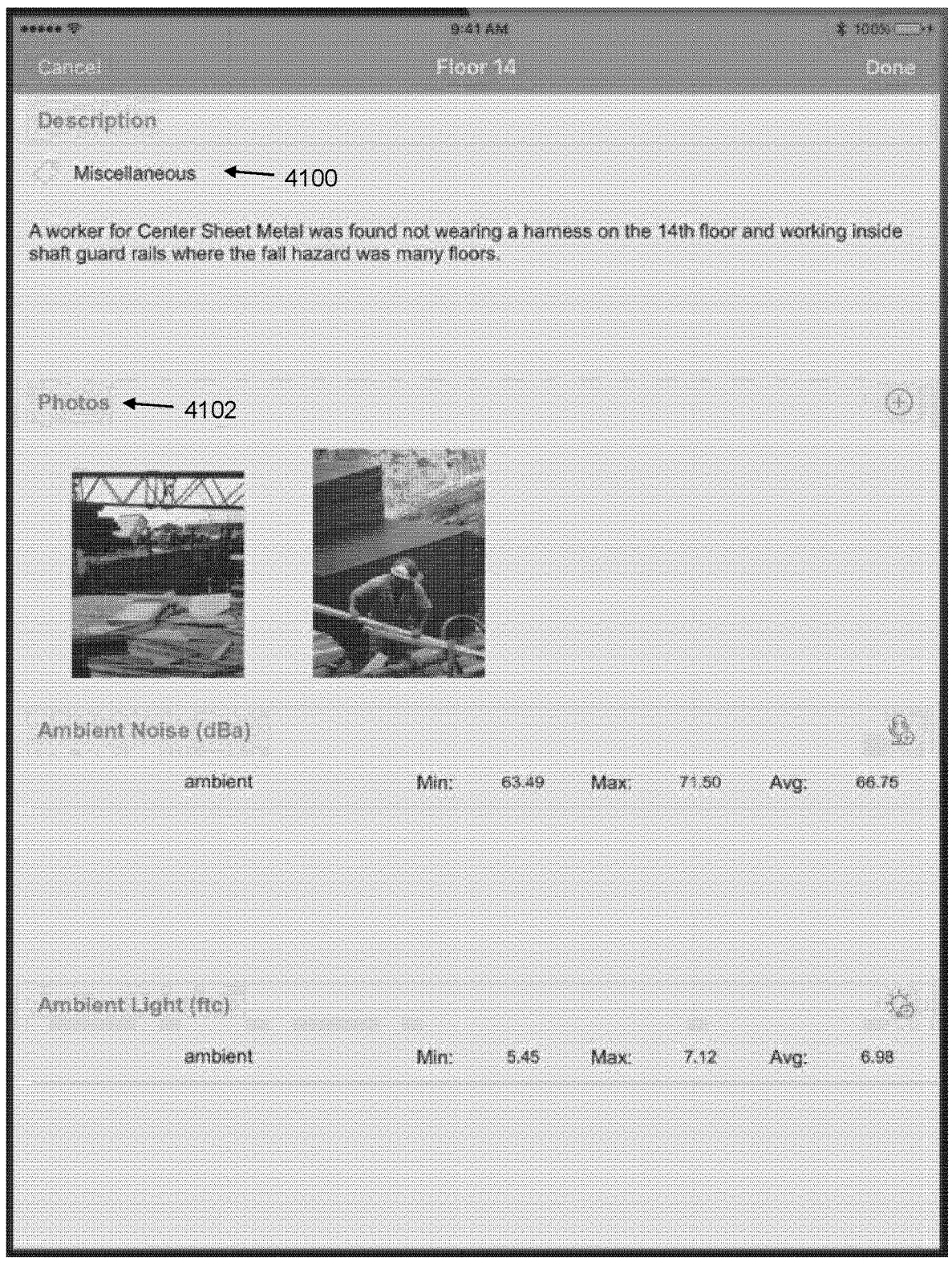
Figure 42:

Prior to a site visit, the risk consultant is able to add a loss run (FIG. 37) for an assessment at a given site. This can provide the risk consultant with information about claims that have taken place at the given site since the last visit. This can help the risk consultant focus their attention on key risk areas. In addition to the claims data, the consultant may also have access to previous reports filed for the given site (FIG. 38) by reviewing and importing previous recommendations (FIG. 39). The consultant can also determine if the previous recommendations have been followed or whether a further communication should be generated.

During a site visit, the risk consultant can use the observation screen (FIG. 40) to generate new observations and edit existing ones. Within an observation, the risk consultant may add a location and description of the positive or negative events they are noting.

Figure 43:
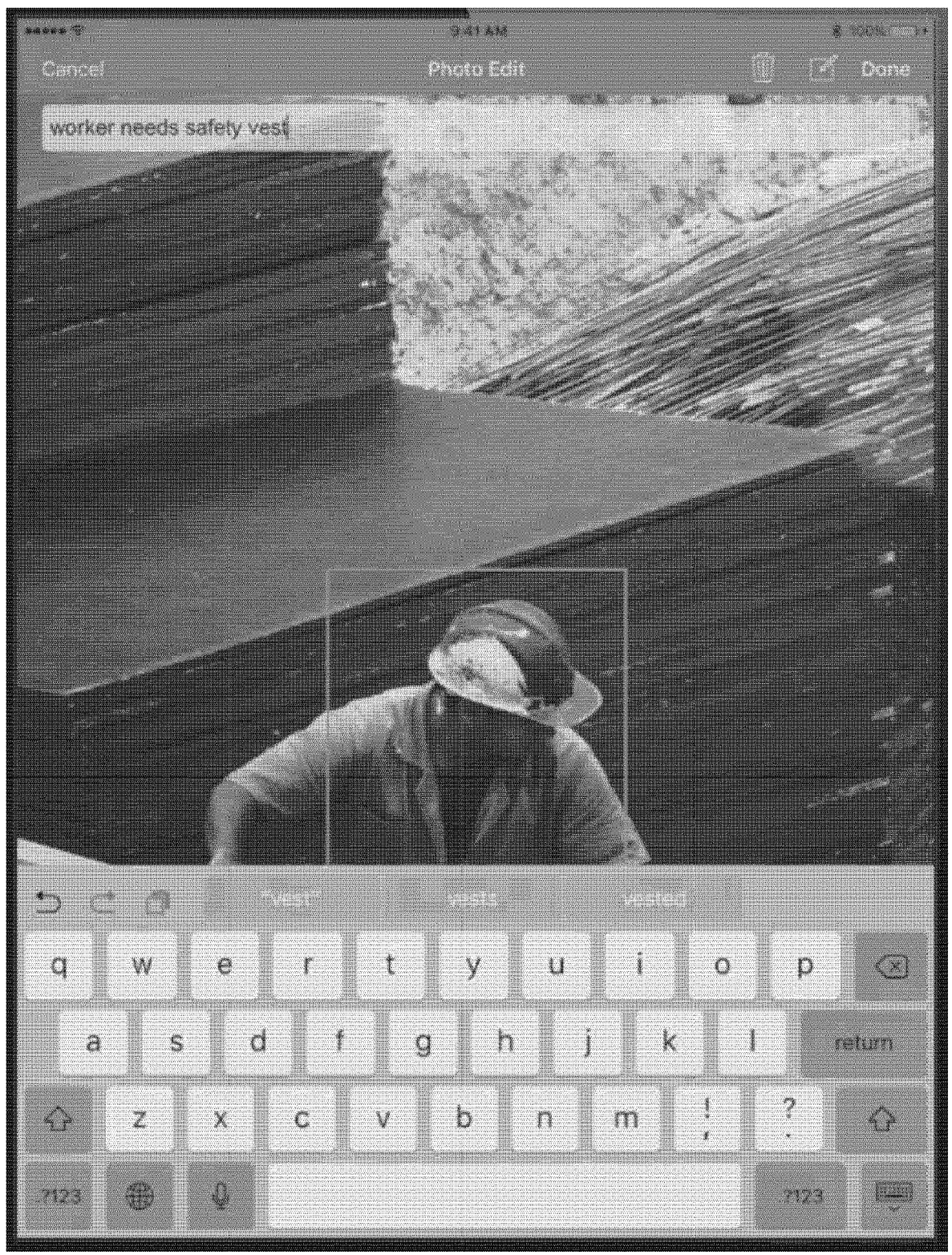

By selecting a tag 4100 for the observation, the consultant allows the application to correlate claims with the observations to help identify potential risk trends. For each image 4102 captured in the observation, the risk consultant can tag key points (FIG. 42) by a drawing bounding box 4200 around objects of interest and tagging them with descriptions (FIG. 43). For example, in the image in FIG. 43, the construction worker is not wearing a safety vest. As described above, computer vision algorithms can be used to automatically identify such key observations for the risk consultant.

Figure 44:
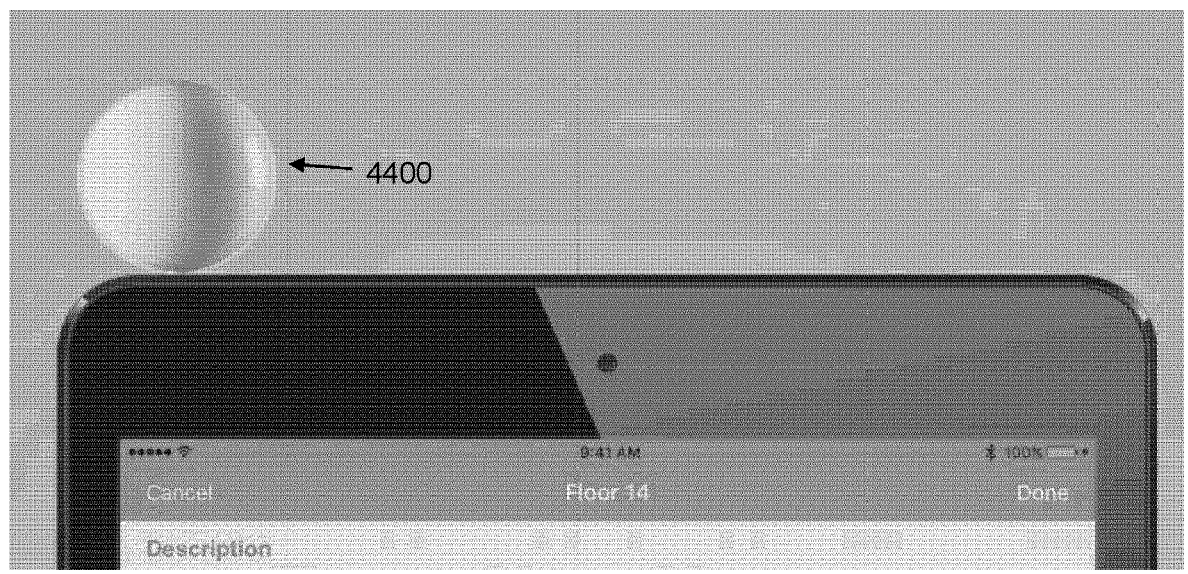
Figure 45:
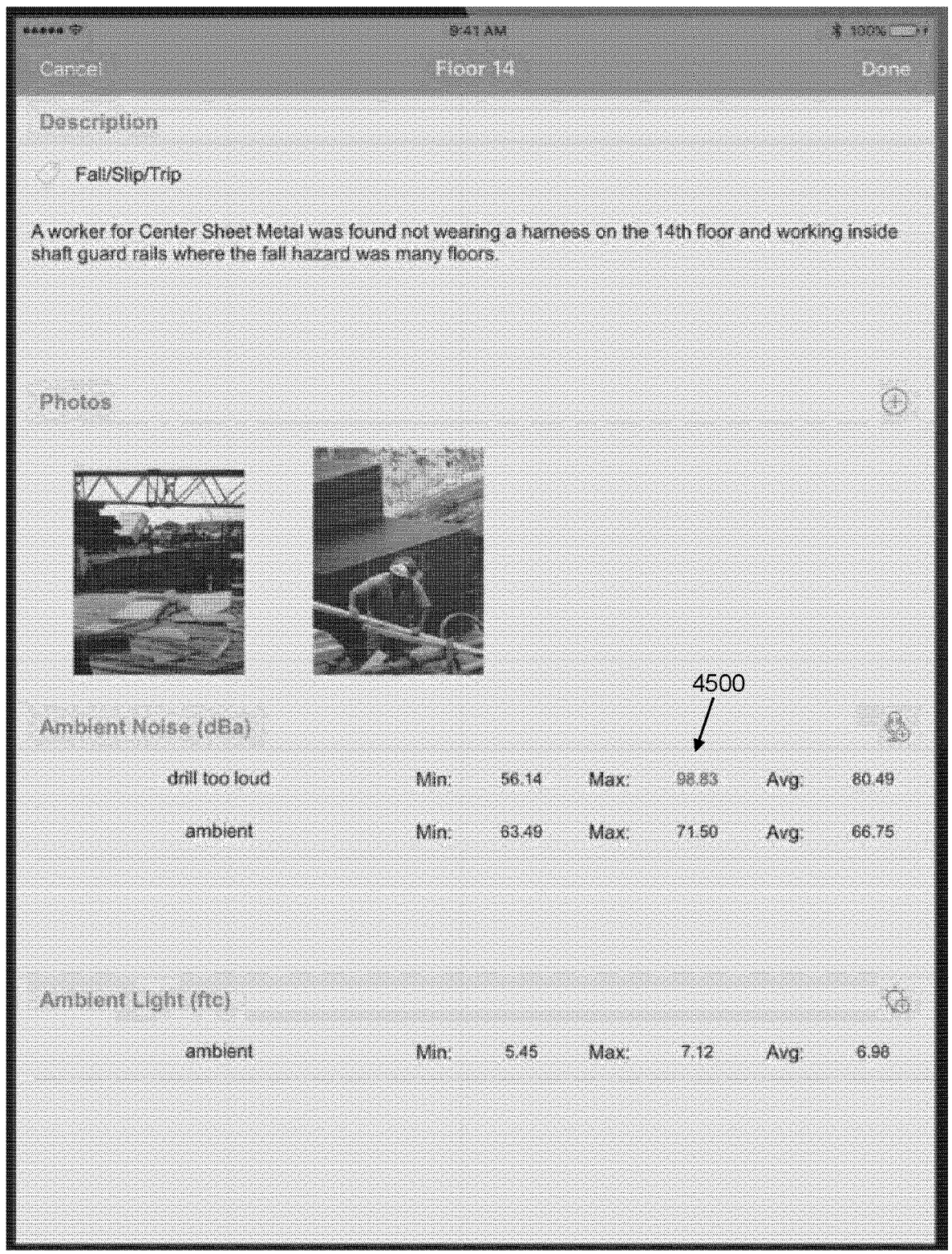
Figure 46:
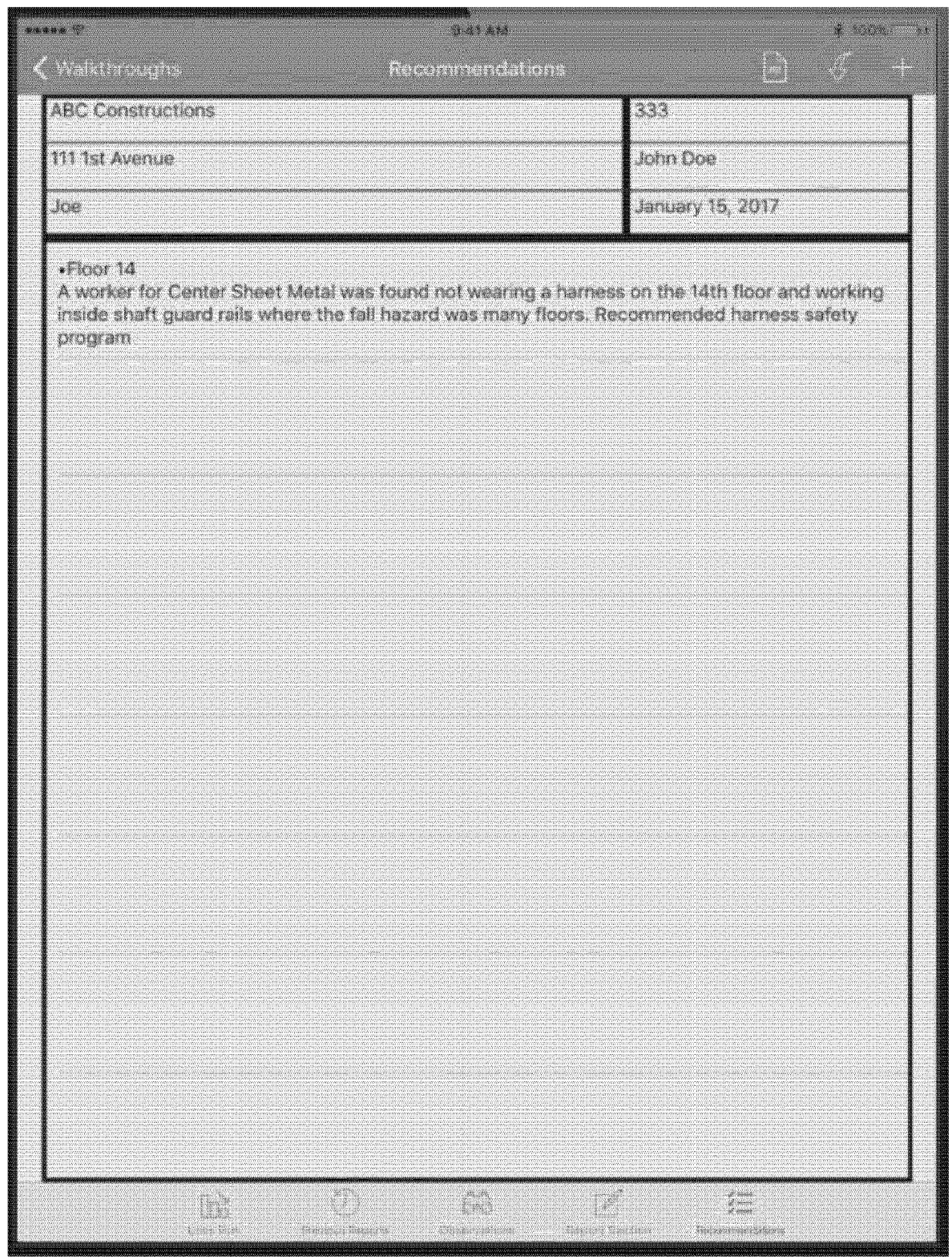
Figure 47:
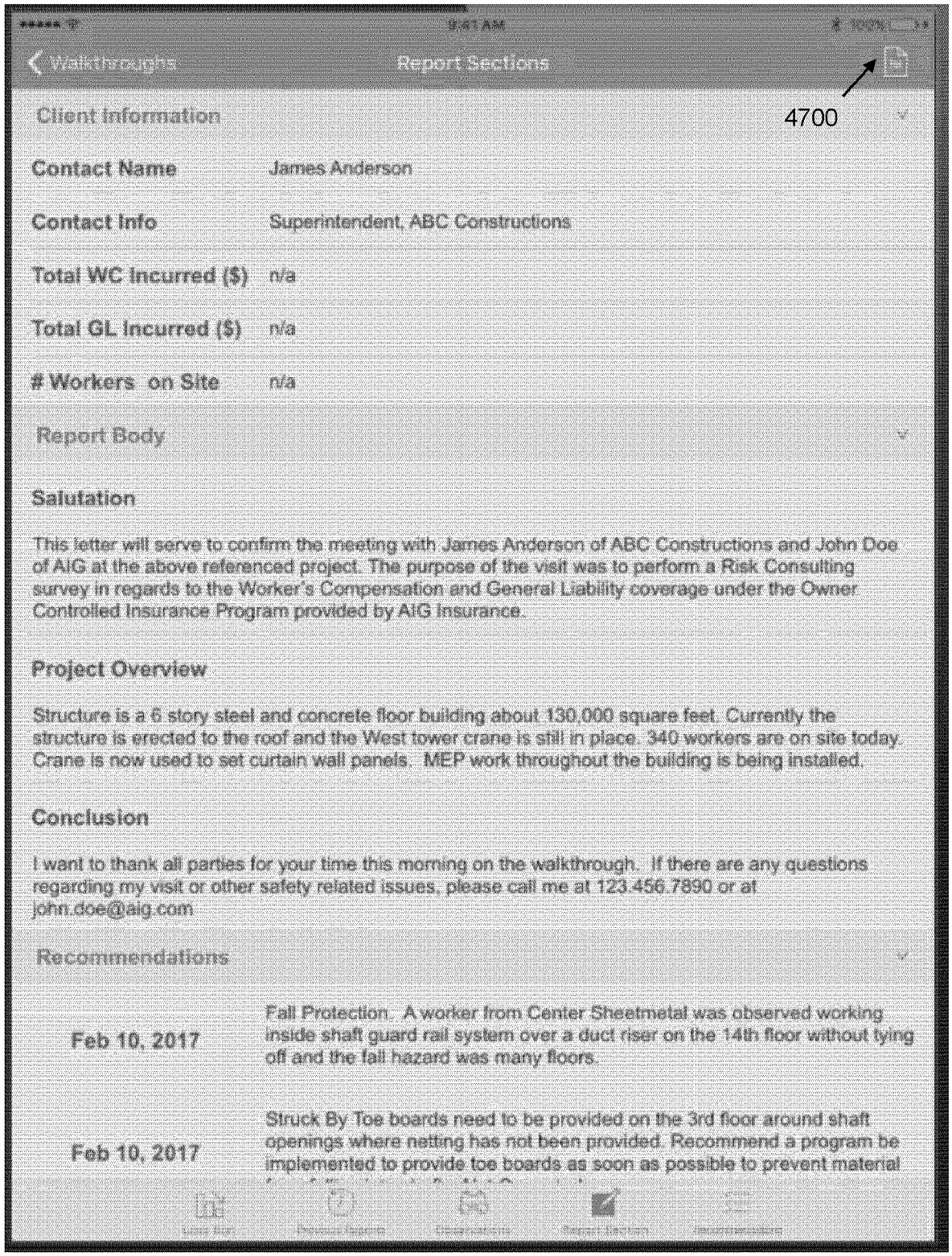
Figure 48:
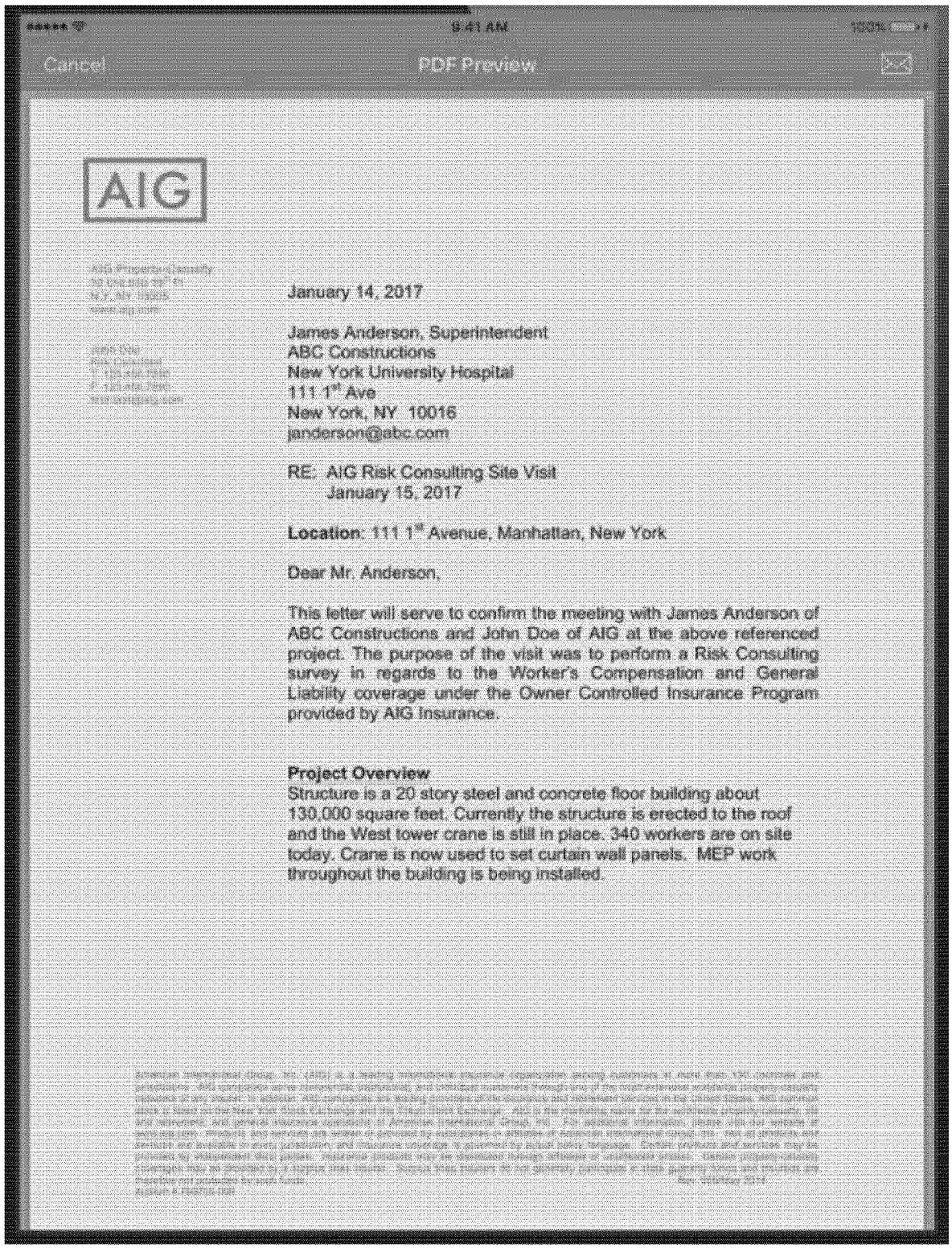
Figure 49:
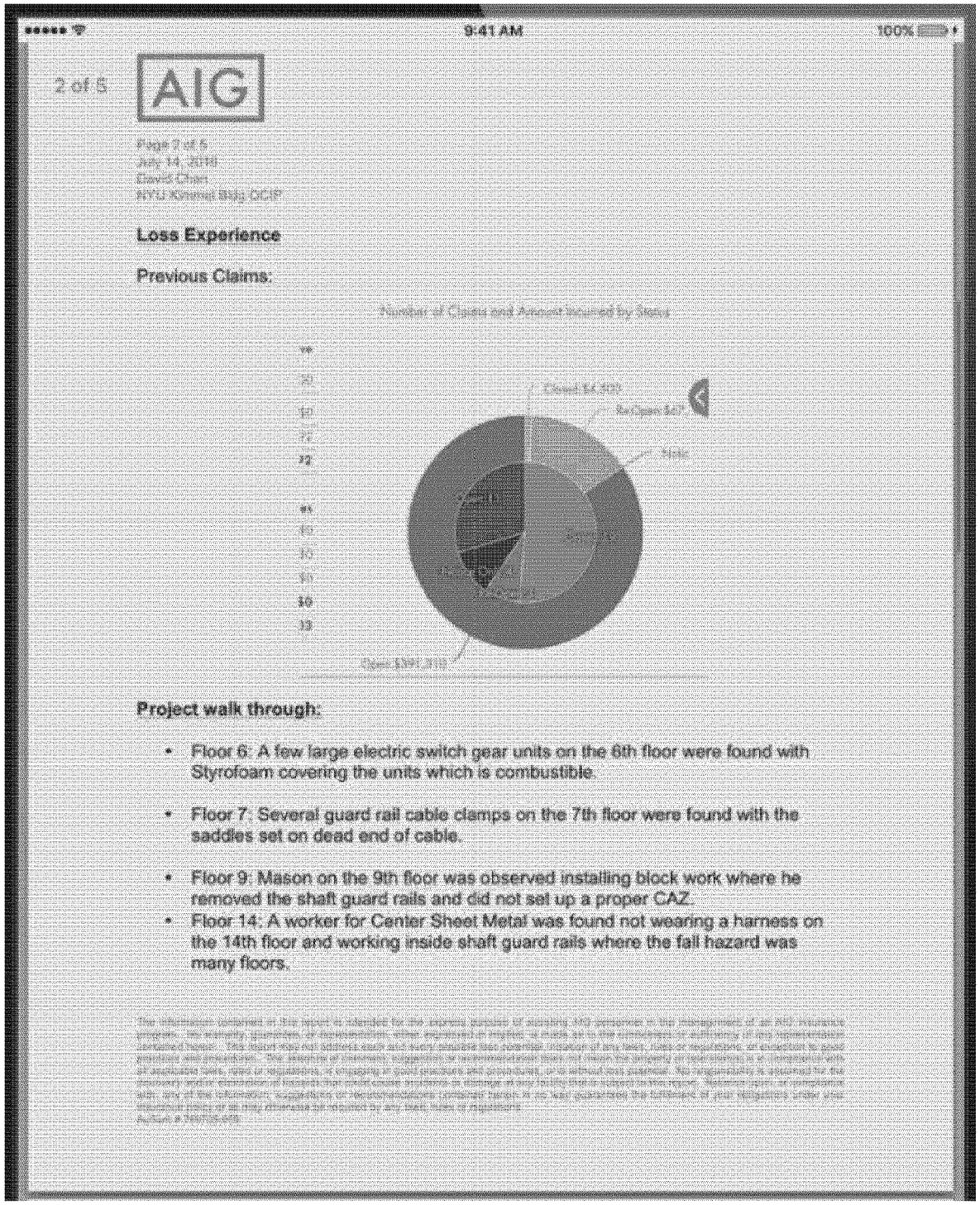
Figure 50:
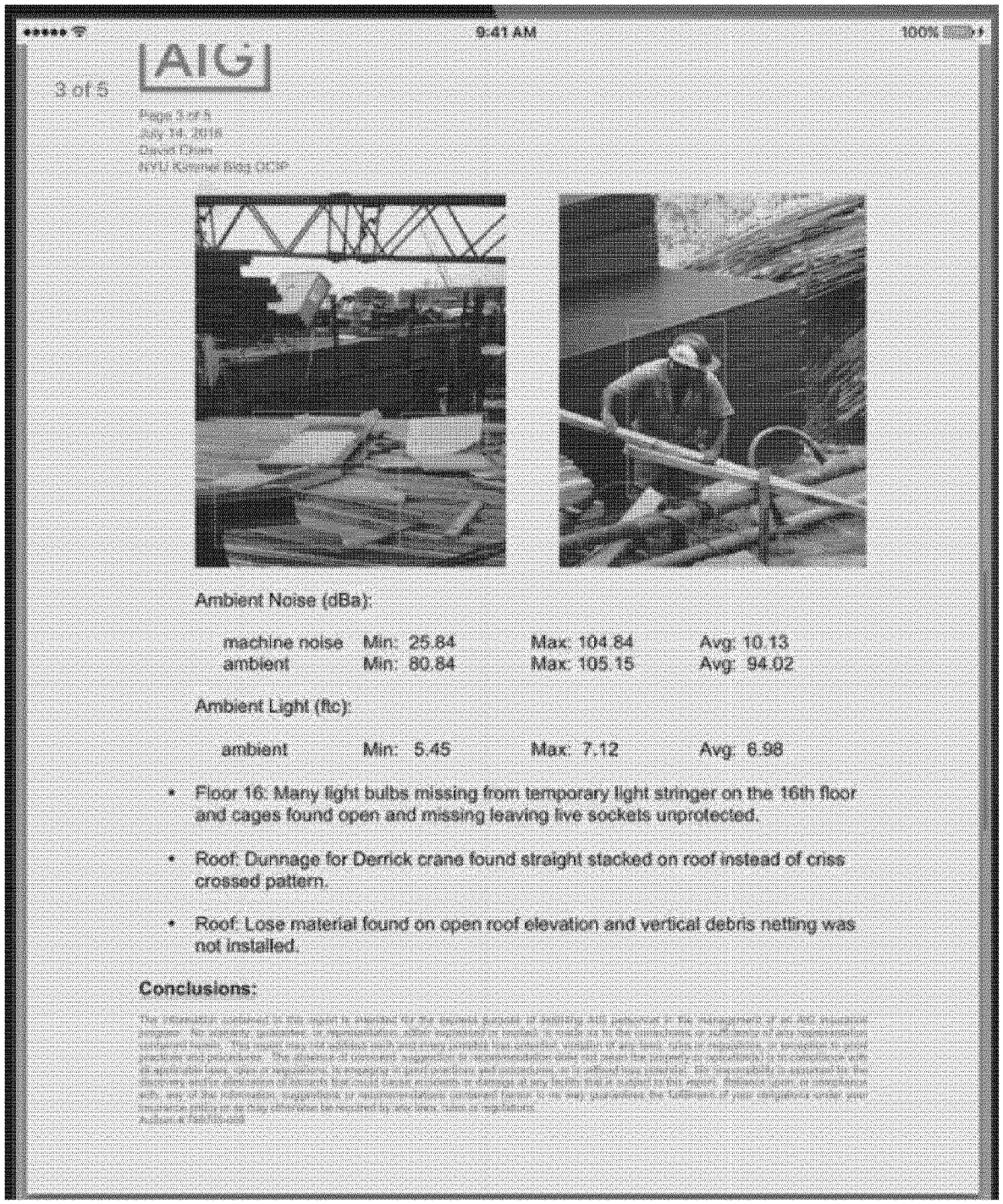
Figure 51:
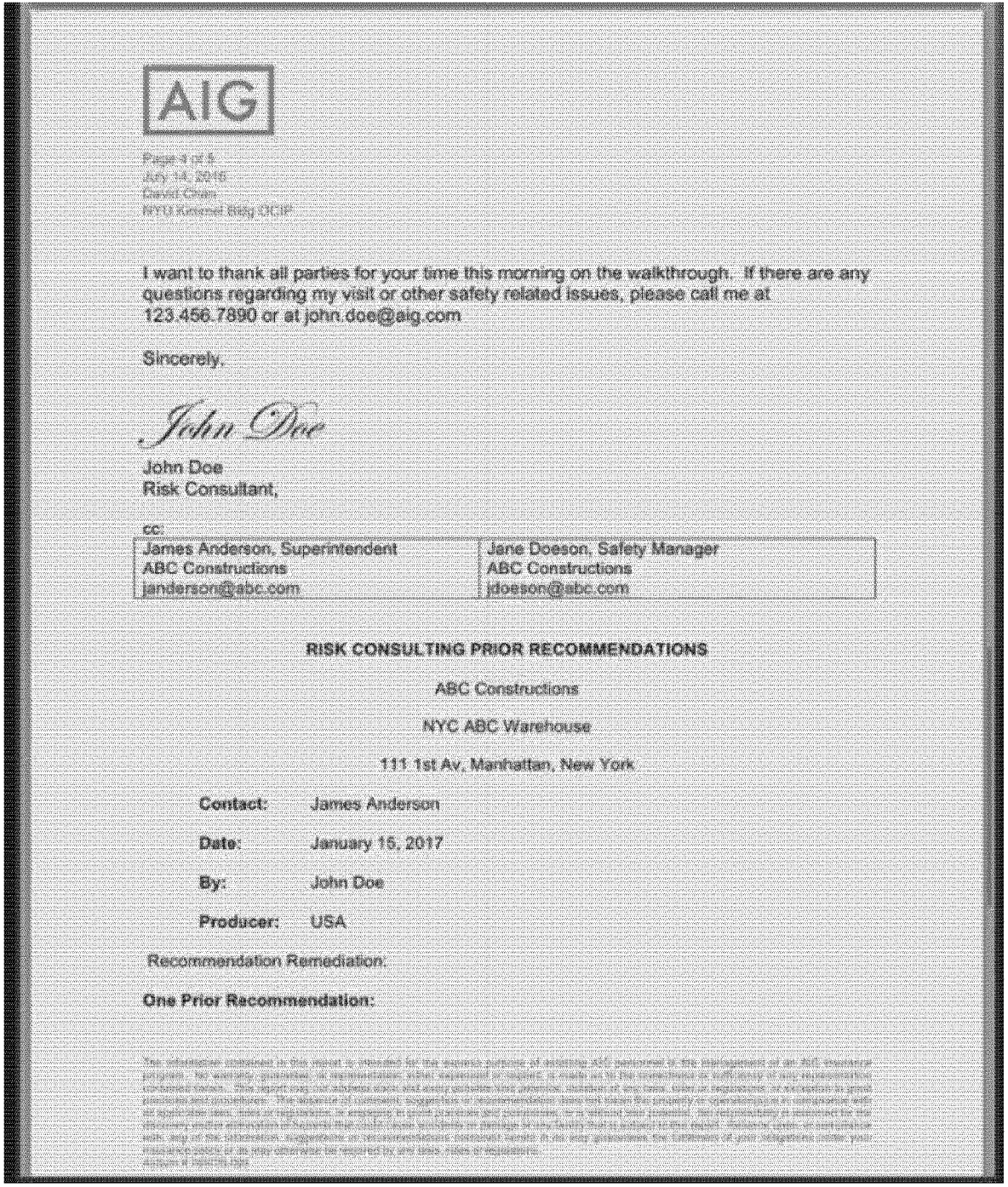
Figure 52:
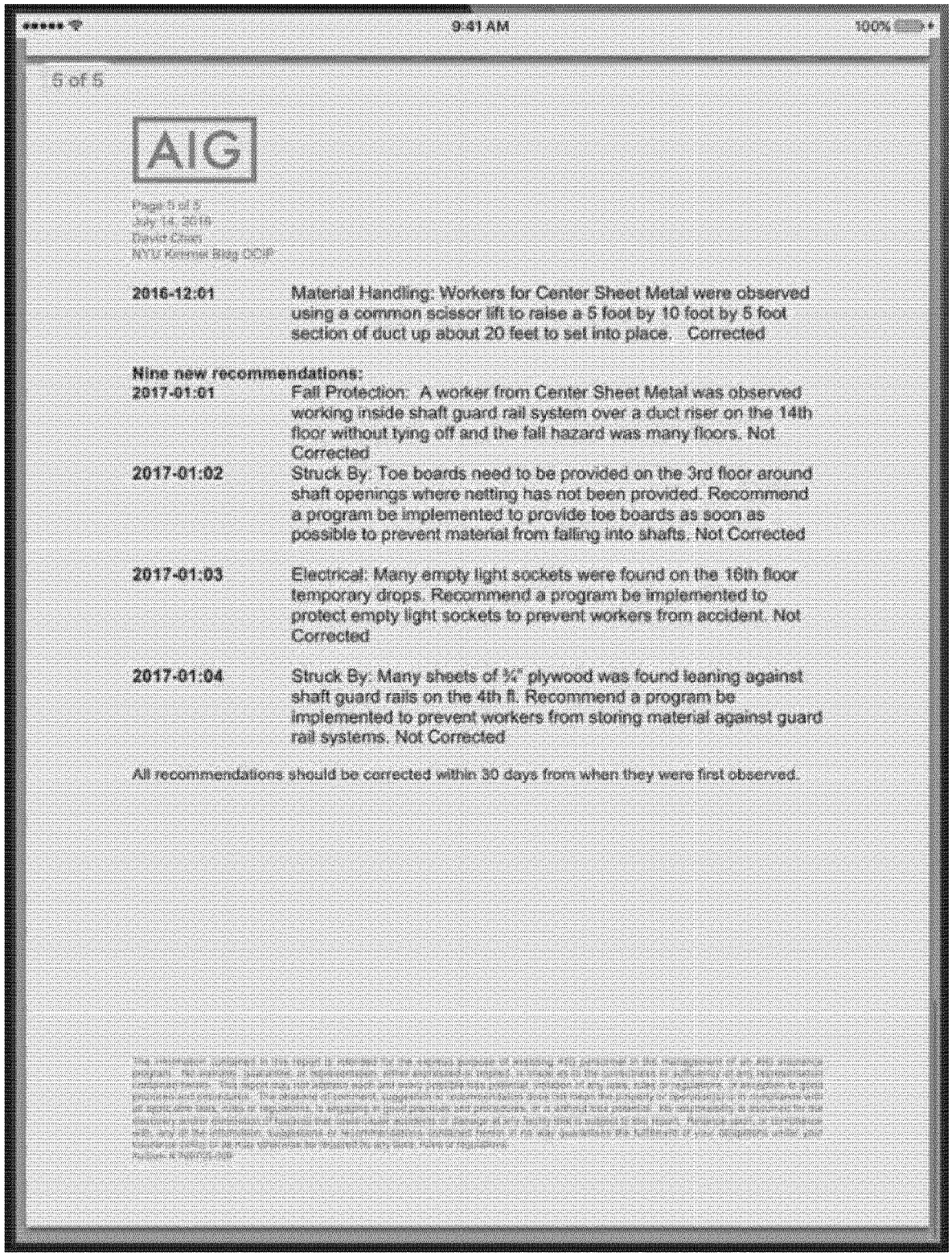

As shown in FIG. 44, by attaching an external light sensor 4400 and utilizing the built-in microphone, the consultant can generate light and sound measurements with the press of a button. The application can incorporate sound safety rules and other safety regulations and automatically notify the risk consultant of any violations 4500 in real-time (FIG. 45). Examples of other sensing capabilities include a gas sensor (e.g., oxygen, carbon monoxide), and other metering tools.

Once the walkthrough of the construction site is completed, the risk consultant can generate recommendations (FIG. 46) for the site manager. This can be done based on the observations noted or by creating new recommendations.

In the report section of the application (FIG. 47), an email can be sent to the site manager with a copy of the report. An official file report (e.g., a final PDF) can also be generated by selecting an icon 4700 in the report section from within the app, thereby reducing the lag time for report submission and allowing for more customer centric experience. The final PDF (e.g., FIGS. 48-52) includes a loss run, the observations from the site visit, along with image and sensor information, as well as new and unfulfilled recommendations.

As such, the disclosed application introduces observation-based leading indicators for analysis and correlation to claim-based lagging indicators.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following embodiments) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computing device, comprising:
   a processor; and
   a memory storing instructions that, when executed by the processor, cause the computing device to perform the steps of:
      performing image processing on an image of a site location to identify one or more objects in the image, wherein performing the image processing includes training a Convolutional Neural Network (CNN) to detect objects in images using a plurality of convolution layers to extract aspects of the images in a progressively hierarchical fashion by combining features from a previous convolution layer with a next convolution layer through a weighted non-linear function, and executing the CNN to detect the one or more objects in the image of the site location;
      receiving one or more known models of objects at the site location, wherein the one or more known models include a parsed set of regulation information corresponding to safety standards for the one or more known models;
      identifying an object type for a first object of the one or more objects identified in the image by matching the first object to a known model of the one or more known models of objects at the site location;
      applying the parsed set of regulation information against the first object based on the object type to determine whether the first object is in compliance with the parsed set of regulation information;
      receiving, from a sensor communicatively coupled to the computing device, data sensed by the sensor corresponding to an environmental condition of the site location;
      comparing the data sensed by the sensor to the parsed set of regulation information; and
      generating a report based on information corresponding to whether the first object in the image complies with the parsed set of regulation information and information corresponding to whether the data sensed by the sensor complies with the parsed set of regulation information.

2. The computing device of claim 1, wherein the sensor comprises a gas sensor, a light sensor, or a microphone.

3. The computing device of claim 1, wherein the sensor is included in the computing device.

4. The computing device of claim 1, wherein the sensor is communicatively coupled to the computing device over a wireless network.

5. The computing device of claim 1, further comprising:
   a camera configured to capture the image of the site location, wherein the first object is included in the image of the site location captured by the camera;
   wherein executing the instructions further causes the computing device to perform the step of:
      receiving, from a database, claims data related to the prior losses or claims corresponding to the site location, wherein an area captured by the image of the site location is based on the claims data related to the prior losses or claims corresponding to the site location.

6. The computing device of claim 5, further comprising:
   a display device that displays a prompt to create a bounding box around the first object in the image of the site location captured by the camera.

7. The computing device of claim 1, wherein the report indicates a risk assessment of the site location based on the information corresponding to whether the first object in the image complies with the parsed set of regulation information and the information corresponding to whether the data sensed by the sensor complies with the parsed set of regulation information.

8. A method for generating a report associated with a site location, the method comprising:
   performing, by a processor included in a computing device, image processing on an image of the site location to identify one or more objects in the image, wherein performing the image processing includes training a Convolutional Neural Network (CNN) to detect objects in images using a plurality of convolution layers to extract aspects of the images in a progressively hierarchical fashion by combining features from a previous convolution layer with a next convolution layer through a weighted non-linear function, and executing the CNN to detect the one or more objects in the image of the site location;

receiving, by the processor, one or more known models of objects at the site location, wherein the one or more known models include a parsed set of regulation information corresponding to safety standards for the one or more known models;

identifying, by the processor, an object type for a first object of the one or more objects identified in the image by matching the first object to a known model of the one or more known models of objects at the site location;

applying, by the processor, the parsed set of regulation information against the object based on the object type to determine whether the first object is in compliance with the parsed set of regulation information;

receiving, by the processor from a sensor communicatively coupled to the computing device, data sensed by the sensor corresponding to an environmental condition of the site location;

comparing, by the processor, the data sensed by the sensor to the parsed set of regulation information; and generating, by the processor, the report based on information corresponding to whether the first object in the image complies with the parsed set of regulation information and information corresponding to whether the data sensed by the sensor complies with the parsed set of regulation information.

9. The method of claim 8, wherein the sensor comprises a gas sensor, a light sensor, or a microphone.

10. The method of claim 8, wherein the sensor is included in the computing device.

11. The method of claim 8, wherein the sensor is communicatively coupled to the computing device over a wireless network.

12. The method of claim 8, wherein the computing device includes a camera configured to capture the image of the site location, and wherein the first object is included in the image of the site location captured by the camera, the method further comprising:

receiving, from a database, claims data related to the prior losses or claims corresponding to the site location, wherein an area captured by the image of the site location is based on the claims data related to the prior losses or claims corresponding to the site location.

13. The method of claim 12, wherein the computing device includes a display device that displays a prompt to create a bounding box around the first object in the image of the site location captured by the camera.

14. The method of claim 8, wherein the report indicates a risk assessment of the site location based on the information corresponding to whether the first object in the image complies with the parsed set of regulation information and the information corresponding to whether the data sensed by the sensor complies with the parsed set of regulation information.

15. A non-transitory computer-readable medium storing instructions that, when executed by a processor, cause a computing device to generate a report associated with a site location, by performing the steps of:

performing image processing on an image of the site location to identify one or more objects in the image, wherein performing the image processing includes training a Convolutional Neural Network (CNN) to detect objects in images using a plurality of convolution layers to extract aspects of the images in a progressively hierarchical fashion by combining features from a previous convolution layer with a next convolution layer through a weighted non-linear function, and executing the CNN to detect the one or more objects in the image of the site location;

receiving one or more known models of objects at the site location, wherein the one or more known models include a parsed set of regulation information corresponding to safety standards for the one or more known models;

identifying an object type for a first object of the one or more objects identified in the image by matching the first object to a known model of the one or more known models of objects at the site location;

applying the parsed set of regulation information against the object based on the object type to determine whether the first object is in compliance with the parsed set of regulation information;

receiving, from a sensor communicatively coupled to the computing device, data sensed by the sensor corresponding to an environmental condition of the site location;

comparing the data sensed by the sensor to the parsed set of regulation information; and generating the report based on information corresponding to whether the first object in the image complies with the parsed set of regulation information and information corresponding to whether the data sensed by the sensor complies with the parsed set of regulation information.

16. The computer-readable medium of claim 15, wherein the sensor comprises a gas sensor, a light sensor, or a microphone.

17. The computer-readable medium of claim 15, wherein the sensor is included in the computing device.

18. The computer-readable medium of claim 15, wherein the sensor is communicatively coupled to the computing device over a wireless network.

19. The computer-readable medium of claim 15, wherein the computing device includes a camera configured to capture the image of the site location, and wherein the first object is included in the image of the site location captured by the camera, and wherein the processor executing the instructions further causes the computing device to perform the step of:

receiving, from a database, claims data related to the prior losses or claims corresponding to the site location, wherein an area captured by the image of the site location is based on the claims data related to the prior losses or claims corresponding to the site location.

20. The computer-readable medium of claim 15, wherein the report indicates a risk assessment of the site location based on the information corresponding to whether the first object in the image complies with the parsed set of regulation information and the information corresponding to whether the data sensed by the sensor complies with the parsed set of regulation information.

* * * * *